United States Patent
Michelman et al.

[11] Patent Number: 5,987,481
[45] Date of Patent: Nov. 16, 1999

[54] METHOD AND APPARATUS FOR USING LABEL REFERENCES IN SPREADSHEET FORMULAS

[75] Inventors: Eric H. Michelman, Seattle; Joseph David Barnett; Jonathan E. Lange, both of Kirkland, all of Wash.

[73] Assignee: Microsoft Corporation, Redmond, Wash.

[21] Appl. No.: 08/886,759

[22] Filed: Jul. 1, 1997

[51] Int. Cl.[6] ..................................... G06F 17/30
[52] U.S. Cl. ......................... 707/503; 345/333; 345/335; 707/500; 707/503; 707/507
[58] Field of Search ................... 707/500, 503, 707/507, 501; 345/333, 335

[56] References Cited

U.S. PATENT DOCUMENTS

| | | | |
|---|---|---|---|
| 5,101,476 | 3/1992 | Kukla | 340/286.01 |
| 5,317,686 | 5/1994 | Salas et al. | 707/503 |
| 5,371,675 | 12/1994 | Greif et al. | 707/503 |
| 5,784,545 | 7/1998 | Anderson et al. | 707/507 |
| 5,832,532 | 11/1998 | Kennedy et al. | 707/503 |
| 5,842,018 | 11/1998 | Atkinson et al. | 707/501 |
| 5,883,623 | 3/1999 | Cseri | 345/335 |

FOREIGN PATENT DOCUMENTS

| | | | |
|---|---|---|---|
| 0 431 638 A2 | 12/1990 | European Pat. Off. | 15/72 |
| 0 443 184 A 2 | 12/1990 | European Pat. Off. | 3/33 |
| 92/04678 | 3/1992 | WIPO | 15/20 |
| 92/08199 | 5/1992 | WIPO | 15/40 |

OTHER PUBLICATIONS

Improv 1.0, Lootus Development Corp., CMP Accession No.: CRW19930215S9852, Computer Retail Week, n 336, 15, Feb. 1993.

Quattro Pro 5.0, Borland International Inc., CMP Accession No.: CRW19930920S3838, Computer Retail Week, 1993, n 348, 17, Sep. 1993.

Quattro Pro 5.0 for Windows Workgroup Edition * 1–2–3 Release 4.01 * Excel Version 5.0—Spreadsheet Champs In The Spotlight, Jonathan Blackwood, Windows Magazine, 1994, n 504, 238 CMP Accession No.: WIN19940401S4374, Apr. 1994.

*Primary Examiner*—Paul R. Lintz
*Assistant Examiner*—Shahid Alam
*Attorney, Agent, or Firm*—Jones & Askew, LLP

[57] ABSTRACT

A system for referencing a range of cells in a spreadsheet formula by using label references. The label references are used to identify labels within the spreadsheet which, in turn, refer to a range of cells. First, a formula is parsed in order to identify any label references within the formula. Second, the cells of the spreadsheet are searched in order to generate a list of labels within the spreadsheet that match the label references identified in the formula. Third, each of the labels are examined and a preferred label set is selected. The preferred label set represents the actual labels that were intended by the formula references. Finally, the range of cells referenced by the preferred label set is determined. Thus, a user is able to reference a cell within a spreadsheet table by entering column and row labels that intersect at that cell.

59 Claims, 27 Drawing Sheets

FIG. 3

Microsoft Excel - 1470 sample 2

File  Edit  View  Insert  Format  Tools  Window  Help

| | A | B | C | D | E | F | G | H |
|---|---|---|---|---|---|---|---|---|
| 1 | | | | | | | | |
| 2 | | | | | | | | |
| 3 | | | | | | | | |
| 4 | | | | | | | | |
| 5 | | | | | | | | |
| 6 | | | | | January | February | March | |
| 7 | | | | Sales | 4 | 6 | 8 | |
| 8 | | | | Cost | 1 | 2 | 3 | |
| 9 | | | | Profit | 3 | = January Sales + February Cost | 5 = January Sales + March Sales | |
| 10 | | | | | | | | |
| 11 | | | | | = January Sales | = Sales | | |
| 12 | | | | | | | | |
| 13 | | | | | | | | |
| 14 | | | | | | | | |
| 15 | | | | | | | | |
| 16 | | | | | | | | |
| 17 | | | | | January | February | March | |
| 18 | | | | Days In | 28 | 24 | 25 | |
| 19 | | | | Days Out | 3 | 5 | 6 | |
| 20 | | | | Profit | 7 | 7 | 7 | |
| 21 | | | | | | | | |
| 22 | | | | | = Days Out | | | |
| 23 | | | | | | | | |
| 24 | | | | | | | | = SUM("Days In") |
| 25 | | | | SUMMARY | February Cost | = Cost | | |
| 26 | | | | | | | | |

Sheet1 / Sheet2 / Sheet3 /

METHOD AND APPARATUS FOR USING LABEL REFERENCES IN SPREADSHEET FORMULAS

TECHNICAL FIELD

The present invention is generally directed to computer programs supporting spreadsheet functions, and more particularly, relates to an improved interface for a spreadsheet program that uses labels to refer to spreadsheet cells, and hence, improves the readability of formulas existing within the spreadsheet.

BACKGROUND OF THE INVENTION

Spreadsheet programs are a useful tool in performing computational tasks such as keeping household budgets, work schedules, tracking bank accounts, maintaining inventories, etc. As the use of personal computers within the home increases, the use of spreadsheets to assist in household tasks also increases. The versatility of spreadsheet applications and the ease with which they are adapted to various tasks has resulted in their widespread use. With advances in the speed and capabilities of personal computers, enhanced features have been developed for spreadsheet programs.

In a typical spreadsheet program, cells are arranged in a grid of rows and columns. The cells in a spreadsheet may contain data items, labels, and formulas. In general, data items are entered into the cells, and formulas are used to manipulate or evaluate the data items. In order for a formula to reference a cell within the spreadsheet, the coordinates of the grid are used to identify a specific cell (i.e., Column C, Row 4 or C4). For complex tasks, the formulas within a spreadsheet may become complex and, in some instances, unreadable. Therefore, it is desirable to improve the readability of formulas within a spreadsheet.

One method for improving the readability of spreadsheet formulas is to use defined names or labels to reference cells. This method requires a spreadsheet user to enter certain commands to define a name or label and to associate that name or label with a particular cell or group of cells. Thus, a label such as January_Sales could be defined to refer to a cell containing the number of sales that occurred in the month of January. A problem with this prior method is that the procedures required for defining and maintaining the label names can be complicated. Because the typical spreadsheet user may not be trained in software programming or in operating a computer, features such as those described for this method are often under utilized. Therefore, it is desirable to provide a method to improve the readability of spreadsheet formulas in a manner that is easy to learn and exploit.

SUMMARY OF THE INVENTION

The present invention satisfies the above-described needs by providing a method for referencing a range of cells in a spreadsheet formula by using label references. The label references are used to identify labels within the spreadsheet which, in turn, refer to a range of cells. In providing this capability, four primary steps are performed. In the first step, a formula is parsed in order to identify any label references within the formula. For the second step, the cells of the spreadsheet are searched in order to generate a list of labels within the spreadsheet that match the label references identified in the formula. In the third step, each of the labels are examined and a preferred label set is selected. The preferred label set represents the actual labels which correspond to the formula references. Finally, in the fourth step, the range of cells referenced by the preferred label set is determined. Thus, a user can reference a cell within a spreadsheet table by simply entering column and row labels that intersect with the cell.

In the first step, the parsing of the formula includes identifying two delimiters that are separated by one or more groups of characters. Next, each of the groups of characters and each combination of two or more groups are examined in order to identify valid label references. A valid label reference is considered to be a group of characters that include one or more of the following characteristics: (a) they are enclosed in label boundary marks; (b) they represent an integer in the range of 1900 to 9999; (c) they correspond to a recognizable date format; or (d) they do not start with any characters that are reserved for other purposes.

In the second step, the spreadsheet is searched for labels that match the valid label references identified in the formula. If the spreadsheet contains one or more labeled ranges, the ranges are searched first. In an alternate embodiment, a spreadsheet will contain one or more plies or sheets. If a label reference begins with a ply-name for a particular ply, then that particular ply may be searched for labels that match the remainder of the label reference.

In the third step, each of the labels identified in the second step are examined and a preferred label set is selected. The preferred label set represents the actual labels that were intended to be referenced within the formula. In performing this step, candidate matching label sets containing one or more labels are identified. Candidate matching label sets containing two labels are considered to be explicit matches. Candidate matching label sets containing only one label may be considered implicit matches or free radical matches depending on the labels location relative to the formula. Next, rules are applied to identify preferred matching label sets and eliminate non-preferred candidate matching label sets. These rules include: determining whether the label is a row or column header; examining the relative location of the labels with respect to each other and to the formula cell; and determining whether a label exists within an implicit table or a labeled range. The rules applied in this process differ depending on whether the label set being examined is an explicit match, implicit match or a free radical. Finally, if only one matching label set remains, that label set is selected as the preferred label set.

In the fourth step, the range of cells referenced by the preferred label set is determined. For explicit matches, the labels are classified as either a row or column header and then the intersection of the two labels is determined. For implicit matches, the relative location of the label to the formula as well as the classification of the label type are used in determining the intersection. In identifying the intersection or the range of referenced cells, rules are applied depending on the type of match that is being examined.

In view of the foregoing, it will be appreciated that the present invention provides the advantage of improved readability of formulas within a spreadsheet. It will also be appreciated that the present invention simplifies the process of creating and entering spreadsheet formulas into a spreadsheet. It will also be appreciated that the present invention simplifies the process of modifying and maintaining a spreadsheet because the formulas can be more readily comprehended. It will also be appreciated that the present invention provides an improved spreadsheet program interface which enhances the utility of spreadsheet formulas and which can be easily understood and exploited by both casual and experienced spreadsheet users.

Another aspect of the present invention provides a method for automatically inserting label references into a formula of a spreadsheet for identifying a range of cells. For this aspect, an editing mode is enabled for entering a formula into a cell. As the formula is entered, ranges of cells can be referenced by selecting cells with a pointing device. Upon selecting a cell (or in an alternative embodiment a range of one or more cells), the spreadsheet is searched for a range of column headers above the selected cell. If a column header is identified, then a search to the left and to the right of the selected range is conducted in order to identify a row header. If both a column header and a row header are identified, then a column and row label are extracted from the respective header ranges and inserted into the formula. This aspect of the invention is advantageous because it improves the readability of the formulas and the usefulness of the spreadsheet while requiring minimal additional actions by the user.

These and other aspects, features, and advantages of the present invention will be more clearly understood and appreciated from a review of the following detailed description of the present invention and possible embodiments thereof, and by reference to the appended drawings and claims.

BRIEF DESCRIPTION OF THE DRAWINGS

FIG. 3 is a diagram illustrating a display screen from the "MICROSOFT EXCEL 97" spreadsheet application and is illustrative of various aspects of the present invention.

DETAILED DESCRIPTION

Figure 1:
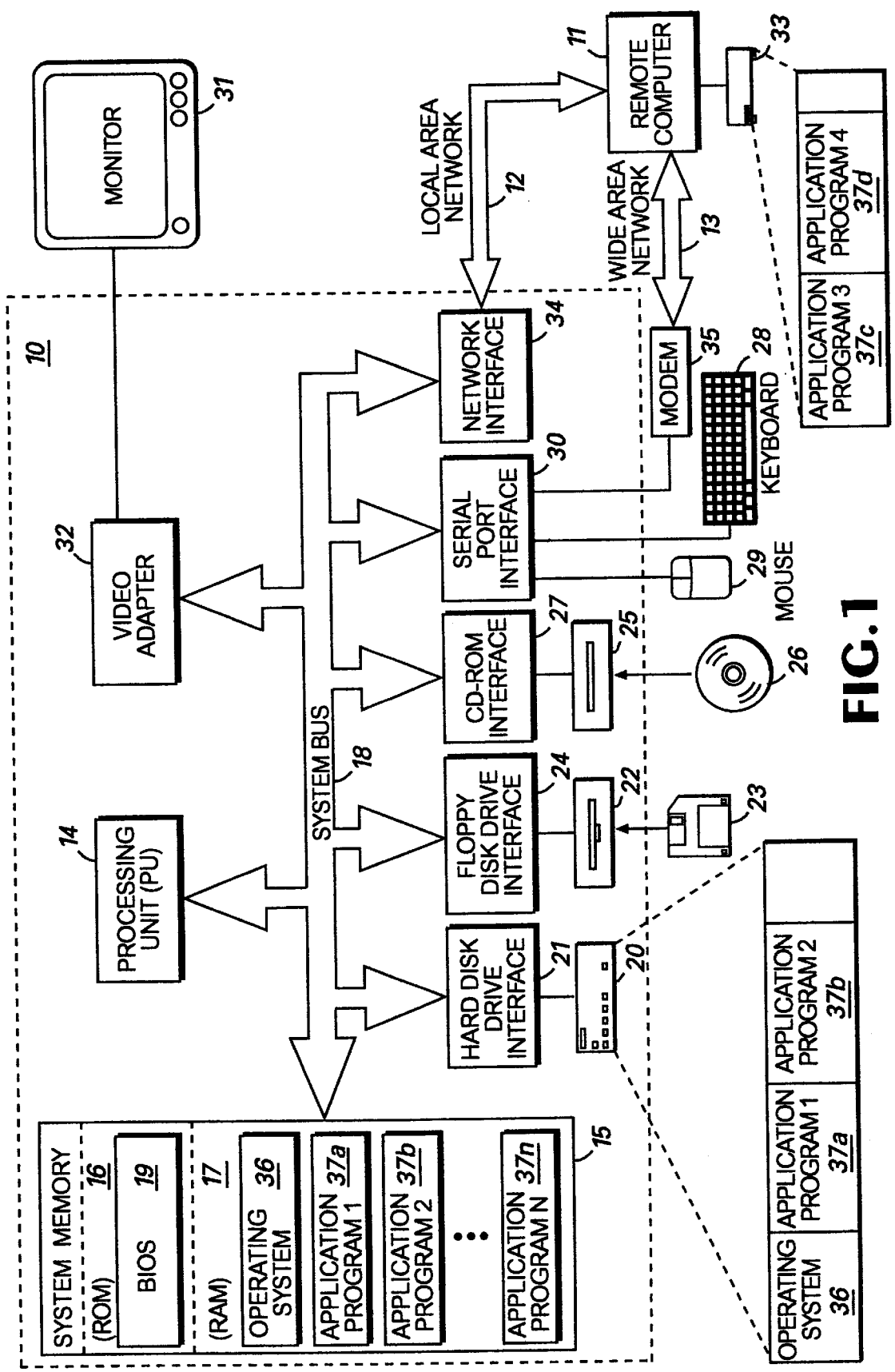
FIG. 1 is a block diagram of a personal computer that provides the operating environment for the preferred embodiment of the present invention.

The present invention supports referencing a range of spreadsheet cells from a spreadsheet formula. This is accomplished by referencing labels within the context of formulas in the spreadsheet. The preferred embodiment of the present invention is represented by the version of the "MICROSOFT EXCEL 97" program, a spreadsheet program published by Microsoft Corporation of Redmond, Was. Briefly described, the preferred computer program allows label references to be used within a formula for identifying a range of cells over which the formula operates. This is accomplished by (1) parsing a formula to identify label references; (2) searching the spreadsheet to identify labels which correspond to the label references; (3) identifying the set of labels that were intended by the references in the formula; and (4) determining the range of cells referenced by the set of labels.

Although the preferred embodiment will be generally described in the context of a program and an operating system running on a personal computer, those skilled in the art will recognize that the present invention also can be implemented in conjunction with other program modules for other types of computers. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

The detailed description which follows is represented largely in terms of processes and symbolic representations of operations by conventional computer components, including a processing unit (PU), memory storage devices for the PU, display devices, and input devices. Furthermore, these processes and operations may utilize conventional computer components in a heterogeneous distributed computing environment, including remote file servers, remote computer servers, and remote memory storage devices. Each of these conventional distributed computing components is accessible by the PU via a communications network.

The processes and operations performed by the computer include the manipulation of signals by a PU or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, pared, or otherwise manipulated. It is conventional for those skilled in the art to refer to these signals as bits, bytes, words, data, flags, variables, parameters, objects, properties, tags, types, identifiers, values, elements, symbols, characters, terms, numbers, points, records, images, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, receiving, sending, transmitting, replying, etc. which are often associated with manual operations performed by a human operator. The operations described herein are machine operations performed in conjunction with various input provided by a human operator or user that interacts with the computer.

In addition, it should be understood that the programs, processes, methods, etc. described herein are not related or limited to any particular computer or apparatus, nor are they related or limited to any particular communication network architecture. Rather, various types of general purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

Referring now to the drawings, in which like numerals represent like elements throughout the several figures, aspects of the present invention and the preferred operating environment will be described.

The Operating Environment

FIG. 1 illustrates a conventional personal computer 10 suitable for supporting the operation of the preferred embodiment of the present invention. As shown in FIG. 1, the personal computer 10 may operate in a networked environment with logical connections to a remote computer 11. The logical connections between the personal computer 10 and the remote computer 11 are represented by a local area network 12 and a wide area network 13. Those of ordinary skill in the art will recognize that in this client/server configuration, the remote computer 11 may function as a file server or computer server.

The personal computer 10 includes a processing unit (PU) 14, such as the 80486 or "Pentium" microprocessors manufactured by Intel Corporation of Santa Clara, Calif. The personal computer also includes system memory 15 (including read only memory (ROM) 16 and random access memory (RAM) 17), which is connected to the PU 14 by a system bus 18. The preferred computer 10 utilizes a BIOS 19 (Basic Input/Output System), which is stored in ROM 16. Those skilled in the art will recognize that the BIOS 19 is a set of basic routines that helps to transfer information between elements within the personal computer 10. Those skilled in the art will also appreciate that the present invention may be implemented on computers having other architectures, such as computers that do not use a BIOS, and those that utilize other microprocessors, such as the "MIPS" or "POWER PC" families of microprocessors from Silicon Graphics and Motorola, respectively. Additionally, the present invention is not limited to computers that utilize ROM or RAM for system memory. Other technologies such as electronically programmable ROM (EPROM), ultraviolet light erasable and electronically programmable ROM (UVEPROM), electronically erasable and programmable ROM (EEPROM), FLASH and bubble memory may also be used.

Within the personal computer 10, various devices may be connected to enhance the utility and performance of the personal computer. A local hard disk drive 20 may be connected to the system bus 18 via a hard disk drive interface 21. A floppy disk drive 22, which is used to read or write a floppy disk 23, may be connected to the system bus 18 via a floppy disk drive interface 24. A CD-ROM drive 25, which is used to read a CD-ROM disk 26, may be connected to the system bus 18 via a CD-ROM interface 27. A user enters commands and information into the personal computer 10 by using input devices such as a keyboard 28, and/or pointing devices such as a mouse 29. Typically, these input devices are connected to the system bus 18 via a serial port interface 30 or a parallel port interface (not shown in FIG. 1). Other types of pointing devices (not shown in FIG. 1) include track pads, track balls, pens, head trackers, data gloves, and other devices suitable for positioning a cursor on a computer monitor 31. A monitor 31 or other kind of display device may be connected to the system bus 18 via a video adapter 32.

The personal computer may be connected to a network of other computers or devices. A remote computer 11 in a networked environment is connected to a remote memory storage device 33. This remote memory storage device 33 is typically a large capacity device such as a hard disk drive, CD-ROM drive, magneto-optical drive or the like. The personal computer 10 may be connected to the remote computer 11 by a network interface 34, which is used to communicate over the local area network 12.

The personal computer 10 may also be connected to the remote computer 11 by a modem 35, which is used to communicate over the wide area network 13, such as the Internet. The modem 35 is connected to the system bus 18 via the serial port interface 30. The modem 35 also can be connected to the public switched telephone network (PSTN) or community antenna television (CATV) network. Although illustrated in FIG. 1 as external to the personal computer 10, those of ordinary skill in the art will quickly recognize that the modem 35 may also be internal to the personal computer 11, thus communicating directly via the system bus 18. It is important to note that connection to a remote computer 11 via either the local area network 12 and the wide area network 13 is not required, but merely illustrates methods of providing a communication path between the personal computer 10 and the remote computer 11.

Although other internal components of the personal computer 10 are not shown, those of ordinary skill in the art will appreciate that such components and the interconnection between them are well known. Accordingly, additional details concerning the internal construction of the personal computer 10 need not be disclosed in connection with the present invention.

Those skilled in the art will understand that program modules such as an operating system 36, application programs 37a–N, and data are provided to the personal computer 10 via computer-readable media. In the preferred computer, the computer-readable media include the local or remote memory storage devices, which may include the local hard disk drive 20, floppy disk 23, CD-ROM 26, RAM 17, ROM 16, and the remote memory storage device 33. In the preferred personal computer 10, the local hard disk drive 20 is used to store data and programs, including the operating system and programs. The application programs 37a–N, may include commercially available utilities, public domain software utilities, computer games, etc. The preferred embodiment of the present invention, a spreadsheet program, is an example of one such application program.

The Operating System

Figure 2:
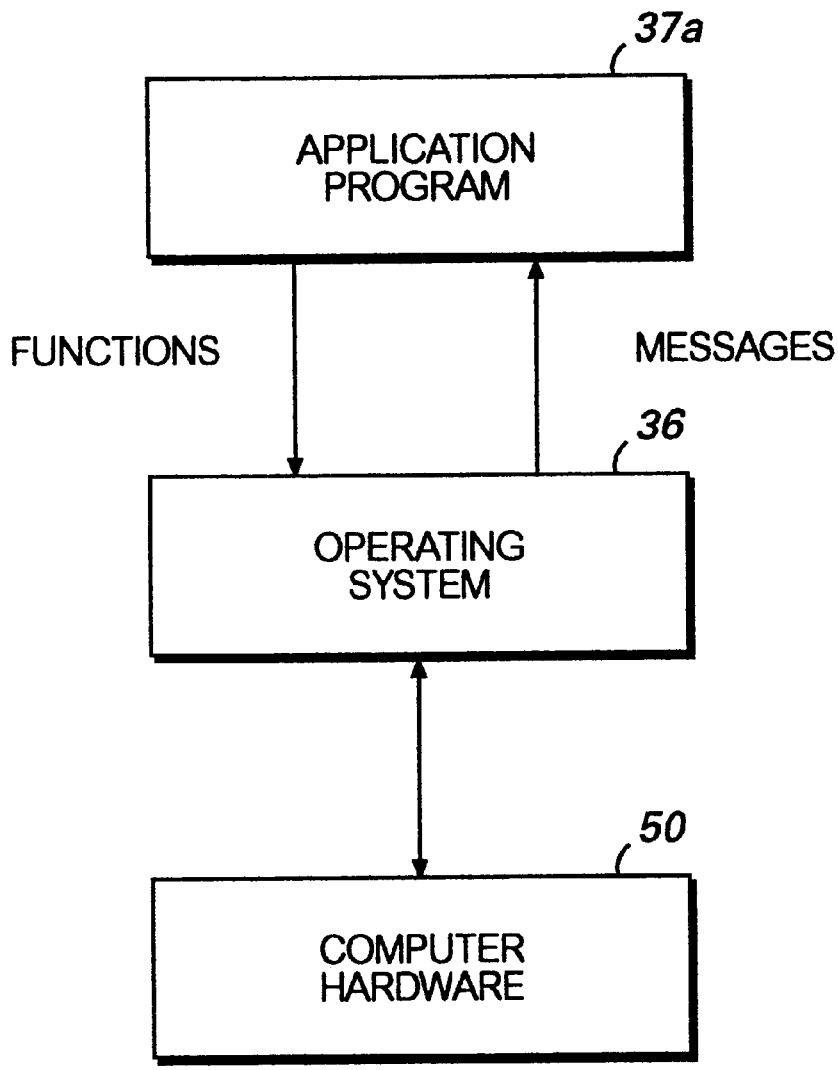
FIG. 2 is a block diagram illustrating the interface between a computer's input/output devices, an operating system, and an application program.

FIG. 2 is a simplified block diagram illustrating the interaction between the preferred computer hardware 50, the preferred operating system 36, and an application program 37a. Referring now to both FIGS. 1 and 2, when the personal computer 10 is turned on or reset, the PU 14 is forced to begin program execution at a specific memory location in the ROM 16. This specific memory location corresponds to the beginning of the bootstrap routine contained in the BIOS 19. The bootstrap routine functions to load the operating system 36 from the hard disk drive 20 into the RAM 17. Once the operating system 36 is loaded into RAM 17, the PU 14 executes instructions of the operating system 36 and causes the visual elements associated with the user interface of the operating system 36 to be displayed on the monitor 31.

The operating system 36, in conjunction with the BIOS 19 and associated device drivers, provides the basic interface between the computer's resources, the user, and the application program 37a. The operating system 36 interprets and carries out instructions issued by the user and/or application program(s). For example, when the user wants to load an application program 37a, the operating system 36 interprets the instruction (e.g., double clicking on the application program's icon) and causes the PU 14 to load the program code into RAM 17 from either the local hard disk drive 20, floppy disk 23, CD-ROM 26, or the remote memory storage device 33. Once the application program 37a is loaded into the RAM 17, it is executed by the PU 14. For larger programs, the operating system 36 causes the PU 14 to load various portions of program, or program modules, into RAM 17 as needed. In addition, several applications programs (37a–N) can be loaded into RAM at the same time. In this scenario, the operating system 36 will switch the PU 14 execution time between applications based on user requests, application program request, or by a time-sliced allotment of the processing time of PU 14.

The operating system 36 provides a variety of functions or services that allow an application program 37a to easily deal with various types of input/output (I/O). This allows the application program 37a to issue relatively simple function calls that cause the operating system 36 to perform the steps required to accomplish various tasks, such as displaying text on the monitor 31 (FIG. 1) or printing text on an attached printer (not shown). Generally described (with reference to FIG. 2), the application program 37a communicates with the operating system 36 by calling predefined functions provided by the operating system 36. The operating system 36 responds by providing the requested information in a message, by executing a requested task and/or by interfacing to necessary hardware components 50.

From this brief description, it should be appreciated that operating systems, such as "WINDOWS 95" and "WINDOWS NT", are quite complex and provide a wide variety of services that allow users and programs to utilize the resources available in the personal computer. Those skilled in the art will be familiar with operating systems and their various features, which include, but are in no means limited to, the specific messages and functions described above. For more comprehensive information regarding the "WINDOWS 95" and "WINDOWS NT" operating system and its interaction with programs, the reader may refer to any of a variety of publications, including the "Win32 Programmer's Reference" and "Advanced Windows" published by Microsoft Press.

The preferred embodiment of the present invention is implemented in "MICROSOFT EXCEL 97". It should be understood that the present invention can readily be implemented in other applications running under other operating systems, such as Microsoft Corporation's "Windows 3.1", IBM Corporation's "OS/2", UNIX based operating systems and the operating system used in "MACINTOSH" computers manufactured by Apple Computer, Inc.

The Spreadsheet and Related Terms

Before describing the details of the present invention, the general operation of a spreadsheet will be provided and terms associated with spreadsheets and the present invention will be defined. FIG. 3 illustrates a typical display screen for an application program 37a consisting of a spreadsheet program. The display screen represents one of many screens as would be observable on display 31 shown in FIG. 1. The spreadsheet consists of cells arranged in a grid of rows and columns. A cell is defined as the region in a spreadsheet where a single column and a single row intersect. Usually, the rows and columns are labeled in order to facilitate references to a cell or a range of cells. In FIG. 3, the displayed columns are labeled with letters (A–H) and the displayed rows are labeled with numbers (1–31); however, the actual number of rows and columns supported by a spreadsheet program can vary depending on its design. Thus, a reference to the cell containing the word "Sales" could be given as Column D and Row 8 or D8.

In a spreadsheet application such as Microsoft's "EXCEL" program, a user can define and enter various types or categories of information into a cell. Generally, the categories of information contained in a cell include data, labels, formulas, and blanks. The data within a cell can be numeric, alpha-numeric, text or symbolic and can be formatted in a variety of fashions. Generally, a label consists of text or alpha-numeric characters and is used to identify the type of data in the cells either below or to the right of the label. A label can be considered data; however, not all data entries may be considered as labels. Formulas typically contain mathematical or logical expressions consisting of operators and operands. Examples of operators include +, -, =, *, AND, OR, IF, etc. Operands consist of data entries within the formula or references to cell which contain data entries.

The following defined terms are used throughout this description.

To say that a first object or a first cell is above, below, left, or right of a second object or a second cell within the spreadsheet refers to their relative locations. For example, to state that a first cell is left of a second cell does not imply that the cells are in the same row. The first cell could be left and above, below or in the same row as the second cell.

A token is a single set of characters separated by spaces or other delimiters. Generally, a token refers to a word or a set of characters within a formula that may constitute a label reference or a portion of a label reference.

A delimiter in the context of a formula is an operand or the end of the formula. In the formula =January Sales+February Cost the delimiters in order of appearance are =, + and the end of the formula. The = and + delimiters enclose tokens January and Sales, and the + and end of formula delimiters enclose tokens February and Cost. The start of a formula can also be used as a delimiter, thus, the formula January Sales+February Cost could operate the same as the previous formula with the start of formula delimiter replacing the =delimiter.

An occupied cell is a cell containing either a data-item, formula, label or some other non-blank entity.

A label reference is the occurrence of one or more tokens within a formula that may refer to a label located within a cell of the spreadsheet. It is important to understand the difference between a label reference and a label. A label reference appears within a formula and refers to a label which may appear in a cell in the spreadsheet. In the example above, the following label references appear in the formula:

| | |
|---|---|
| January | February |
| Sales | Cost |
| January Sales | February Cost |

A proper label reference is a label reference that does not violate any formatting requirements nor qualifies as another type of reference. As an example, although the reference E4 is a valid column-row reference of a cell, this type of reference can not be used as a proper label within a formula. Similarly, the relative reference +5 can not be used as a proper label reference.

Label boundary marks are characters used to delineate a token or set of tokens as a label reference (e.g., the use of single quotation marks or ticks are typically used). If a non-proper label is enclosed in label boundary marks, it will then be considered a proper label reference. For instance, the label reference 'E4' would be considered a proper label reference.

A label reference group includes one or more label references in a formula separated by delimiters. The example above, shows two label reference groups:

> January, Sales, January Sales
> February, Cost, February Cost

A target label is a label which appears within the spreadsheet and matches a given label reference. Each label reference may have zero, one or several target labels. In FIG. 3, for the formula =January Sales+February Cost the following label references have target labels at the indicated cell locations.

| | |
|---|---|
| January | E7, E20 |
| Sales | D8 |
| January Sales | none |
| February | F7, F20 |
| Cost | D9, D23 |
| February Cost | E30 |

A label set contains one or more target labels and coincides with one permutation of a label reference group. For the present example, the possible label sets include:

| | |
|---|---|
| January Sales | E7, D8 |
| January Sales | E20, D8 |
| February Cost | F7, D9 |
| February Cost | F20, D9 |
| February Cost | F7, D23 |
| February Cost | F20, D23 |
| February Cost | E30 |

Because the label 'January Sales' did not appear as a target label in the spreadsheet, it could not form a label set.

A matching label set or candidate matching label set is a valid set of one or two labels that intersect with each other or a formula to identify a range of cells. A set of rules are applied to a label set to determine if it qualifies as a matching label set.

A preferred label set is a matching label set that is selected from the available matching label sets by applying rules to identify which label set was intended to be referenced in the formula.

A non-preferred label set is a matching label set that is eliminated after applying a set of rules.

A final matching label set is the last or sole remaining matching label set after applying a set of rules and is the same as preferred matching label set.

A range is the set of one or more cells which may be identified by a label.

A row header is a label which refers to a range of cells located in the same row as the label. In FIG. 3, Sales, Cost, Profit, Days In, and Days Out may operate as row headers.

A column header is a label which refers to a range of cells located in the same column as the label. In FIG. 3, January, February, and March may operate as column headers.

A column header range is a range of cells that contain column headers. In FIG. 3, cells E7, F7, and G7 form a first column header range and cells E20, F20, and G20 form a second column header range.

A row header range is a range of cells that contain row headers. In FIG. 3, cells D8, D9, and D10 form a first row header range and cells D21, D22 and D23 form a second row header range.

A table refers to a range of cells wherein the top row contains column headers and the left or the right most columns contains row headers. In FIG. 3, two tables 70-71 are illustrated, each containing data, labels, and formulas.

A ply is a single sheet of a spreadsheet. A spreadsheet may contain one or more plies. FIG. 3 shows a spreadsheet with three plies. Sheet1 is the name of the active ply, and Sheet2 and Sheet3 are the names of the inactive plies.

A labeled range is a column header range or a row header range that has been explicitly defined as such within the spreadsheet.

An explicit intersection can exist between two labels where one label is a row header and another label is a column header. The point where the ranges associated with these labels cross is the intersection.

An explicit intersection match is a matching label set that contains two labels.

A candidate explicit intersection match is one of several explicit intersection matches being considered for selection as the preferred matching label set.

An implicit intersection can exist between a single label and a cell containing a formula, where the single label and the formula cell are not in the same row or column and the formula refers to the label.

An implicit intersection match is a matching label set that contains one label and is not in the same row or column as the cell containing the formula which references the label.

An implicit table is an area bounded by predefined label ranges.

A candidate implicit intersection match is one of several implicit intersection matches being considered for selection as the preferred matching label set.

A free radical occurs when the semantics of the use of a label within a formula indicate that it is referring to more than one cell and there is not an explicit intersection to resolve the label to a single cell. This occurs when the label is used within an aggregator function. Examples of aggregator functions include Sum (Sales), Avg (Sales), and Mean (Sales). Thus, if a label is used within an aggregator function such as Sum (Sales), there is no explicit intersection to force resolution to a single cell. Furthermore, no attempts to identify an implicit intersection will occur when a label is used within an aggregator function.

A free radical match is a matching label set that contains one label which may or may not be in the same row or column as the formula cell referencing the label.

A candidate free radical match is one of several free radical matches being considered for selection as the preferred matching label set.

Using Labels in Formulas

Figure 4:
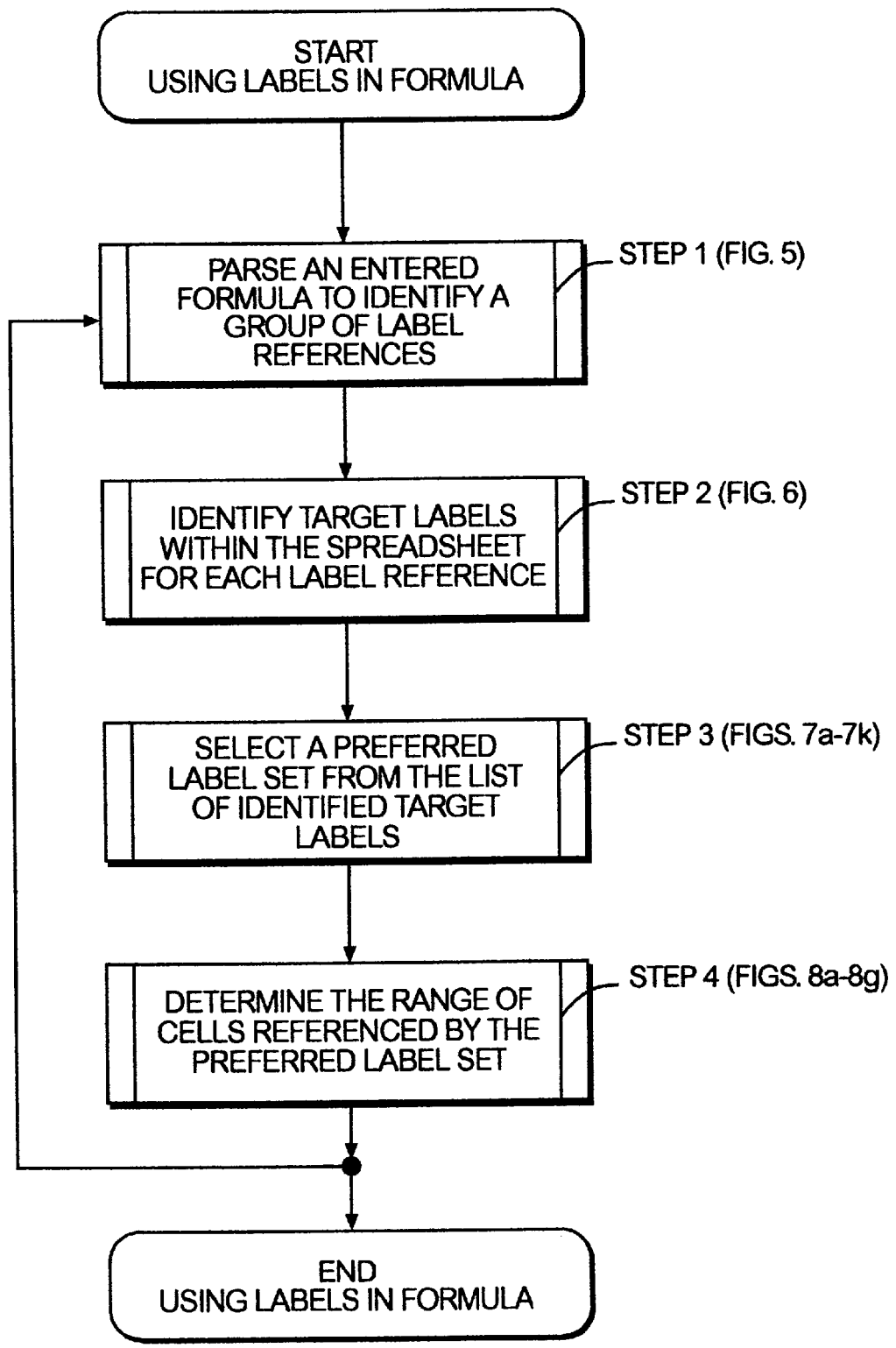
FIG. 4 is a flow diagram illustrating the four general processing steps (Steps 1–4) for using label references in spreadsheet formulas in accordance with the preferred embodiment of the present invention.

Turning now to FIG. 4, the general steps in using label references in a formula to refer to a range of spreadsheet cells is illustrated for the preferred program. The beginning of the preferred program is indicated by a START block. The preferred program performs four general steps. In Step 1, an entered formula must be parsed to identify any label reference groups that exist within the formula. Depending on the complexity of the formula, one or more label reference groups may be identified.

In Step 2, one label reference group from the formula is operated on. In this step, the spreadsheet is searched to identify the target labels that exists, if any, for each label reference within the label reference group.

In Step 3, the target labels identified in Step 2 are examined to identify any matching label sets. In addition, a preferred label set is selected from the matching label sets. This is accomplished by applying a series of rules that are designed to model typical usage of labels within a spreadsheet.

In Step 4, the preferred label set is evaluated to determine the range of cells that are referenced by the labels.

The end of the preferred program is indicated by an END block.

Step 1: Parsing the Formula

Figure 5:
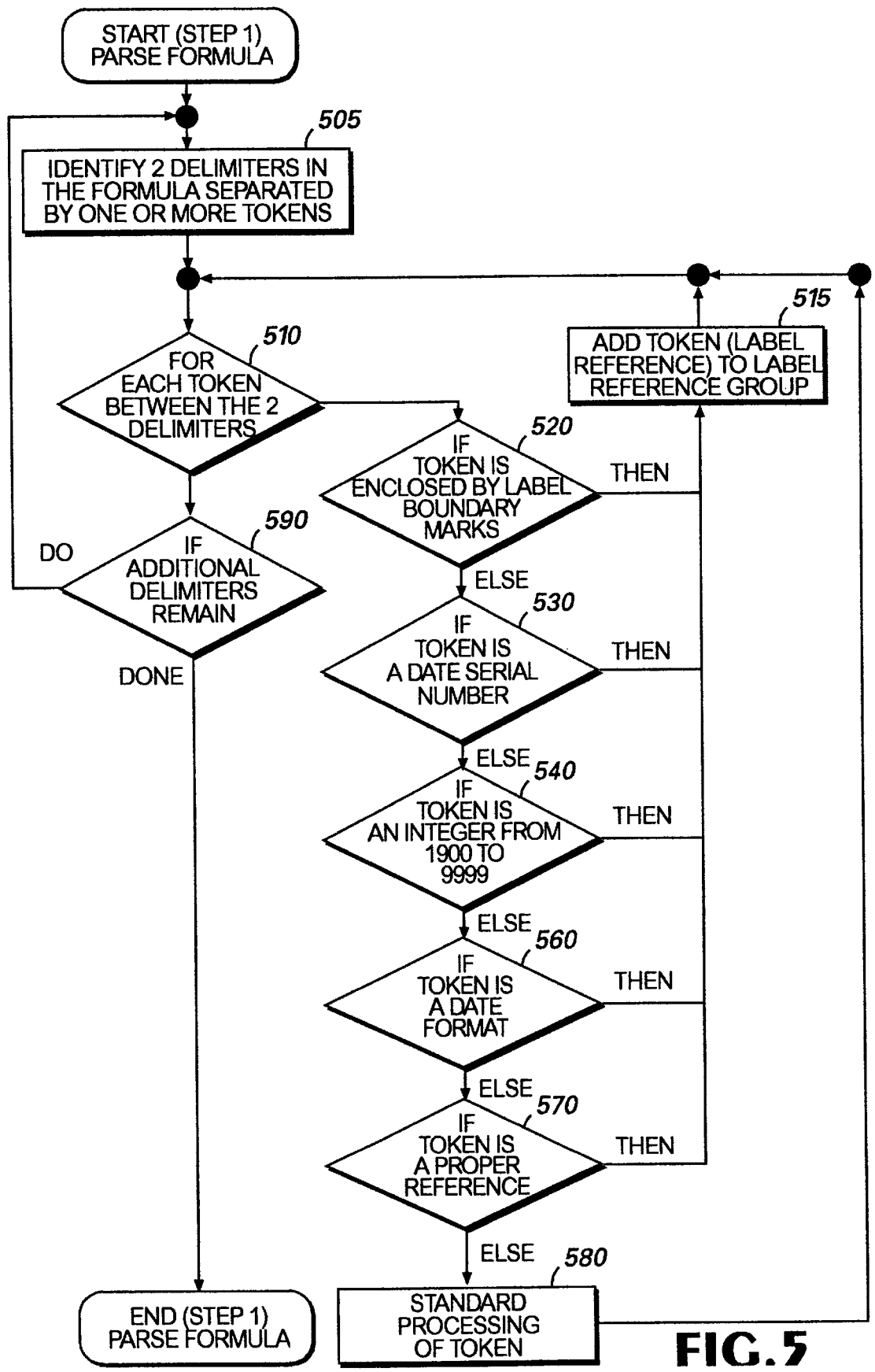
FIG. 5 is a flow diagram illustrating the details of Step 1 of the process for using label references of FIG. 4.

Turning now to FIG. 5, a flow diagram containing the details of Step 1 is provided. Step 1 consists of parsing a formula to identify a group of label references. Because label references can appear in a variety of formats, the process of parsing and identifying label references in the formula can be complicated. For example, the label references can contain spaces and characters that also qualify as operators (i.e., '−', '+', '/', etc.). Thus, when parsing a formula entry, the characteristics of the label and its context must be taken into consideration.

Certain label formats are considered legal or proper. The required formats for legal or proper labels will be described below. Any label format, legal or illegal, can be used if it is enclosed in label boundary marks. In the preferred program, the label boundary marks are single quotes and are referred to as ticks. Two ticks in a row are used for embedding single quotes within a label (i.e., the 2 are translated into 1).

Leading and trailing spaces are ignored unless the reference in the formula includes the spaces explicitly by enclosing them with ticks. To force a reference to include a leading or trailing space, enclosing ticks are required. For example, if foo<space> is in a cell, a reference to foo would match it. If just foo is in a cell, a reference to 'foo<space>' would not match it.

Note that if a label is enclosed in ticks but does not include leading/trailing spaces, then leading/trailing spaces are ignored just as if no ticks were used. Therefore, the mere use of enclosing ticks doesn't force an exact match on leading/trailing spaces—there must be leading/trailing spaces within the ticks for this to happen. This handles cases where the label requires ticks, but the user is not trying to match spaces, e.g. '% Profit' will match <space> % Profit.

It is common to find spreadsheet labels which identify a month, year, or a particular date. In parsing a formula, two types of date labels must be considered. The first type is where a cell contains a text string which conforms to a known date format (i.e., mm/dd/yy or month, day year etc.). The second type is where the cell contains an actual serial number which corresponds to a date. Thus, the following cell contents are considered to be dates:

(1) an actual serial number displayed in a date format;

(2) any integer between 1900 and 9999 inclusive; and (3) any text string which matches a date as entered by the user in a formula.

Legal or proper labels are those which may be referenced in a formula without the use of ticks. In some embodiments, restrictions may be imposed that limit the structure of proper labels. In one embodiment, the first character of a label may be limited to one of the following characters: letters, backslash, underscore, and, in certain instances, a blank. Additionally, a digit may be used to start a label as long as the entire label doesn't consist solely of number characters (in which case it would be a data-item and not be recognized as a label reference). An exception to this rule may exist for labels that represent years ranging from 1900 and 9999. Number characters are those which are legal in numbers and include the digits, the international decimal point, plus, and minus symbols, and exponential 'e' signs.

The characters following the first character can consist of a combination of all letters, all digits, a period, a question mark, a backslash, an underscore, and a space.

In process block 505 of FIG. 5, the parsing step initially searches the formula to identify two delimiters separated by one or more tokens. This process is complicated by the fact that in some contexts, a character may be used as a delimiter and in others it may be part of the label reference. Thus, in identifying the delimiters, the context of the characters must be considered.

In operation, preference is given to interpreting a delimiting character as a delimiter rather than as a portion of a label. Under this interpretation, if the normally terminated label reference does not match a cell label, an attempt to match longer label references which incorporate the would-be delimiter character is performed. Using one of the delimiting characters in a label runs the risk that a shorter label reference will match an unintended label in a cell. For example, with the label reference ab*3, the preferred embodiment would first attempt to find a label containing ab. If a match is not found, then a search for ab*, and if necessary, ab*3 is performed (in operation, a list of all cell entries that begin with ab may be created during the initial search, so that each of these match attempts would not require a separate search). If the intended purpose of the above formula was to reference the label ab*3 but an ab label exists in a spreadsheet cell, the reference ab*3 would have to be enclosed in ticks to prevent the label ab from being chosen.

In another embodiment, this decision process can be facilitated by the use of syntax checks. If a selected label reference would produce a syntax error, the formula will be examined for a longer match that does not produce a syntax error. If this longer match can not be found, then the shorter match will be used (with an ensuing syntax error). For example, if the formula contained =ab*/c, the token ab would be chosen as being between the delimiters '=' and '*'; however, this would result in a syntax error when parsing the remainder of the formula. Noting that a label reference can not begin with the '/' character, the next token in the formula will be c, which is located between the '/' and the end of the formula delimiters. This results in leaving a */ operator which in syntactically incorrect. Thus, the label reference ab* would be chosen in this embodiment if a matching label can be located in a spreadsheet cell.

A special restriction on labels and label references in the preferred embodiment is that valid column and row names must be enclosed in ticks to be used. For example, if B4 is used as a label within a cell, it must be enclosed in tick marks in the label reference. Furthermore, valid column names (i.e. A through IV) can not be used in ranges (e.g., A:C).

In decision block 510, each token and each combination of two or more adjacent tokens which lie between the two delimiters are examined for consideration as a member of the group of label references. In decision block 520, if the token is enclosed by label boundary marks (ticks), then it is considered a member of the label reference group. In decision block 530, if the token is a serial number date, the token is considered in the label reference group. Likewise, in decision block 540, tokens formatted as integers in the range of 1900 to 9999; in decision block 560, tokens which contain text formatted dates; and in decision block 570, any other proper reference is included into the group of label references. Otherwise, process block 580 performs standard processing of the token. The standard processing includes processing of data-items embedded in the formula and also initiating a re-parsing of the formula if necessary.

Once each token and combination of two or more adjacent tokens have been examined, the DONE branch of decision block 510 is followed to decision block 590. In decision block 590, the formula is examined for additional delimiters. If additional delimiters remain, the THEN branch of decision block 590 is followed to process block 505. This ensures that each sequence of delimiter-pairs, not just the first one, is processed. If each of the delimiter-pairs have been processed, then the ELSE branch of decision block 590 is followed to complete Step 1.

For the example shown in FIG. 3 for the formula =January Sales, the delimiters will be the '=' character and the end of the formula. The tokens will be identified as January and Sales. As a final result, Step 1 will generate the following group of label references:

> January
> Sales
> January Sales

Step 2: Identifying target labels

Figure 6:
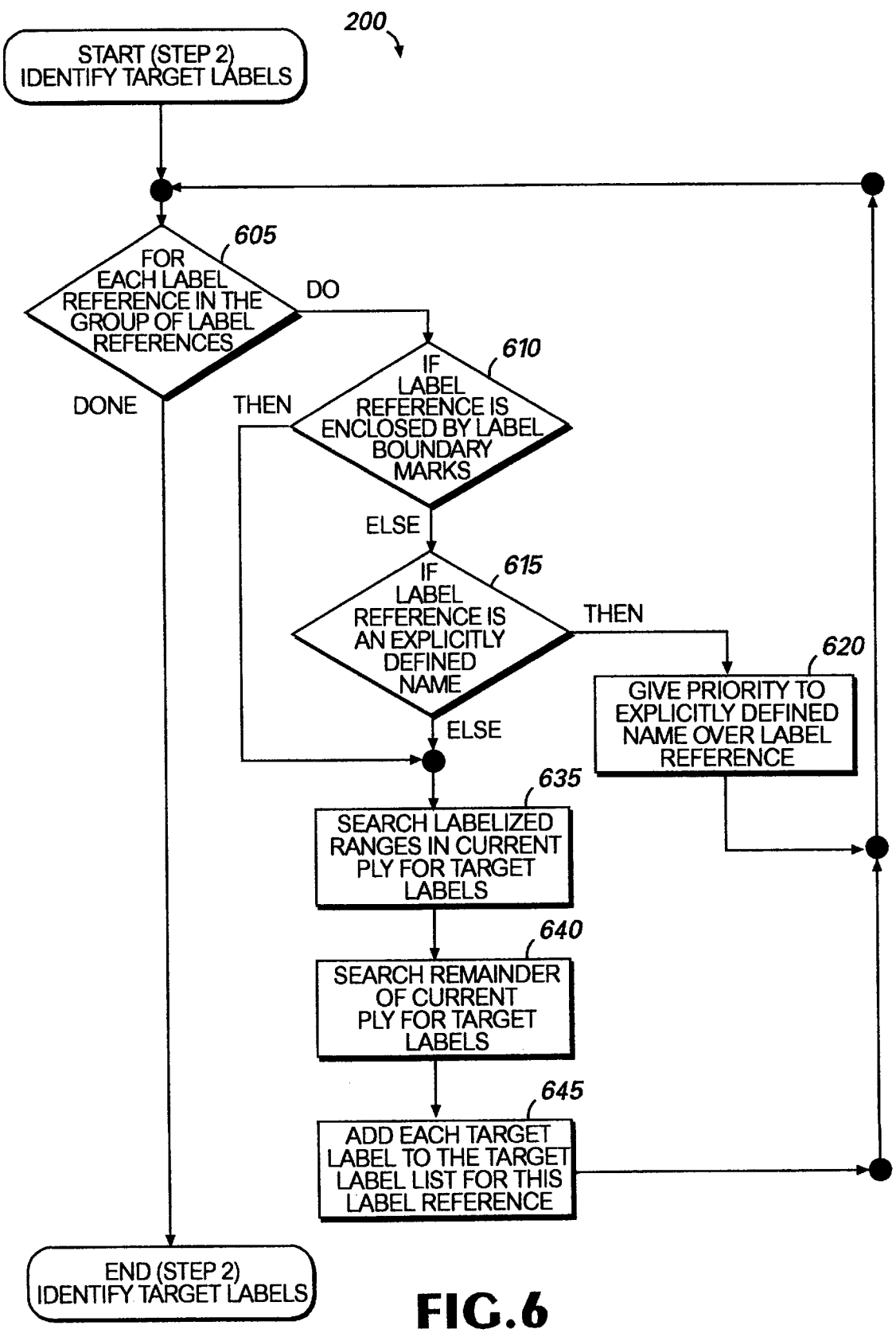
FIG. 6 is a flow diagram illustrating the details of Step 2 of the process for using label references of FIG. 4.

FIG. 6 is a flow diagram of the details of Step 2, which identifies target labels in the spreadsheet for each label reference in the label reference group from Step 1. Generally, this step searches the spreadsheet to identify all the labels that match the label reference. The labels that are identified in this step are referred to as target labels. In essence, upon the completion of Step 2, a list of target labels for each label reference will be generated.

In decision block 605, the DO branch is followed for each label reference. In decision block 610, if the label reference is enclosed in ticks, it is strictly interpreted as a label reference resulting in following the THEN branch to process block 640.

If the label reference is not enclosed in ticks, the preferred program will determine if the reference may qualify as an explicitly defined name reference. In decision block 615, if an explicitly defined name matches the label reference, then the spreadsheet is not searched for a matching label, but rather the defined name is assumed to have been the intended reference. In this case the THEN branch of decision block 615 is followed to process block 620 where any required processing to utilize an explicitly defined name in a formula is performed. Processing then returns to decision block 605. If a matching explicitly defined name is not found, then the ELSE branch of decision block 615 is followed to process block 640.

In process block 640, the remainder of the cells in the active ply are examined for matching labels. This process requires an examination of all the labels on the active ply subject to a few restrictions. Because the spreadsheet may contain multiple instances of a particular label, the searching process is not considered complete upon finding a single matching instance. In order to assure that the intended match is found, all instances of the label must be identified and examined.

In a multiple-ply embodiment, additional processing could be performed prior to process block 640. During this processing, if the first portion of a label reference matches the name of a ply, then the cells on the named ply will be examined for labels that match the remaining portion of a label reference, as shown in process block 630. Thus, if a label on another ply is to be referenced in a formula, the label must be qualified with the ply name. For example in FIG. 3, to reference January Sales located on Sheet 2, then the reference must be entered as Sheet 2 January Sales. The ply name must be the first token in the label reference.

For the example shown in FIG. 3 for the formula =January Sales, the label references in Step 1 include January, Sales, and January Sales. After completing Step 2, the following target labels will be identified:

| | |
|---|---|
| January | located in cells E7 and E20; |
| Sales | located in cell D8; and |
| January Sales | no locations. |

Certain restrictions can be applied to the searching process to help limit the scope of the search. These restrictions rely on determining the data type of the label reference and limiting the search to cells which contain similar data types. Thus, the following two rules can be applied.

1) If the label reference is text, then only cells containing text will be examined.
2) If the label reference contains a number in the range of 1900 to 9999 inclusive, then only cells containing integers will be examined.

Matching of date labels is done as follows. When a date is used in a label reference, the preferred program will determine which of the three possible date components were entered (day, month, year) and then match on only those components. For example, entering the reference 3-May into a formula, may result in finding matching target labels of 3-May-95, 3 May 1994, and 3-May. Thus, a cell containing a date entry which matches the specified components in the reference (in this case day and month) is considered a match. In addition, the contents of the cell will be considered a match regardless of the display format of the date entry. For instance, 3-May, 3/5, and May 3 are three possible display formats which would be considered as a match for the reference 3-May.

Preferably, when a cell contains a date as a text string as opposed to a date entry, the program will perform a text match of all related formats. In this scenario, an exact match between the string as entered and that in the cell is not required. Thus, a cell containing the text strings 3-May-95, 3/5 or May 3 will match a formula reference of 3-May.

Alternatively, when a cell contains a date as a text string as opposed to a date entry, the program may perform a strict text match. In this scenario, an exact match between the string as entered and that in the cell is required. Thus, a cell containing the text strings 3-May-95, 3/5 or May 3 will not match a formula reference of 3-May.

It is common in spreadsheet applications to have repeating sets of column labels. Generally, when this is done, there are distinguishing labels directly above the repeated labels. These types of labels are referred to as "stacked cells". Table I provided below, provides an example of utilizing stacked cells as labels.

TABLE I

| Raw | Purchased | Fabricated | | Monthly Average | | |
|---|---|---|---|---|---|---|
| Class A | Class B | Class C | Month | Class A | Class B | Class C |
| 25 | 17 | 34 | Jan | 24 | 25 | 22 |
| 15 | 18 | 29 | Feb | 27 | 28 | 15 |
| 27 | 27 | 14 | Mar | 17 | 27 | 34 |

In this example, the labels Class A, Class B, and Class C occur twice as column headers; however, they can be distinguished by examining the cells above them. Thus, Raw Class A and Monthly Average Class A can refer to two separate ranges.

In order to utilize "stacked cells" as labels, a reference to "stacked cells", (i.e., Raw Class A) must be treated as a special case. The preferred embodiment will detect when a label reference contains multiple labels which are vertically stacked in cells that have a "proximate relationship" and identify this as a "stacked cell" reference. The proximate relationship is used to interpret the stacked cells as being vertically adjacent and can be defined in several manners. In the example above, the label Monthly Average may be (1) located in a group of merged cells, (2) centered across a group of cells, or (3) located in a single cell within a group of cells enclosed by a bounding formatting border. Each of these methods could be used to create a proximate relationship wherein the label Monthly Average is vertically adjacent to the labels Class A, Class B, and Class C located below it. Other methods for defining the proximate relationship are also anticipated and the present invention should not be limited to the three examples provided.

Step 3: Selecting a preferred label set

The general operation of Step 3 is to (a) examine each of the target labels in each target label list to identify implicit intersection and free radical matches or label sets; (b) examine pairs of target labels, each target label being in separate target label lists, to identify explicit intersection matches or label sets; and then (c) apply rules to eliminate label sets until one final or preferred label set remains. The matches identified in steps (a) and (b) are termed candidate matches. The preferred label set will most likely represent the actual labels that the formula intended to reference.

Often labels will be duplicated within a spreadsheet. When this occurs, Step 2 will result in finding multiple instances of the target label. Thus, when identifying implicit intersections, free radicals, and explicit intersections, each instance of the target label must be examined. For the example illustrated in FIG. 3 for the formula =January Sales, there are two instances of the label January. Thus, when identifying candidate matches, each instance of the label January must be examined. In other words, for each target label identified in Step 2, all possible permutations must be considered as candidate matches. Table II provided below, illustrates the pairing of the target labels identified in Step 2 for the present example to generate the candidate matches. Notice that two target label lists exists. One list contains two instances of the target label January, and the other list contains one instance of the target label Sales.

TABLE II

| Step 2 | | Step 3 | |
|---|---|---|---|
| Target Labels | Location | Candidate Match | Locations |
| January | E7 | January Sales | E7, D8 |
| January | E20 | January Sales | E20, D8 |
| Sales | D8 | | |

Thus, the label reference January Sales, is ambiguous because it refers to two label sets. The last process of Step 3 (c) is to examine the candidate matching label sets to determine which match is preferred or is intended for the formula. This process is accomplished by applying a series of rules which are designed to heuristically identify the matching set of labels that was most likely intended for the formula reference. The rules are based on common usage of labels within spreadsheet tables.

FIGS. 7*a*–*k* are flow diagrams of the details of Step 3, in which candidate matches are selected from the target labels identified in Step 2, and then the ambiguous candidate matches are eliminated and a preferred label set is selected. As mentioned earlier, a candidate match is composed of one or more target labels. Once a target label is included into a candidate match, it is referred to as a candidate label.

In order to identify the preferred label set, any ambiguity in the label references must be eliminated. This is accomplished by invoking a set of rules for various scenarios to help eliminate non-preferred matches. If the rules successfully eliminate non-preferred matches so that only one match remains, then the final match is selected as the preferred match. If the ambiguity can not be resolved, the preferred embodiment will require manual intervention to help eliminate the ambiguity.

Three additional definitions are required in the context of Step 3. First, if a particular match or set of target labels satisfies certain criteria, that match is said to be preferred over all other matches which do not meet that criteria. Thus, the non-preferred matches can be eliminated.

Second, some candidate labels, and hence candidate matches, are eliminated based on a closeness rule. In the closeness rule, given labels A, B, and Z, for label A to be closer than label B to label Z, label A must be closer in one dimension and at least as close in the other. For A to be closer than B in a given dimension, it must be on the same side of Z in that dimension. This makes A closest to Z among the set of A and B. If there are more labels, this condition must be true between A and all the others, but A may be tied in different dimensions with different labels. For example, A may be closer row-wise and tied column-wise with B, while closer column-wise and tied row-wise with C. In this case A would still be the closest label.

Third, a quadrant about a particular cell refers to a particular side of the cell. To create quadrants about a cell, divide the spreadsheet by the row and column that intersect with the cell. Each of the resulting four sections are quadrants about that cell.

The process of identifying and eliminating matches varies based on the type of match that is being examined. Three types of matches are supported in the preferred program and are defined above: explicit intersection matches, implicit intersection matches, and free radical matches.

Figure 7A:
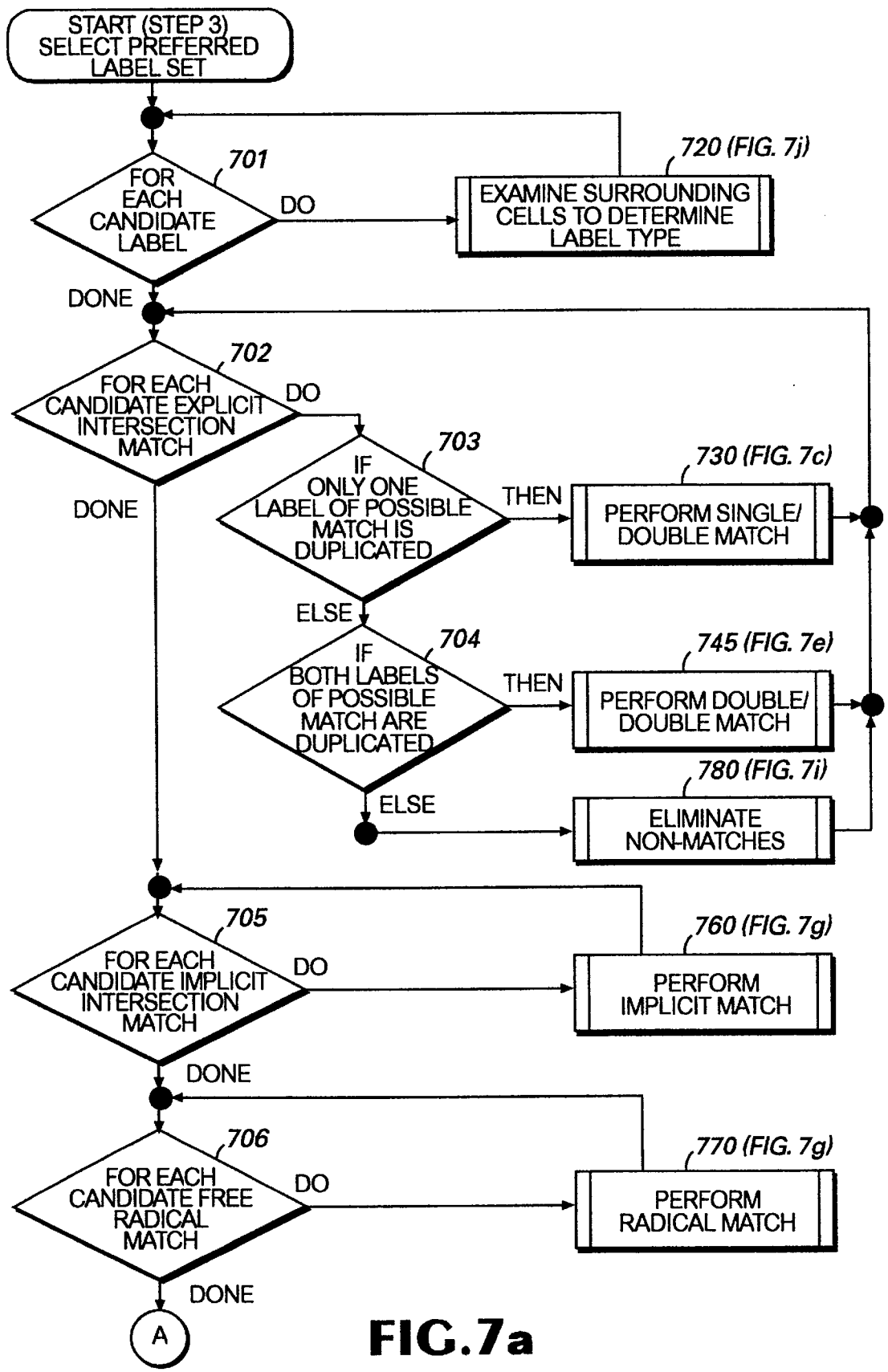
FIGS. 7a–7k are flow diagrams illustrating the details of Step 3 of the process for using label references of FIG. 4.
Figure 7B:
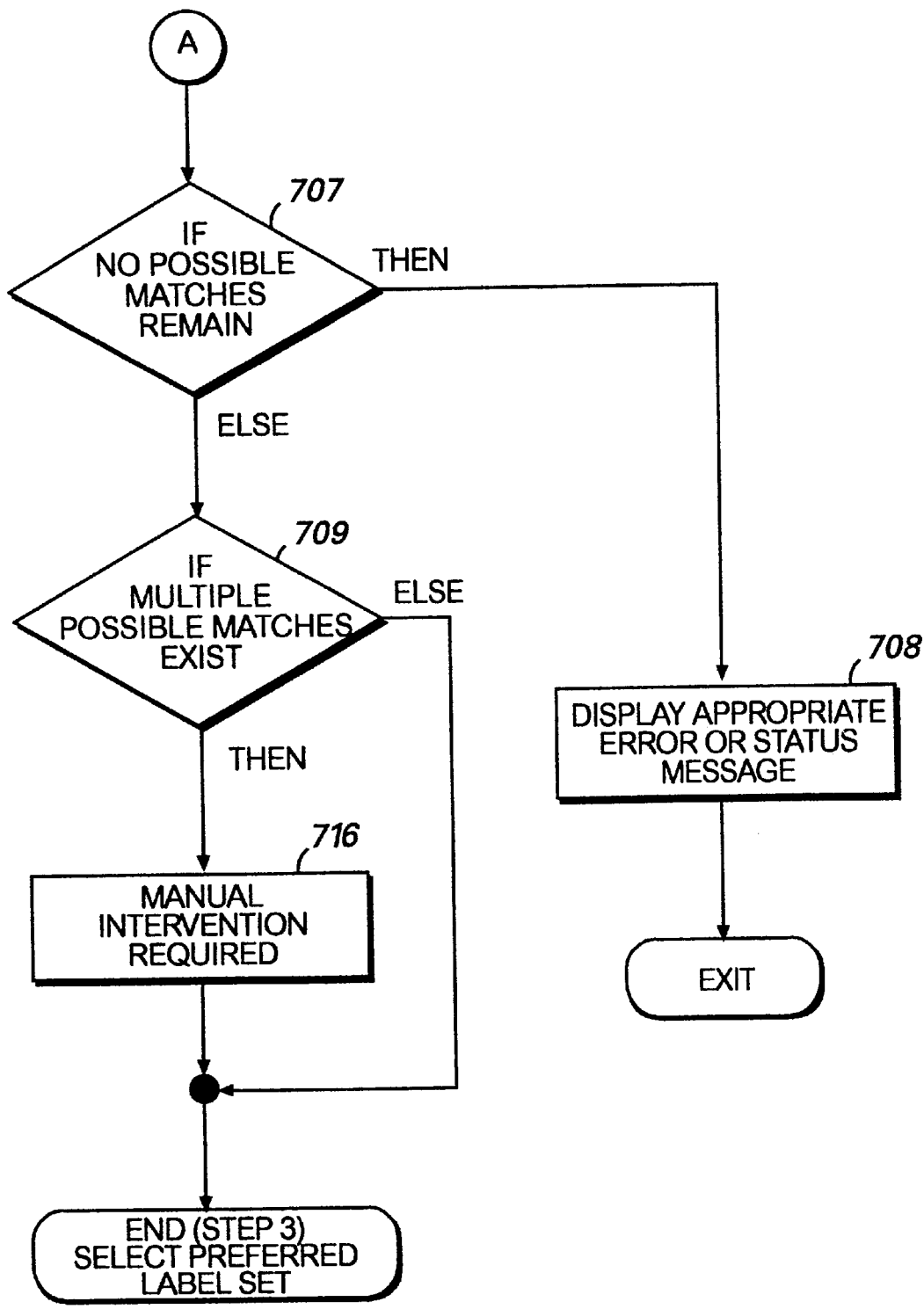

FIG. 7*a* and 7*b* are a flow diagrams illustrating the high-level processing for identifying candidate matches. In decision block 701 of FIG. 7*a*, each of the target labels are subjected to the "Examine Surrounding Cells" process 720. This process attempts to classify a label as a row header or a column header. If the label can not be classified as either, it is identified as indeterminate. Next, a loop established by decision block 702 operates to identify candidate explicit intersection matches; a loop established by decision block 705 operates to identify candidate implicit intersection matches; and a loop established by decision block 706 operates to identify candidate free radical matches.

In FIG. 7*b*, decision blocks 707 and 709 operate to determine if any candidate matches have been found. If no candidate matches exist, the THEN branch of decision block 707 is followed to process block 708 for error or status processing. Typically, a message will be provided to an operator to indicate that the formula does not contain a valid reference and the current process is exited. If only one candidate match is found, then it is considered to be the preferred match and the ELSE branch of decision block 709 is followed which completes Step 3. If several candidate matches have been detected, then Step 3 continues by attempting to eliminate non-preferred matches.

Identifying Label Types: Examining Surrounding Cells

Returning to FIG. 7a, decision block 701 operates to cause the "Examine Surrounding Cells" process 720 to be invoked for each target label. FIG. 7j is a flow diagram of the details of the "Examine Surrounding Cells" process 720. In process block 721 of FIG. 7j, the target label is initially identified as being indeterminate. Indeterminate labels are flexible in whether they are considered to be row headers or column headers. They are never excluded from consideration because they are indeterminate. If a rule or potential match requires a particular indeterminate label to be a row header to stay in consideration, then it is considered to be a row header (and the same for column headers). Alternatively, knowledge that labels are row or column headers helps to exclude them from consideration in some cases; however, a lack of that knowledge simply precludes the label from being excluded.

In process block 722, the data type of the label is examined to determine if it qualifies as text, a date, a year, a number or blank. In process block 723, data types of the cells surrounding the label are examined and compared with the data type of the label. In one embodiment, this process may include examining the first N cells located above the label and the first N cells located below the label for the vertical access, and then examining the first N cells located on the left of the label and the first N cells located on the right of the label for the horizontal access. In decision 724, if the vertical axis has more cells with data types matching the data type of the label than the horizontal axis does, then the label is considered to be a row header and the THEN branch of decision block 724 is followed to process block 725. Otherwise, the ELSE branch of decision block 724 is followed to decision block 726. In decision block 726, if the horizontal axis has more cells with data types matching the data type of the label than the vertical axis does, then the label is considered to be a column header and the THEN branch of decision block 726 is followed to process block 727. If the vertical and horizontal axes have equal numbers of cells with matching data types, then the ELSE branch of decision block 726 is followed and the "Perform Corner Check" process 790 is executed.

In the preferred program, the value of N has been chosen to be two; however, other values for N are anticipated and may be defined based on the type of spreadsheet application. In addition, the test applied for identifying a label as a row header or column header can be accomplished in other manners. For instance, rather than identifying a label as a row or column header based on the greatest number of matches, an alternative constraint can require one dimension (vertical or horizontal) to have X more data type matches than the other. Another variation is to require a minimum number of matches before any decision can be made. For instance, if five matches must be found prior to classifying a label, then if there are 4 matches in the vertical direction and 3 matches in the horizontal direction, the label will remain indeterminate.

Figure 7C:
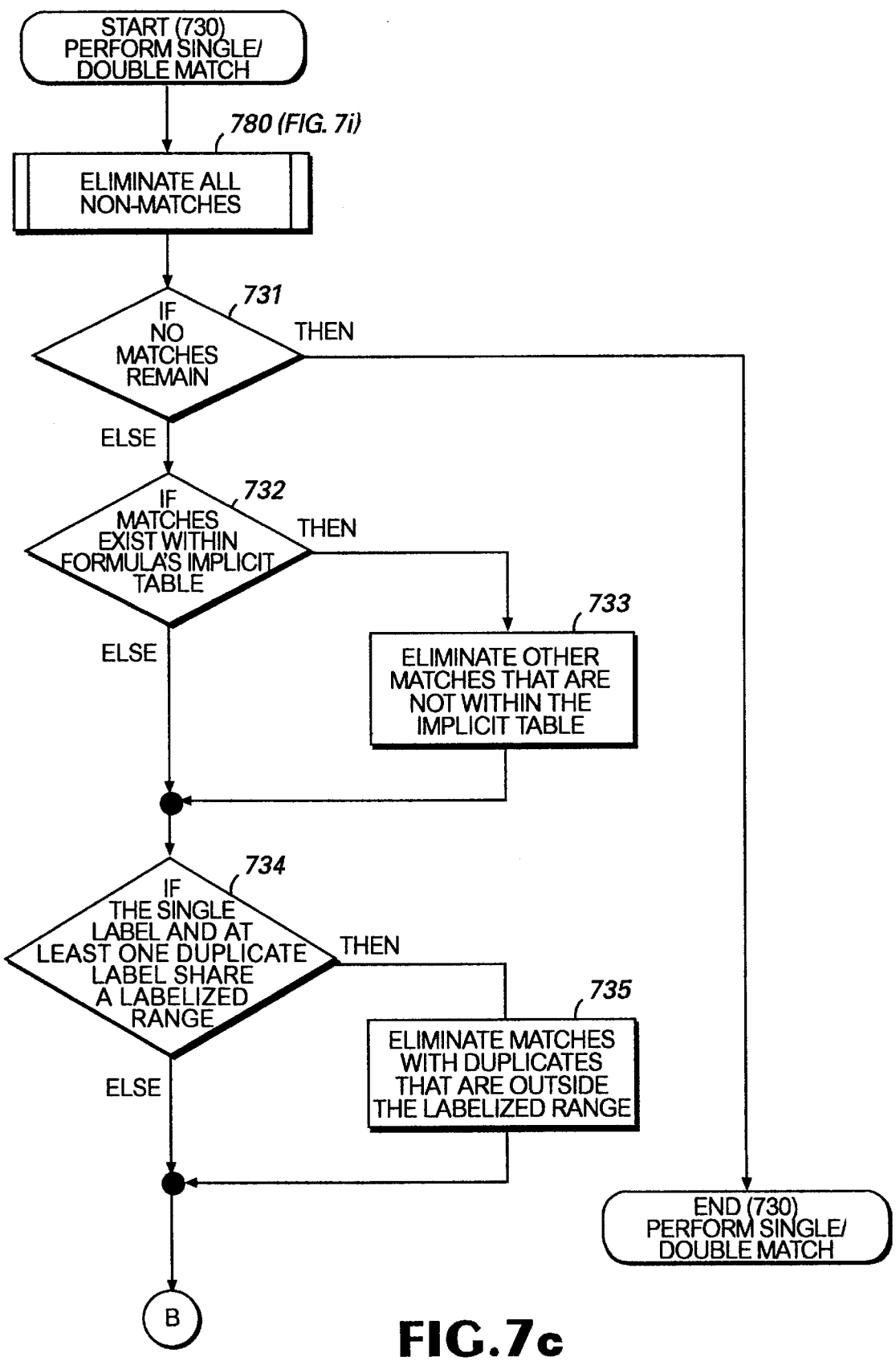
Figure 7D:
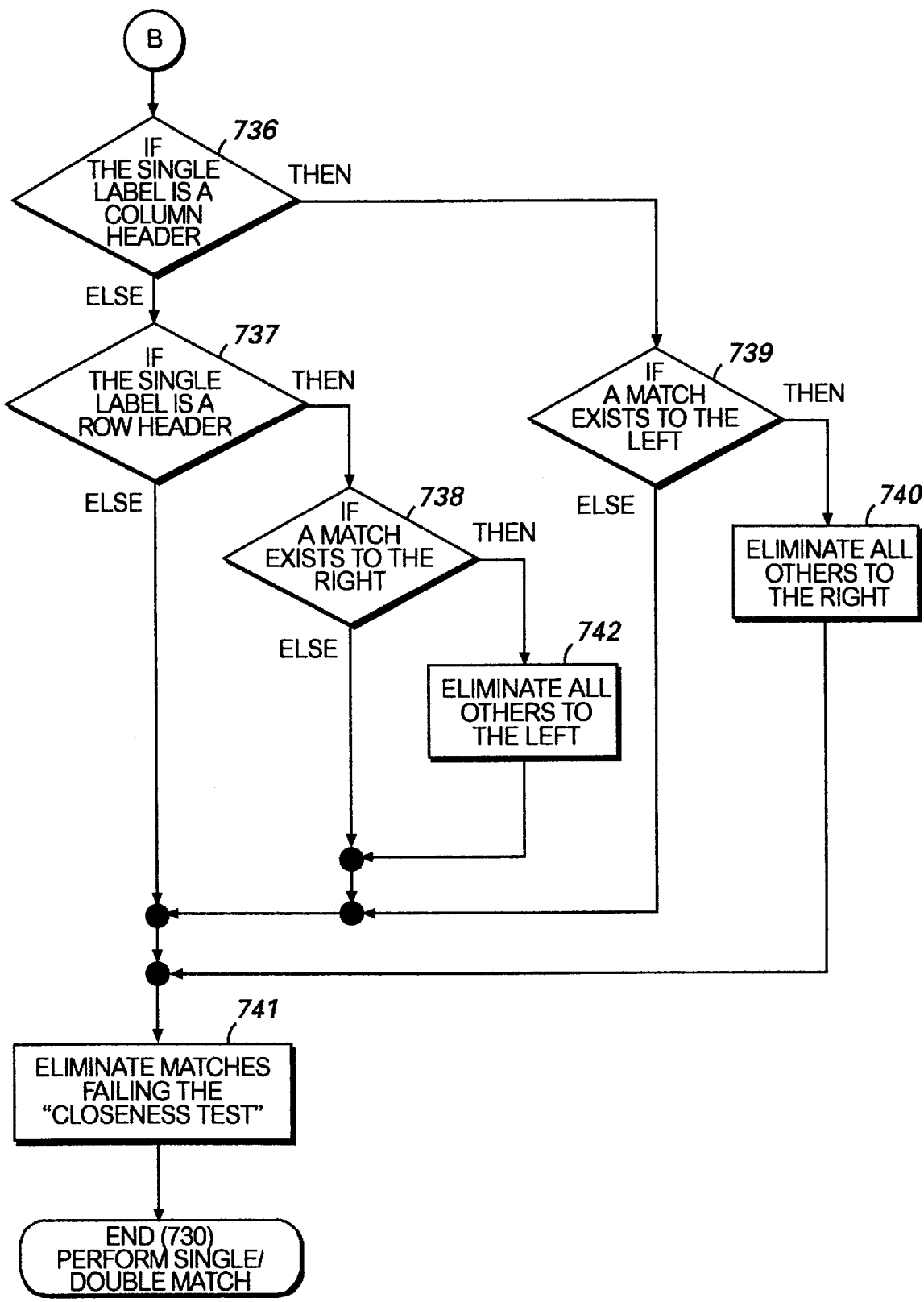
Figure 7E:
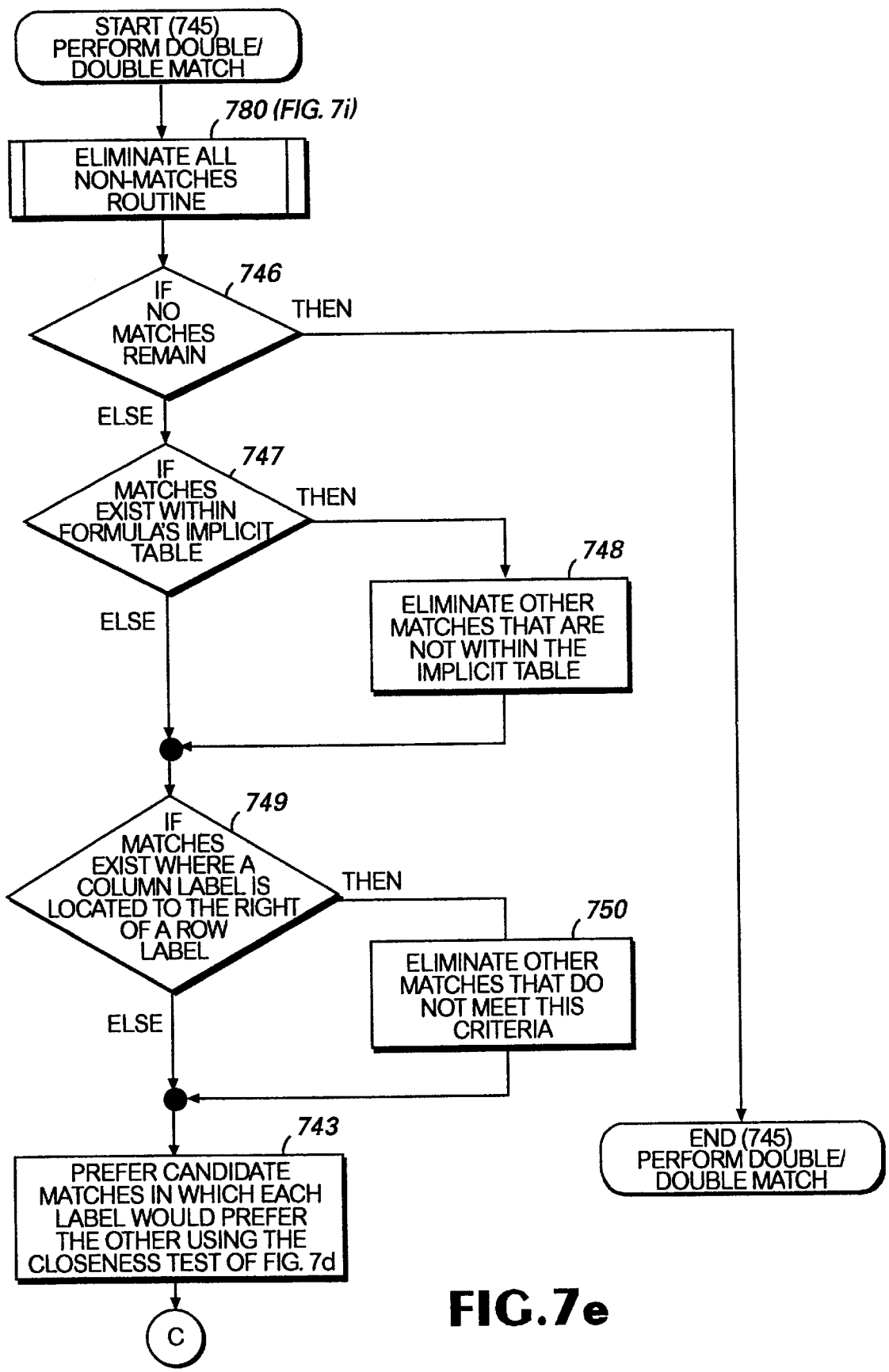
Figure 7F:
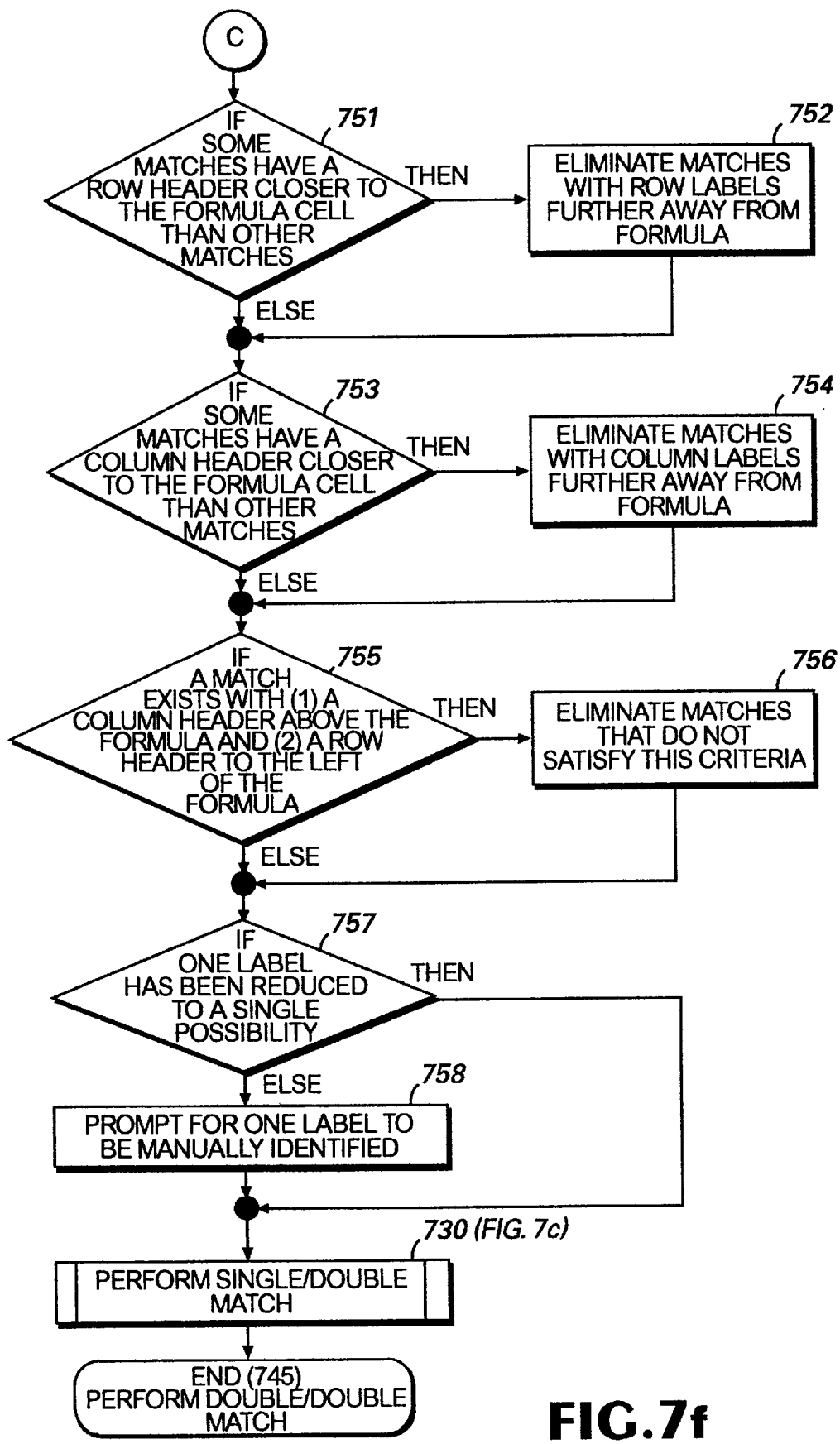
Figure 7G:
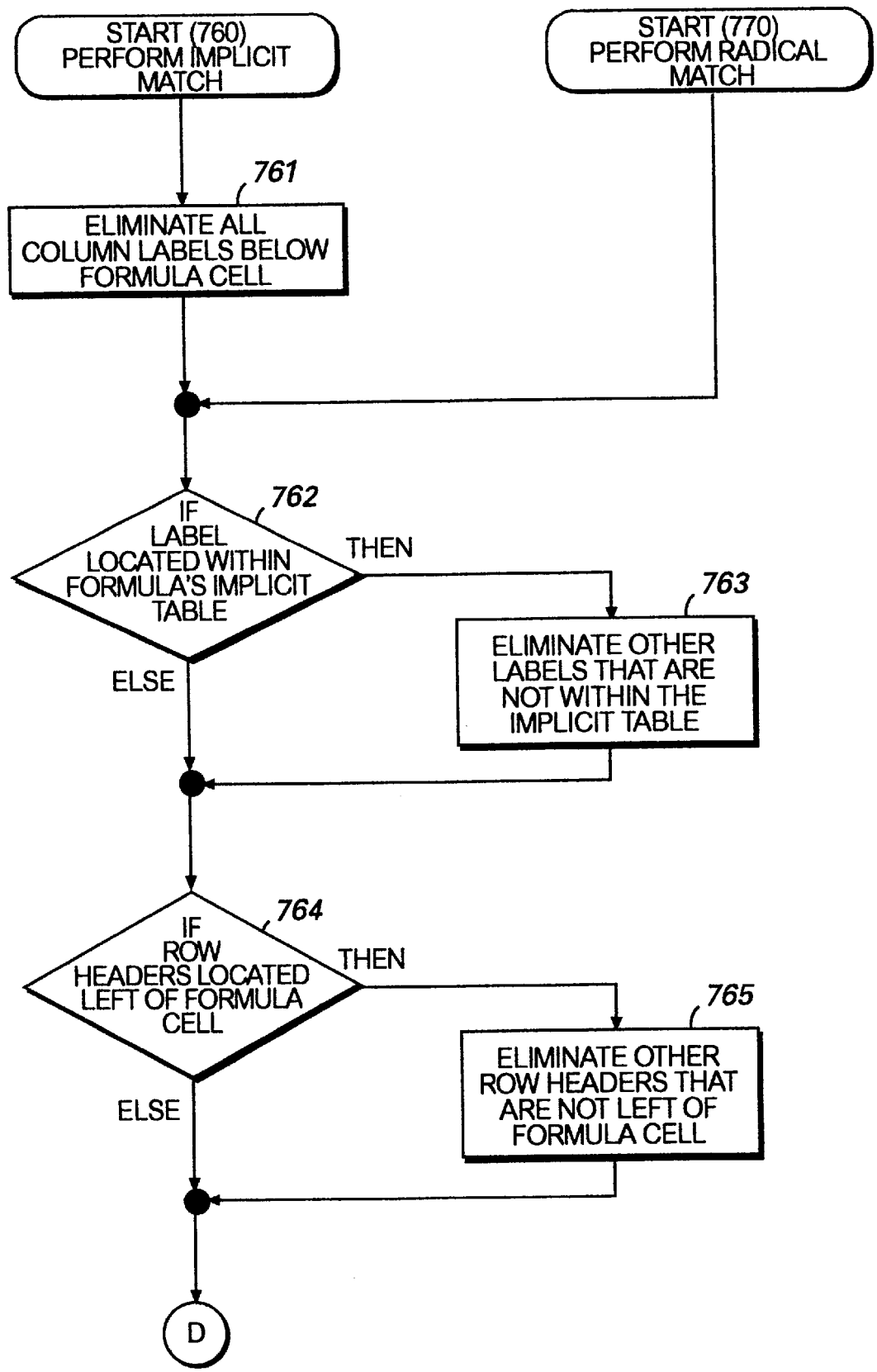
Figure 7H:
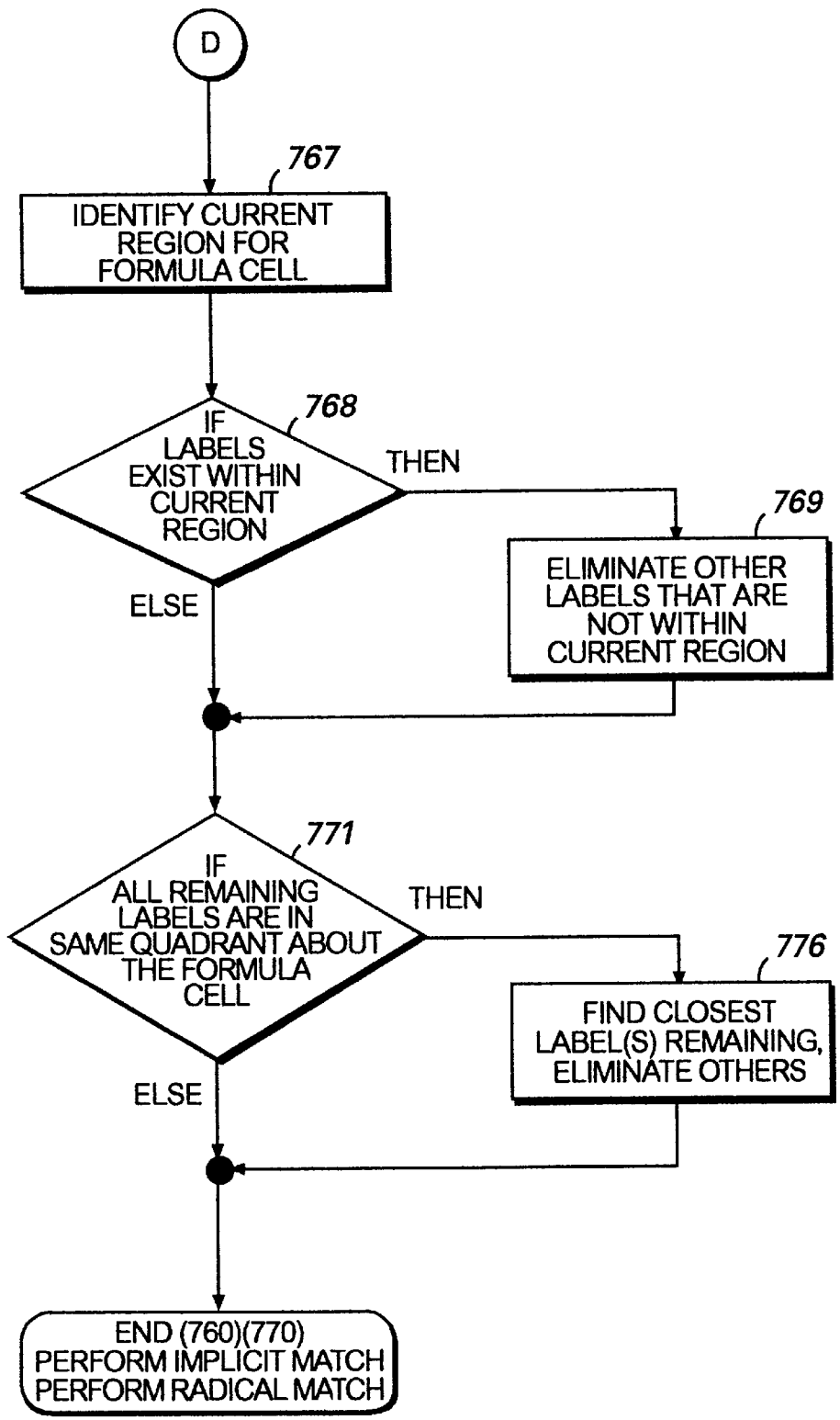
Figure 7I:
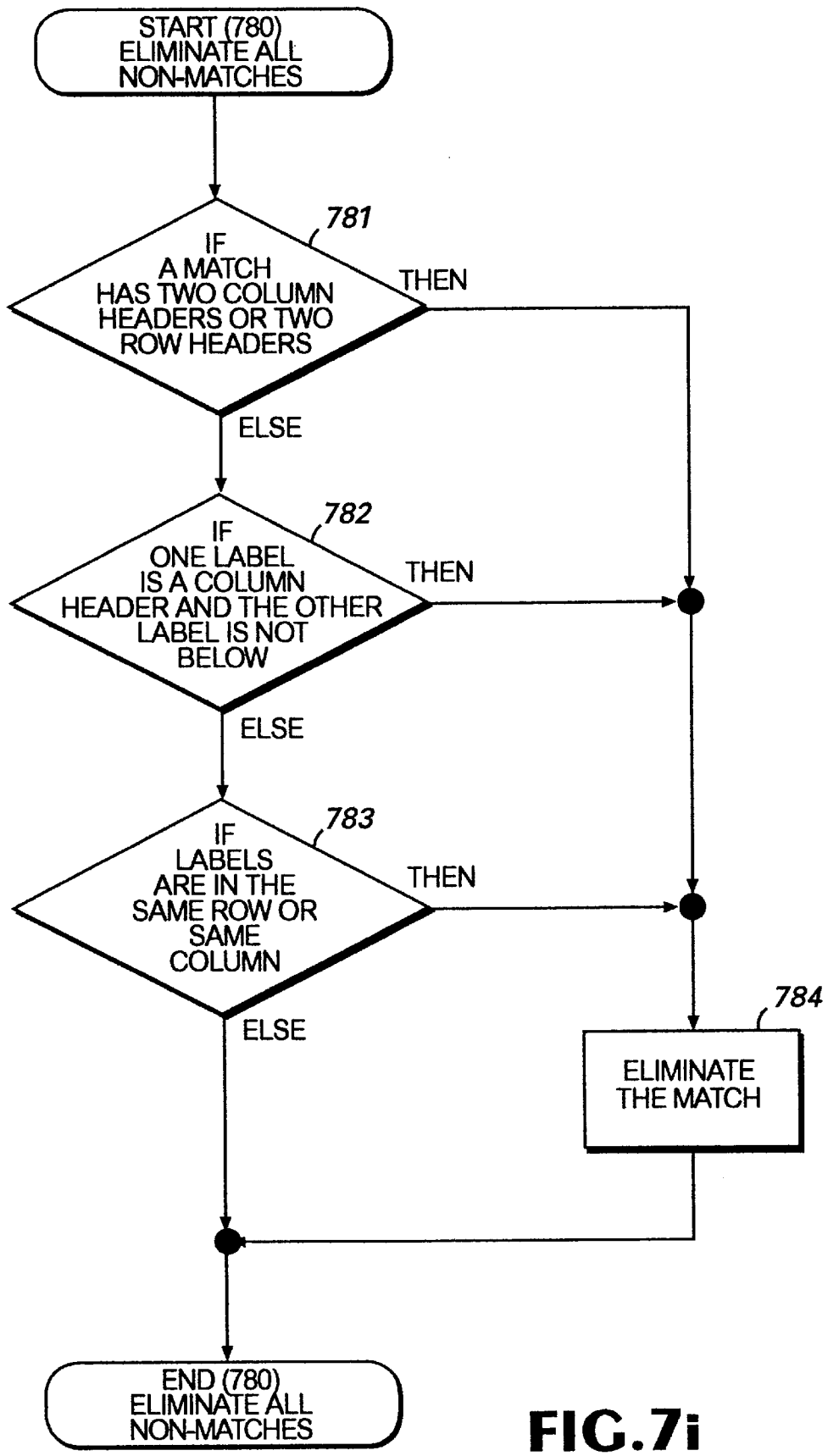
Figure 7J:
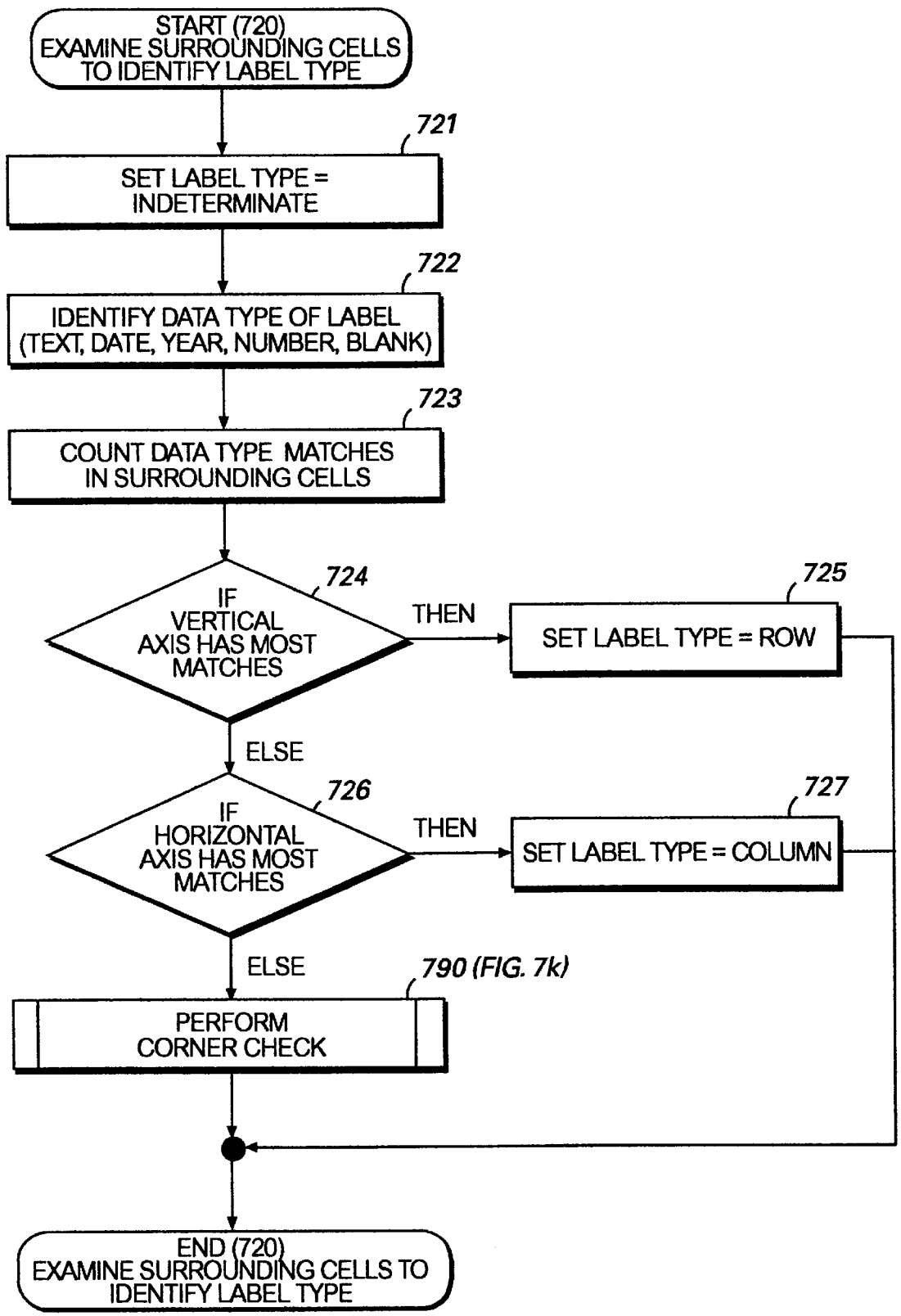
Figure 7K:
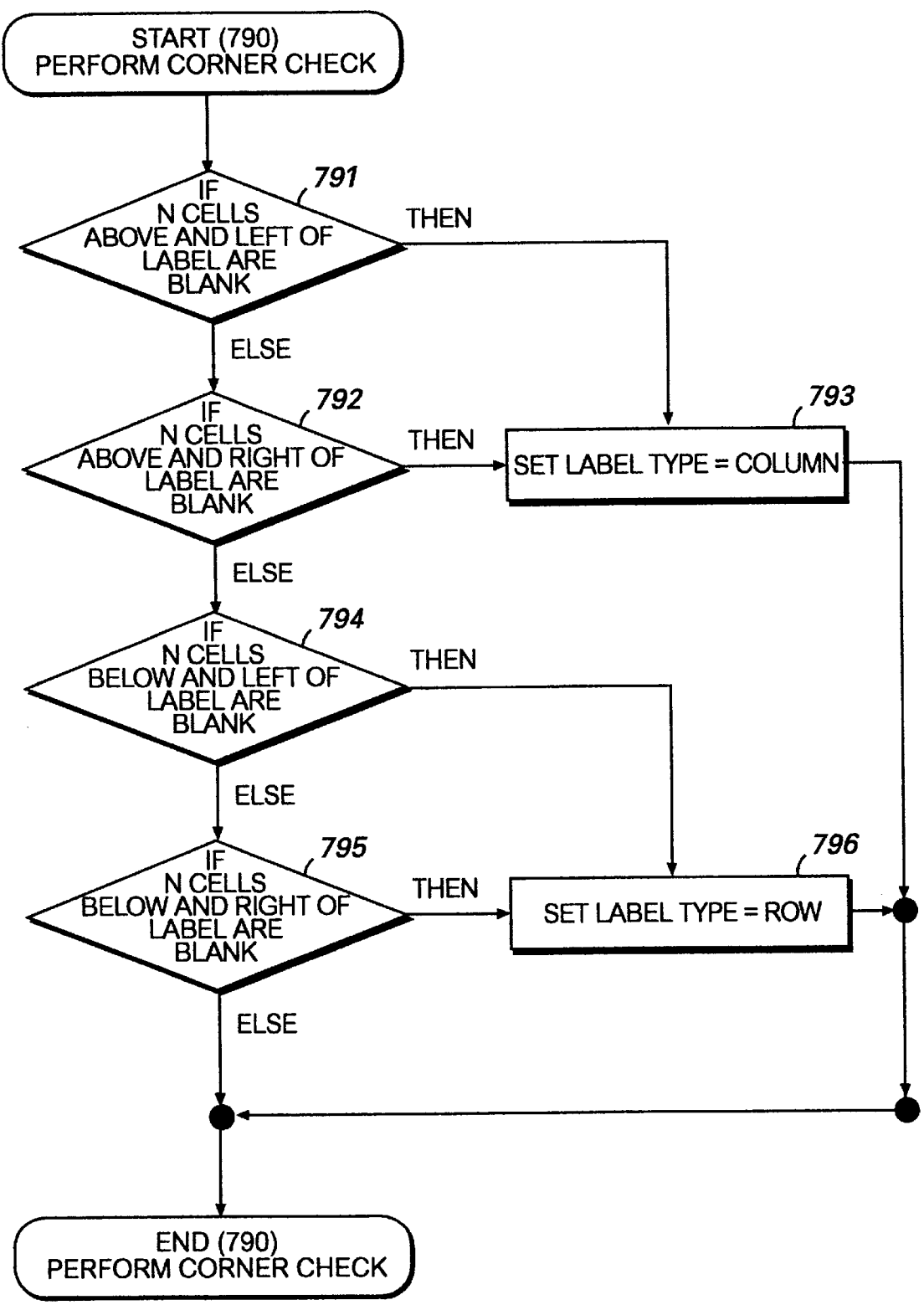

FIG. 7k is a flow diagram of the details of the "Perform Corner Check" process 790. In general, the process operates to determine if the label is located on the corner of a table by examining the cells surrounding the label for blank cells. In decision block 791, if the first N cells located above the label and first N cells located to the left of the label are blank, then the label is considered to be a column header and the THEN branch is followed to process block 793. Otherwise, the ELSE branch is followed to decision block 792. In decision block 792, if the first N cells located above the label and the first N cells located to the right of the label are blank, the label is considered to be a column header and the THEN branch is followed to process block 793. Otherwise, the ELSE branch is followed to decision block 794.

In decision block 794, if the first N cells located below the label and the first N cells located to the left of the label are blank, then the label is considered to be a row header and the THEN branch is followed to process block 796. Otherwise, the ELSE branch is followed to decision block 795. In decision block 795, if the first N cells located below the label and the first N cells located to the right of the label are blank, then the label is considered to be a row header and the THEN branch of decision block 795 is followed to process block 796.

Upon completing the "Perform Corner Check" process 790, processing returns to the invoking process. Thus, in this case, processing returns to the "Examine Surrounding Cells" process 720, which then returns to decision block 701 in FIG. 7a.

After classifying each target label, the DONE branch of decision block 701 is followed to decision block 702.

Candidate Explicit Intersection Matches

Two cases exist for explicit intersection matches. Case 1 occurs when one of the candidate labels in the candidate match is duplicated and the other candidate label occurs only once in the spreadsheet. Case 1 matches are referred to as Single-Double explicit matches. For example, for the reference January Sales in FIG. 3, two cells contain the label January and only one contains the label Sales. Case 2 occurs when both of the candidate labels in the candidate match are duplicated. Therefore, Case 2 matches are referred to as Double-Double explicit matches. An example of a Double-Double explicit match illustrated by FIG. 3 would be January Cost.

In FIG. 7a, for each candidate explicit intersection match, the DO branch of decision block 702 is followed to decision block 703. If the candidate explicit intersection match is a Single-Double match, the THEN branch is followed to the "Perform Single-Double match" process 730. If the candidate explicit intersection match is a Double-Double match, the ELSE branch of decision block 703 and the THEN branch of decision block 704 are followed to the "Perform Double-Double match" process 745. If the candidate explicit intersection match is neither a Single-Double nor a Double-Double, the ELSE branches of decision blocks 703 and 705 are followed to the "Eliminate Non-Matches" process 780. In each of the above cases, processing will return to decision block 702 until each candidate explicit intersection match has been examined.

Single-Double Matches

FIG. 7c is a flow diagram of the details for the "Single-Double matches" process 730. At the onset, the "Eliminate Non-Matches" process 780 is executed. FIG. 7i is a flow diagram of the details for the "Eliminate Non-Matches" process. In this process, several rules are applied which operate to eliminate label sets that do not match.

For the first rule, for two labels to be considered matching, they must not be of the same label type. Thus, if one label is a column label, a matching label must be a row label, and visa versa. In decision block 781 of FIG. 7i, if the candidate labels of the candidate explicit intersection match are of the same label type, the THEN branch is followed to process block 784 to eliminate the matches.

For the second rule, if one of the labels has been classified as a column label, then a matching label must be below it in the spreadsheet (i.e., have a larger row number). This rule is required because, in practice, column labels tend to be above row labels. Thus, if the candidate labels are not of the same label type or one or more of the label types is indeterminate, the ELSE branch of decision block 781 is followed to decision block 782. In decision block 782, if one of the label types is a column header and the other label is not positioned below it, the THEN branch is followed from decision block 782 to process block 784. The candidacy of the match is terminated in process block 784.

For the third, labels within a candidate explicit intersection match can not be in the same row or column. Decision block 783 is entered if (1) the label types for the candidate explicit intersection are not both row or column label types or the labels are both indeterminate, and (2) one label is a column header and the other label is below the column header. In decision block 783, if the labels are in the same row or column, the THEN branch of decision block 783 is followed to process block 784 to eliminate the match as a candidate.

Upon completion of the "Eliminate Non-Matches" process 780, processing returns to decision block 731 in FIG. 7c and additional rules are applied to eliminate candidate matches. In decision block 731, if all of the matches for the Single-Double match have been eliminated, the THEN branch is followed and processing returns to decision block 702 in FIG. 7a. If one or more candidate matches remain, the ELSE branch is followed to decision block 732.

Candidate matches that are within an implicit table are preferred over candidate matches that are not. In decision block 732, if any of the Single-Double matches exists entirely within an implicit table that includes the formula cell, the THEN branch is followed to process block 733. The other candidate matches, which are not entirely within the implicit table (i.e. at least one of the labels is located outside of the implicit table), are eliminated prior to entering decision block 734. If none of the Single-Double matches exist within an implicit table, the ELSE branch of decision block 732 is followed to decision block 734.

Candidate matches that are located within labeled ranges are preferred over candidate matches that are not. In decision block 734, if the single label is in a labeled range and at least one of the doubled labels of the candidate matches are within a labeled range, the THEN branch is followed to process block 735. All candidate matches where the duplicated label is not within a labeled range are eliminated in process block 735. Upon completion of process block 735, processing continues at entrance point B in FIG. 7d. If none of the doubled labels are in a labeled range, the ELSE branch of decision block 734 is followed to point B in FIG. 7d and then to decision block 736.

Generally, column headers in a spreadsheet table are positioned above and to the right of the row headers. Thus, candidate matches that contain a column header positioned to the right of the other label in the match are preferred over other candidate matches. In addition, for the matches meeting this "column header to the right test", a further preference is given to the candidate matches in which the labels are closest together. Thus, in decision block 736 of FIG. 7d, if the single label of a candidate match is a column header, then candidate matches where the duplicated labels are positioned to the left of the single label are preferred. Next, of the preferred candidate matches, the candidate matches in which the duplicated label is closest to the single label are preferred. The THEN branch of decision block 736 is followed to decision block 739 if the single label is a column header. If at least one of the candidate matches has a duplicated label located to the left of the single label, the THEN branch of decision block 739 is followed to process block 740. The other candidate matches containing duplicated labels that are not positioned to the left of the single label are eliminated in process block 740.

Processing then continues in process block 741 where the "closeness test" is applied. If the labels of at least one of the candidate matches are closer together than the labels of the other candidate matches, the other candidate matches are eliminated.

Also, typical spreadsheet tables have row headers positioned below and to the left of column headers. Thus, candidate matches that contain a row header positioned below and to the left of the other label are preferred over other candidate matches. In addition, matches that meet the "row header below and to the left" test and also the "closeness test" described above are preferred over other matches. If the single label in the candidate match is a row header, the ELSE branch of decision block 736 and the THEN branch of decision block 737 will be followed to decision block 738. If at least one of the candidate matches has a duplicated label located below and to the right of the single label, then prefer duplicates that are to the right of the label. In this case, the THEN branch of decision block 738 is followed to process block 742 where the duplicates that are not to the right of the single label are eliminated. Processing then continues in process block 741 where the closeness rule is applied, and then processing returns to decision block 702 of FIG. 7a.

Double-Double Matches

FIGS. 7e–7f, are flow diagrams of the processing details for the "Perform Double-Double Matches" process 745. The "Perform Double-Double Match" process is invoked from FIG. 7a for each Double-Double candidate explicit intersection matches. At the onset, the "Eliminate Non-Matches" process 780 is executed. As described above for Single-Double matches, upon completion of the "Eliminate Non-Matches" process 780, processing returns to decision block 746 of FIG. 7e. At this point, additional rules are applied to eliminate remaining ambiguous candidate matches. In decision block 746, if all of the matches for the Double-Double match have been eliminated, the THEN branch is followed and processing returns to decision block 702 of FIG. 7a. If one or more candidate matches remain, the ELSE branch is followed to decision block 747.

Candidate matches that are within an implicit table that includes the formula cell are preferred over those that are not. In decision block 747, if any of the Double-Double matches exist entirely within an implicit table, the THEN branch is followed to process block 748. The other candidate matches which are external to this implicit table are eliminated in this step prior to entering decision block 749. If none of the Double-Double matches exist within the formula's implicit table, the ELSE branch of decision block 747 is followed to decision block 749.

As previously mentioned, column headers in a spreadsheet are typically located above and to the right of row headers. Matches which meet this criteria are preferred over those that do not. In decision block 749, if candidate matches exist in which a label classified as a column header is located to the right of a label classified as a row header, the THEN branch is followed to process block 750. The other candidate matches that do not meet this criteria are eliminated in this process block. In another embodiment, the process block 750 can be modified to include the closeness rule that was described above in the Single-Double match processing. Processing then continues in block 742.

In process block 743, candidate matches are preferred in which each label would prefer the other using the "closeness test" of FIG. 7d. For the purposes of this test, assume that each label is a single and then determine which partner it would prefer using the "closeness test". If there is a candidate match in which each label prefers the other using this test, then this candidate match is preferred. Thus, the portion of the flow diagram of FIG. 7d beginning at entrance point B to the END (730) is executed. Processing then continues in decision block 751 in FIG. 7f at entrance point C.

In decision block 751, if at least one of the candidate matches has a label classified as a row header and that label is closer to the cell containing the formula than other row header labels in other matches, the THEN branch is followed to process block 752. In process block 752, the matches with row headers that do not meet the closeness test of decision block 751 are eliminated. In either case, processing continues in decision block 753.

In decision block 753, if at least one of the candidate matches has a label classified as a column header and that label is closer to the cell containing the formula than other column headers in other matches, the THEN branch is followed to process block 754. In process block 754, the matches with column headers that do not meet the closeness test of decision block 753 are eliminated.

Another common tendency within a spreadsheet is for formulas to be positioned below the column headers and to the right of the row headers that they reference. Candidate matches which meet this criteria are preferred over other candidate matches. In decision block 755, if a candidate match exists where (1) one label is classified as a column header and is above the formula cell and (2) the other label is classified as a row header and is located to the left of the formula cell, the THEN branch is followed to process block 756. In process block 756, all other candidate matches which do not meet this criteria are eliminated prior to entering decision block 757.

In decision block 757, if the elimination rules have not resulted in reducing one of the duplicated labels to a single instance (reduce the Double-Double match to a Single-Double match), then manual intervention is required to identify one of the intended references. If one of the matches has been reduced to a single instance, either by the elimination process or by manual intervention, the "Single-Double Match" process 730 is invoked for this Single-Double match set.

Upon completion of the "Single-Double Match" process 730, processing will continue at decision block 702 in FIG. 7a.

Other Candidate Explicit Matches

Two other scenarios may exist for candidate explicit matches. The first scenario is when a Single-Single candidate match is found. For Single-Single candidate matches, the ELSE branches for decision blocks 703 and 704 are followed to the "Eliminate Non-Matches" process 780. As described above, the "Eliminate Non-Matches" process 780 operates to eliminate matches that are not valid.

The second scenario is when one of the labels is duplicated and the other label can not be found on the spreadsheet (e.g., it may be misspelled or non-existent).

Candidate Implicit Intersection Matches

As described above, an implicit match occurs when one label is entered into a formula and the label intersects with the cell containing the formula. The formula =Sales in cell F13 of FIG. 3 is an example of an implicit intersection match.

When a non-duplicate implicit intersection is entered, additional rules for determining whether the label is a row header or a column header are used. Specifically, inferences can be made from examining the position of the label relative to the formula cell. With duplicate labels, these inferences can not be made, because there is no a priori assurance that there is a relationship between a given label and the formula cell. When just one instance of a label exists for a formula label reference, the location of the label conveys information concerning the intersection. In contrast, when there are multiple instances of a label for a formula label reference, only one of them will have a preferred S relationship to the formula cell. Thus, in these cases, no inferences can be made because the actual label has not been identified. Therefore, when eliminating candidate matches for a duplicate implicit intersection, each label is examined and classified as a row header, a column header or indeterminate. This classification is made based on the cells surrounding the respective labels, independent of the label's position to the formula cell. This is not an issue for explicit intersection, because the row and column header determination is made on the basis of the relationship of the two labels to each other, not to the formula cell.

In the loop defined by decision block 705 in FIG. 7a, each of the candidate implicit intersections are examined for valid matches and non-preferred matches are eliminated. Thus, for each candidate intersection match, the DO branch of decision block 705 is followed and the "Perform Implicit Match" process 760 is invoked.

FIGS. 7g–7h are flow diagrams of the details of the "Perform Implicit Match" process. In process block 761, all column labels located below the formula cell are eliminated. Processing then continues in decision block 762.

Candidate implicit intersection matches where the label is located within an implicit table containing the formula are preferred over other matches. In decision block 762, if at least one of the labels is located within the same implicit table as the formula cell, the THEN branch is followed to process block 763, and the labels not within the same implicit table are eliminated. Processing then continues in decision block 764.

Candidate implicit intersection matches, where a row header, if one has been identified, is located to the left of the formula are preferred over other matches. In decision block 764, if at least one of the labels is classified as a row header and is located to the left of the cell containing the formula, the THEN branch is followed to process block 765. In process block 765, any labels that (1) are classified as row headers and (2) are not located to the left of the formula cell are eliminated prior to entering process block 767 at entrance point D of FIG. 7h.

Candidate implicit intersection matches where the label is located within the current region of the formula are preferred over other remaining candidate matches. In process block 767 of FIG. 7h, the current region for the formula cell is determined. As defined above, the current region is those cells contained within the smallest rectangular border of blank cells surrounding the formula cell. Upon determining the current region for the formula cell, decision block 768 is entered. In decision block 768, if at least one of the labels is located within the formula's current region, the THEN branch is followed to process block 769. The labels positioned outside of the formula's current region are eliminated in process block 769.

If all of the candidate implicit intersection matches are located within the same quadrant of the formula, then ones closest to the formula are preferred over the others. In decision block 771, if all of the remaining labels are located in the same quadrant about the formula cell, the THEN branch is followed to process block 776. The labels that are closest to the formula are identified in step 776 and all other labels are eliminated. Processing then returns to decision block 705 of FIG. 7a. If all of the candidate implicit matches have been processed, the DONE branch of decision block 705 is followed to decision block 706.

Free Radical Matches

As described above, the definition of a free radical match is that it resolves to multiple cells, as a result of being used in a function that operates over a range of cells. The formula =SUM('Days In') in cell H21 of FIG. 3 is an example of a free radical match.

The same rules apply for free radicals as for implicit intersection, with two modifications:

1. labels can be in the same row or column as the formula cell; and
2. column labels can be below the formula.

In decision block 706 in FIG. 7a, for each possible free radical match, the "Perform Radical Match" process 770 is invoked. Examining FIG. 7g, the "Perform Radical Match" process 770 is shown to be identical to the "Perform Implicit Match" process 760, with the exception that the process block 761 is bypassed. Upon completion of the "Perform Radical Match" process, processing returns to FIG. 7b in decision block 707.

Additional Elimination Rules

As previously described, if more than one candidate match still exists at this point, the ELSE branch of decision block 707 and the THEN branch of decision block 709 in FIG. 7b will be followed to process block 716 where manual intervention is required completing Step 3. Processing then returns to start Step 4 (FIG. 4).

In an alternative embodiment, additional rules can be applied prior to invoking manual intervention. For instance, one rule may be applied when some candidate matches contain longer label names than others. As an example, an implicit intersection match may contain the label reference February Cost. In addition, an explicit intersection match may contain the two label references, February and Cost. In this example, the implicit intersection match contains a longer label than the explicit intersection match. If the formula is located within an implicit table which contains a match for a longer label reference, then candidate matches which contain longer labels can be preferred over matches containing shorter label names. Another rule is to prefer explicit intersection matches over other types of matches. Thus, if an explicit intersection match and an implicit intersection match remain, the implicit intersection match can be eliminated.

Step 4: Determining the range of cells referenced

Once a preferred label set has been identified, the remaining step is to determine the actual cells that are referred to by the preferred label set. The preferred label set can be either an explicit intersection, implicit intersection or free radical. The rules applied in determining the cell or cells referenced by the preferred label set depend on the type of match.

Figure 8A:
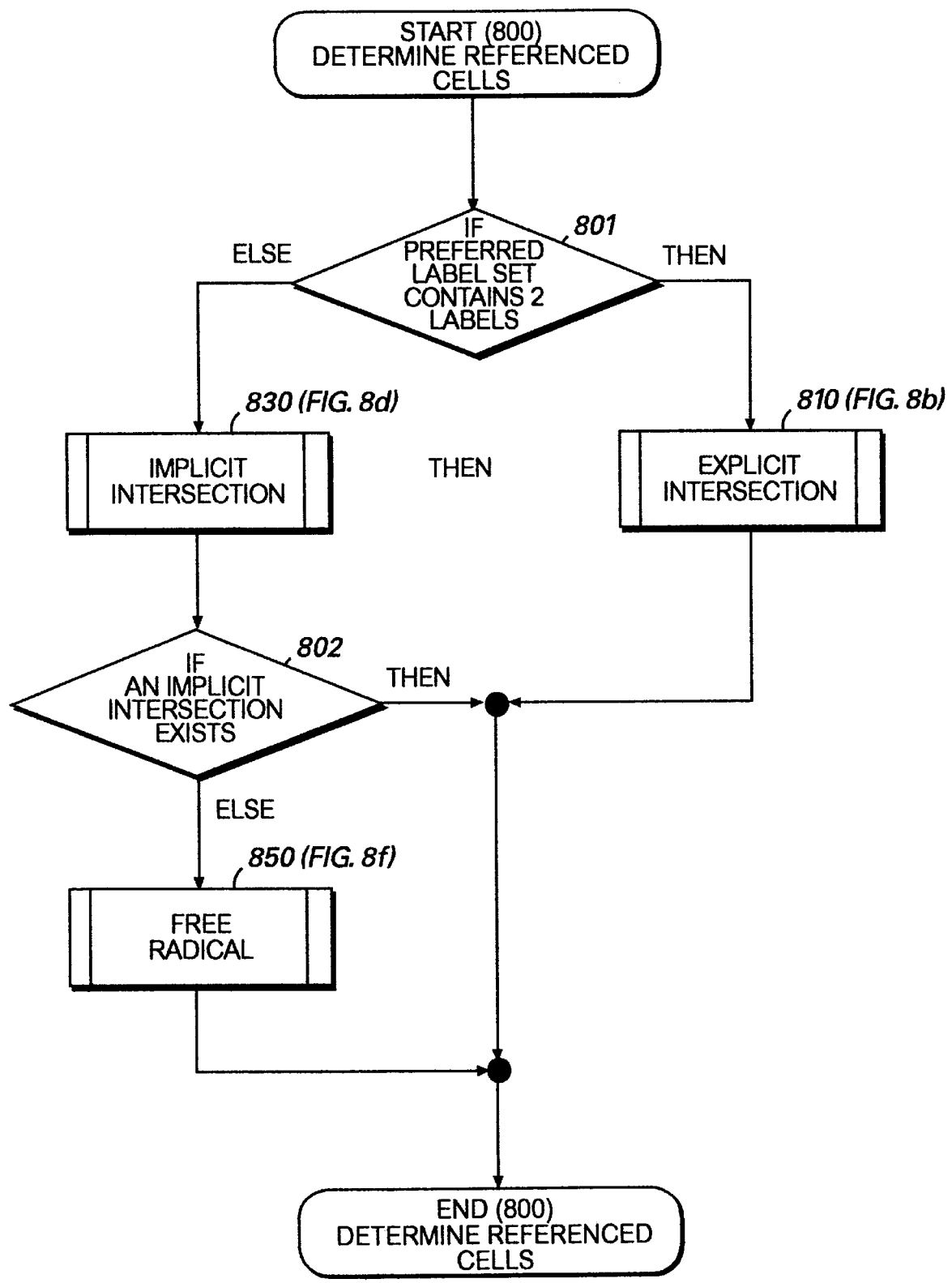
FIGS. 8a–8g are flow diagrams illustrating the details of Step 4 of the process for using label references of FIG. 4.

FIG. 8a is a flow diagram illustrating the high-level processes of Step 4. In decision block 801, if the preferred label set contains two labels, the THEN branch is followed to "Explicit Intersection" process 810. Otherwise, the ELSE branch is followed to the "Implicit Intersection" process 830. If the "Implicit Intersection" process 830 does not result in identifying an implicit intersection, the ELSE branch of decision block 802 is followed to the "Free Radical" process 850. If an implicit intersection is identified, the THEN branch of decision block 802 is followed and Step 4 is completed. Likewise, upon returning from processes 810 and 850, Step 4 is also completed.

Explicit Intersections

As described above, the formula =January Sales in cell E13 of FIG. 3 is an explicit intersection. Actually, there are three cells at the intersection of January and Sales: E8, D7 and D20. In all instances, it is assumed that the column header is above the intersection. Thus, in this example, the intersection would be cell E8.

There are two valid layouts for explicit intersections. In one layout, a column header is positioned above and to the right of a row header. In the second layout, a column header is positioned above and to the left of a row header. Any other combinations are not considered valid.

In practice, the first layout is most common. However, the second layout could arise when a column with labels is on the right side of the table or in the interior of the table. For example, it is common to have an account number in the leftmost column of a budget with a text description in the column to the right of it. Conceivably, an operator may want to refer to the account number by inserting the text description into a formula.

Figure 8B:
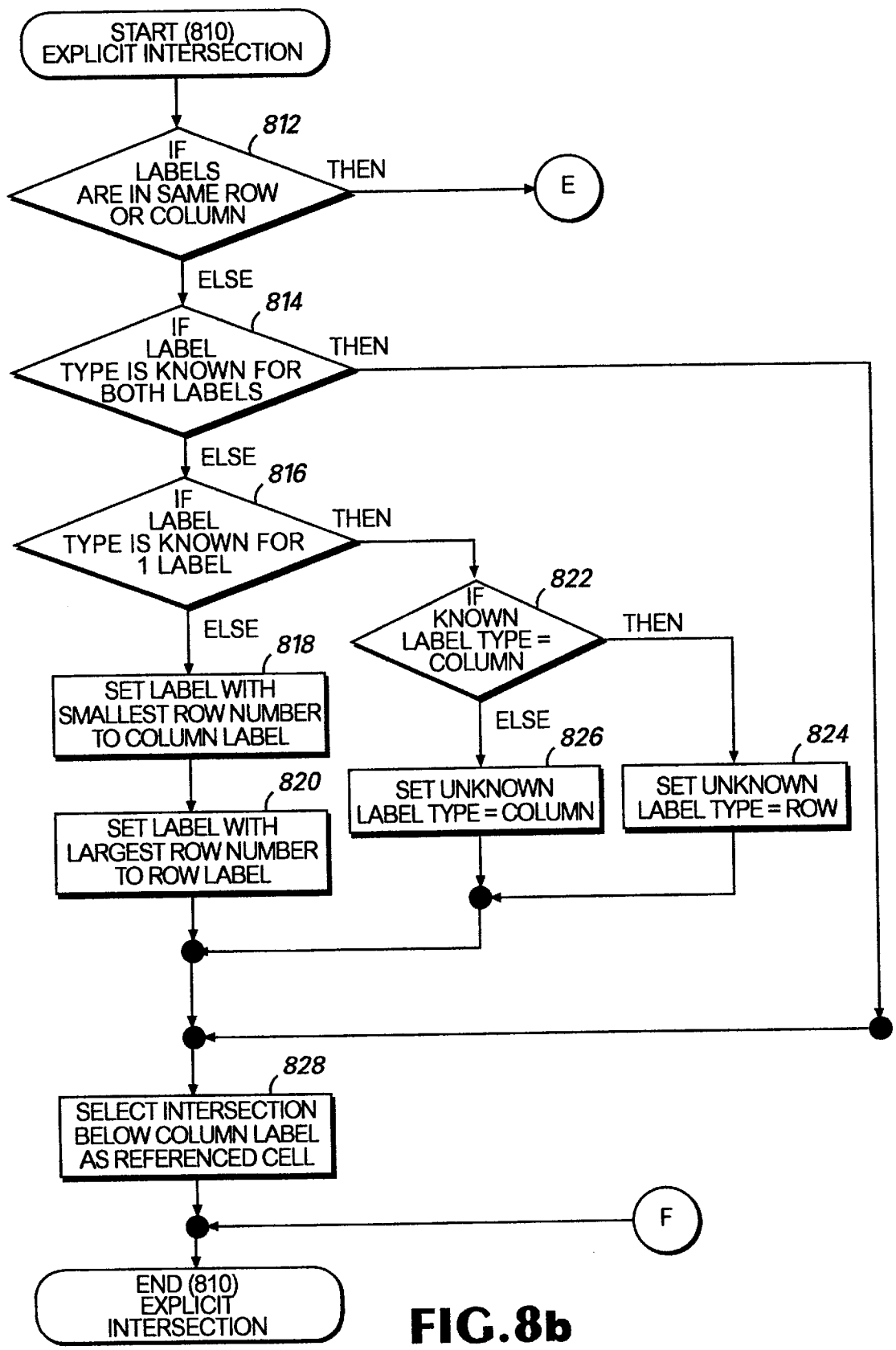
Figure 8C:
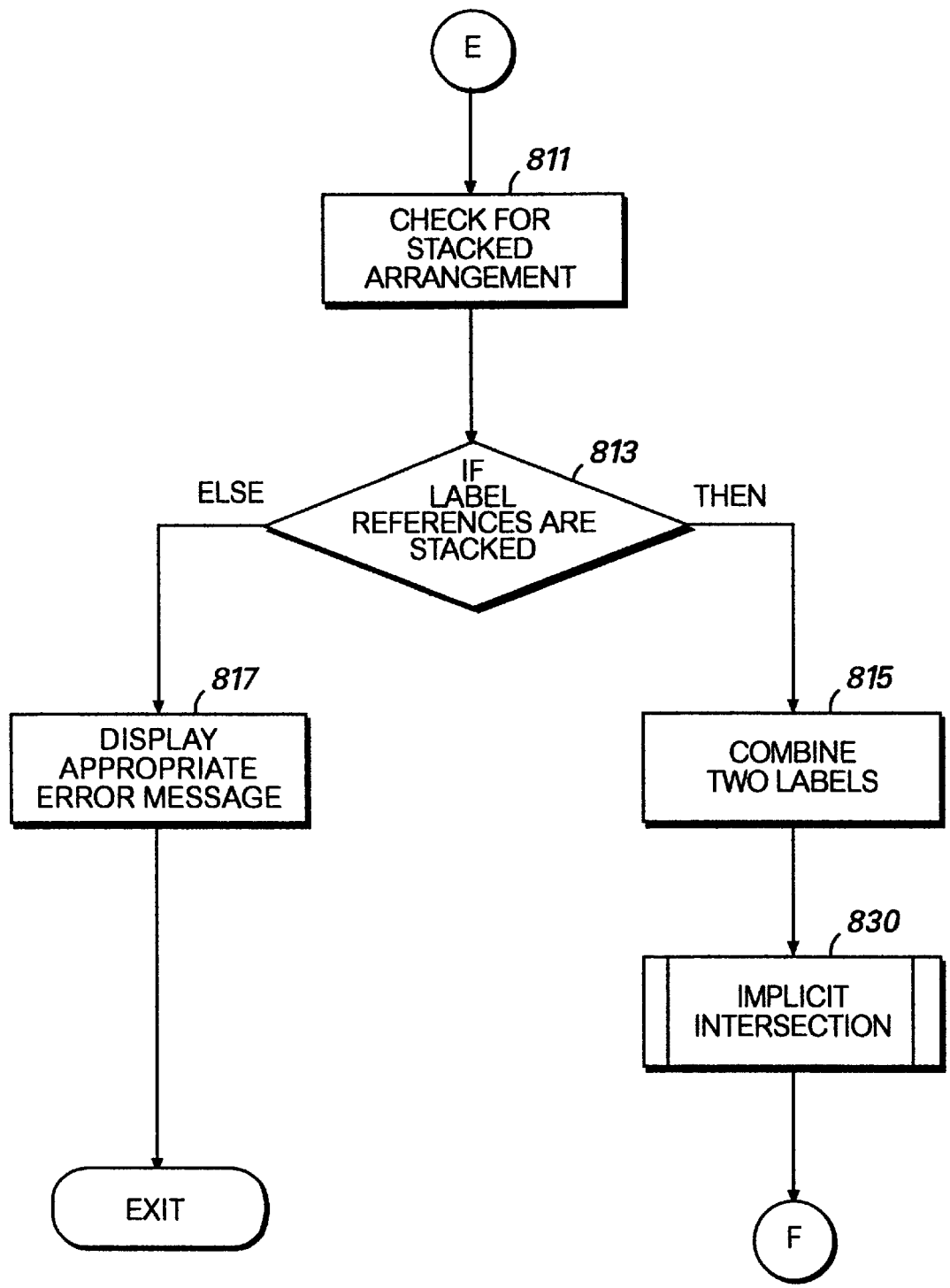

FIGS. 8b–8c are flow diagrams illustrating the details of the "Explicit Intersection" process. In decision block 813, if the labels are located in the same row or column, processing continues in FIG. 8c at entrance point E. In process block 811 of FIG. 8c, the labels are checked to determine if they are in a stacked arrangement. If the labels are stacked, the THEN branch of decision block 813 is followed to process block 815 and the two labels are combined into one label. The "Implicit Intersection" process 830 is then invoked. Upon competing the "Implicit Intersection" process, processing returns to entrance point F (FIG. 8b). If it is determined that the two labels are not a stacked reference, the ELSE branch of decision block 813 is followed to process block 817. Appropriate error messages can be provided or manual intervention can be requested in process block 817. In decision block 812 of FIG. 8b, if the labels are not positioned in the same row or column, the ELSE branch of decision block 812 is followed to decision block 814.

At this point, if the label types of the explicit match are known (i.e., neither label is indeterminate), the THEN branch of decision block 814 is followed to process block 828. The intersecting cell is determined to be the cell below the column header label which intersects with the row header in process block 828.

If one of the label types is a column header and the other label type is unknown, the ELSE branch of decision block 814 and the THEN branches of decision blocks 816 and 822 are followed to process block 824. In process block 824, the unknown label is classified as a row header and process block 828 is entered to determine the intersecting cell, as described above.

If, one of the label types is a row header and the other label type is unknown, the ELSE branch of decision block 814, the THEN branch of decision block 816 and the ELSE branch of decision block 822 are followed to process block 826. In process block 826, the unknown label is classified as a column header and process block 828 is entered to determine the intersecting cell, as described above.

Finally, if the label types are not known for either label, the ELSE branches of decision blocks 814 and 816 are followed to process block 818. The label with the smallest row number is classified as a column header in process block 818. Next, the remaining label is classified as a row header in process block 820. Processing then continues in process block 828 to determine the intersecting cell as described above.

Implicit Intersections

As described above, the formula =Sales in cell F13 of FIG. 3 is an implicit intersection. In an implicit intersection, the location of the formula in relation to the label is used in determining the intersection. Thus, the location of the formula in the cited example implies that the Sales for the month of February is the intended reference.

There are three valid layouts for implicit intersections. In one layout, a formula cell is located above the label and can either be on the right or the left of the label. In the second layout, the formula cell is located to the left and below the label. In the third layout, the formula cell is located below and to the right of the label. Any other combinations, such as the label and formula being in the same row or column are not considered valid.

Figure 8D:
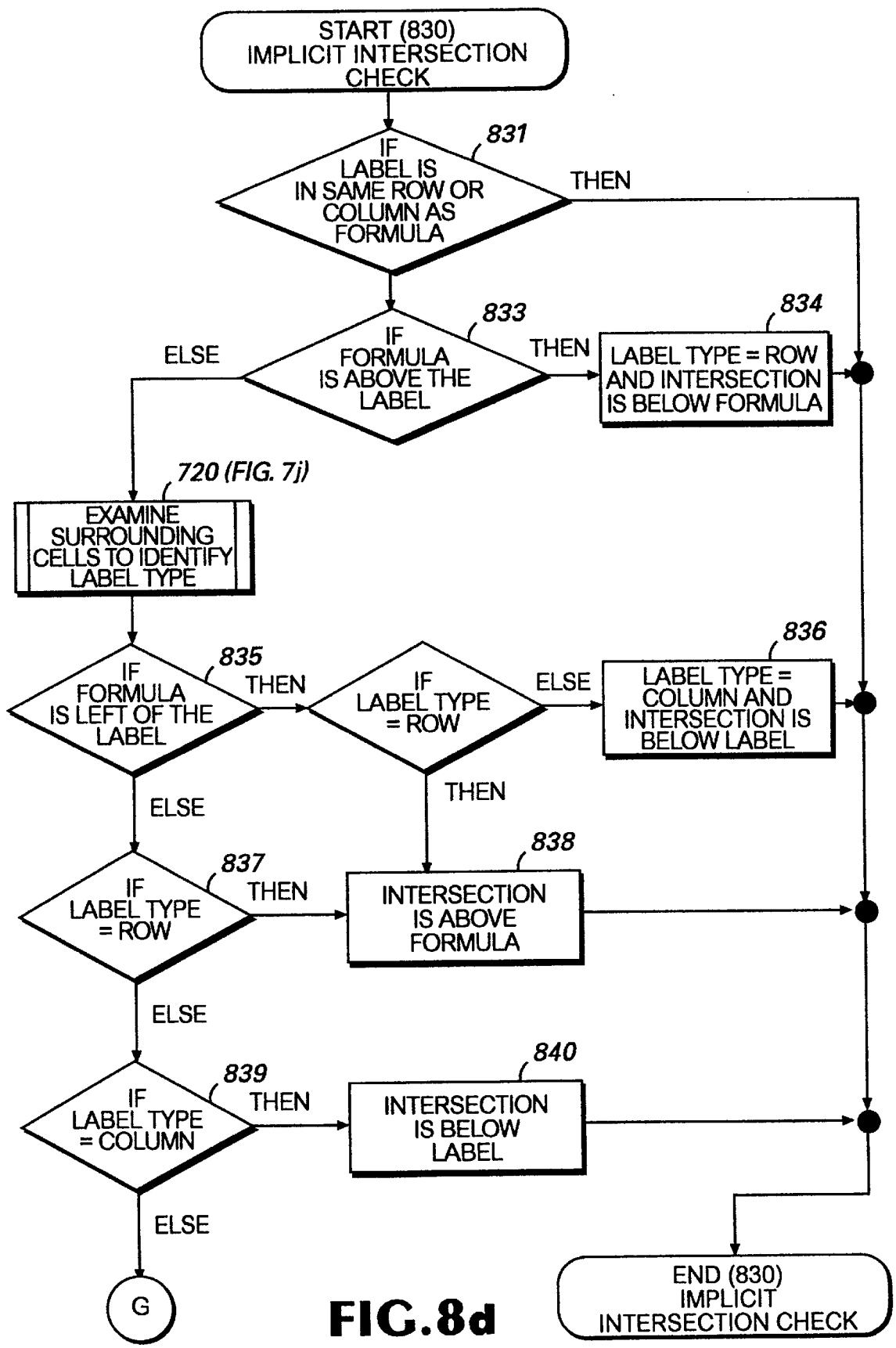
Figure 8E:
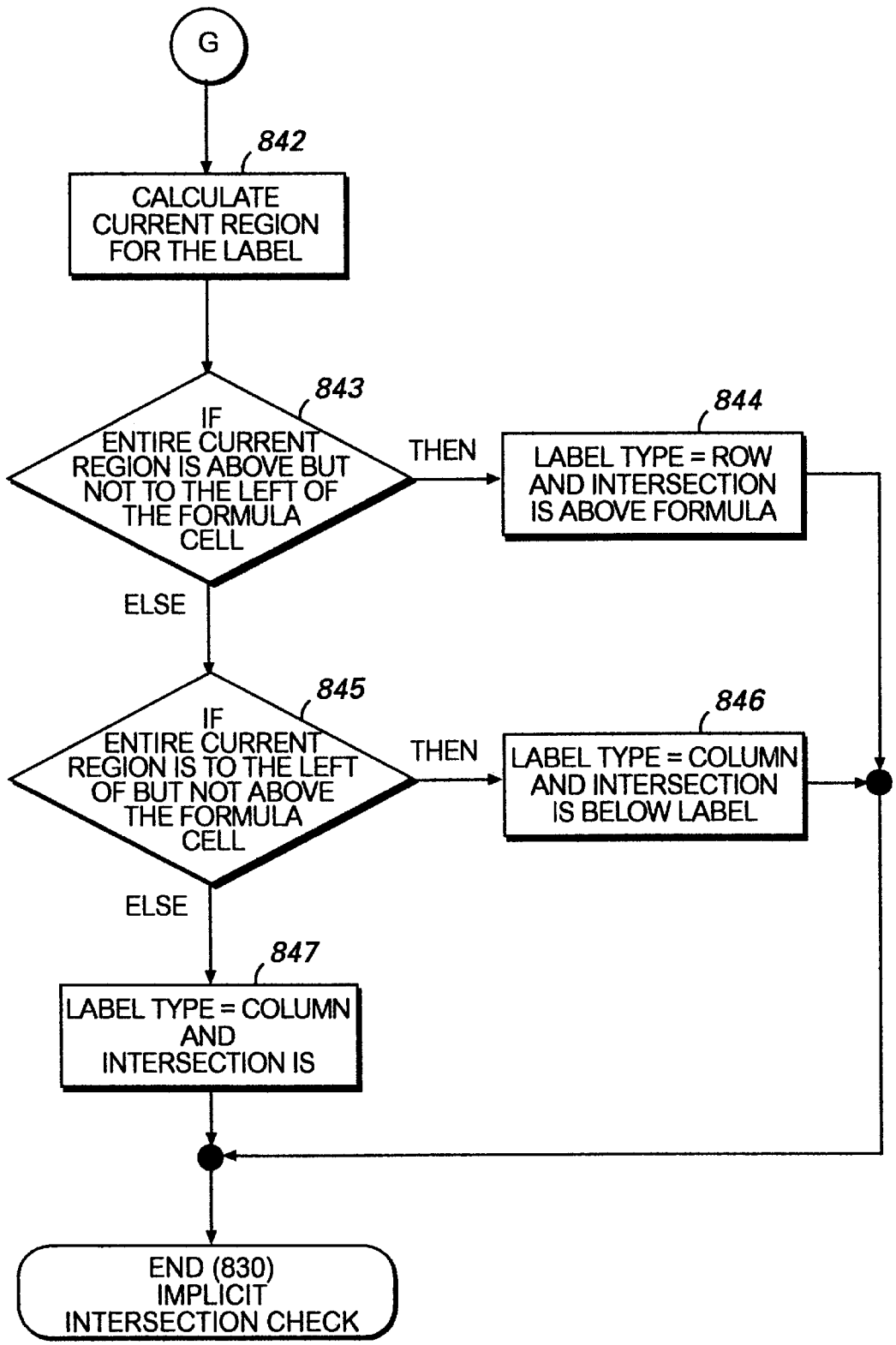

FIGS. 8d–8e are flow diagrams illustrating the details of the "Implicit Intersection" process. In decision block 831, if the label is located in the same row or column as the formula, the THEN branch is followed and processing returns to decision block 802 in FIG. 8a. Otherwise, the ELSE branch is followed and processing continues in decision block 833.

In decision block 833, if the formula is located above the label, the label is considered to be a row header and the intersection is determined to be below the formula. Thus, the THEN branch of decision block 833 will be followed to process block 834 to perform this intersection. Otherwise, the formula is below the label and the ELSE branch is followed to the "Examine Surrounding Cells" process block 720. This process operates to identify the label types as either a row header, column header or indeterminate. Processing then continues in decision block 835.

In decision block 835, if the formula is located to the left of the label, processing continues in decision block 841. In decision block 841, if the label was determined to be a row header, processing continues in process block 838 where the intersection is determined to be above the formula. Otherwise, the ELSE branch is followed to process block 836 where the label type is considered to be a column header and the intersection is determined to be below the label.

Decision block 837 is entered when the remaining scenario, where the formula cell is located to the right of and below the label, occurs. This is an ambiguous case and further processing must be performed in order to determine the intersection.

In decision block 837, if the label is classified as a row header, the THEN branch is followed to process block 838. The intersection is determined to be above the formula cell in process block 838. If the label type is classified as a column header, the ELSE branch of decision block 837 and the THEN branch of decision block 839 are followed to process block 840. In process block 840, the intersection is determined to be below the label.

If the label type is indeterminate after performing the "Examine Surrounding Cells" process, processing continues in FIG. 8e at entrance point G. In process block 842, the current region for the label is determined. In decision block 843, if the entire current region for the label is above the formula cell but not to the left of the formula cell, the THEN branch is followed to process block 844. The label is classified as a row header and the intersection is determined to be above the formula in process block 844. If the entire current region is located to the left of the formula cell but not above the formula cell, the ELSE branch of decision block 843 and the THEN branch of decision block 845 are followed to process block 846. In process block 846, the label is classified as a column header and the intersection is determined to be below the label.

In all other cases, the label is assumed to be a column header and the intersection is determined to be below the label.

Free Radicals

When a label is used in such a way that the reference does not resolve to a single cell, the range of cells referred to must be determined. The formula =SUM('Days In') in cell H21 of FIG. 1 is an example of a free radical.

Figure 8F:
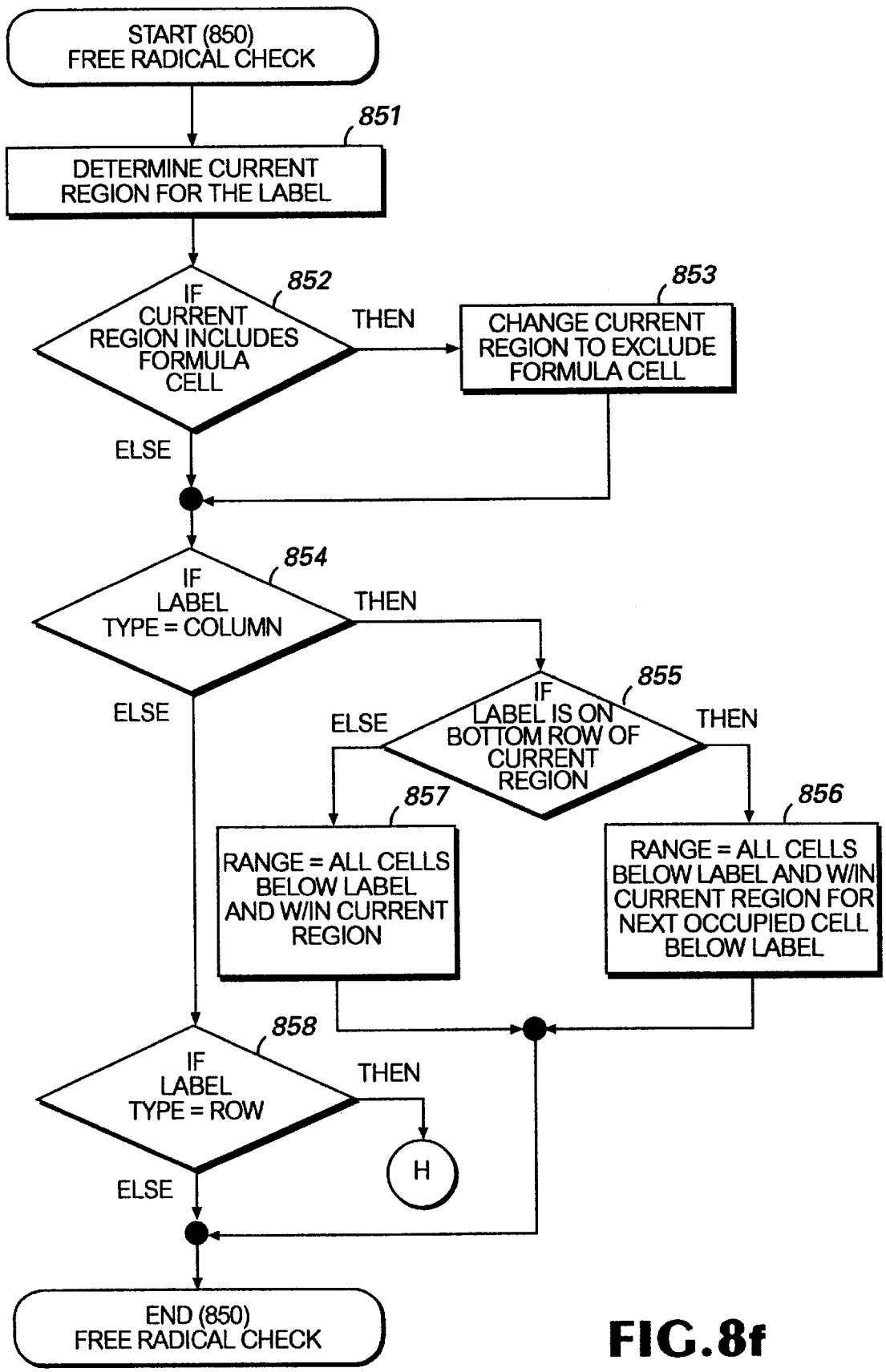
Figure 8G:
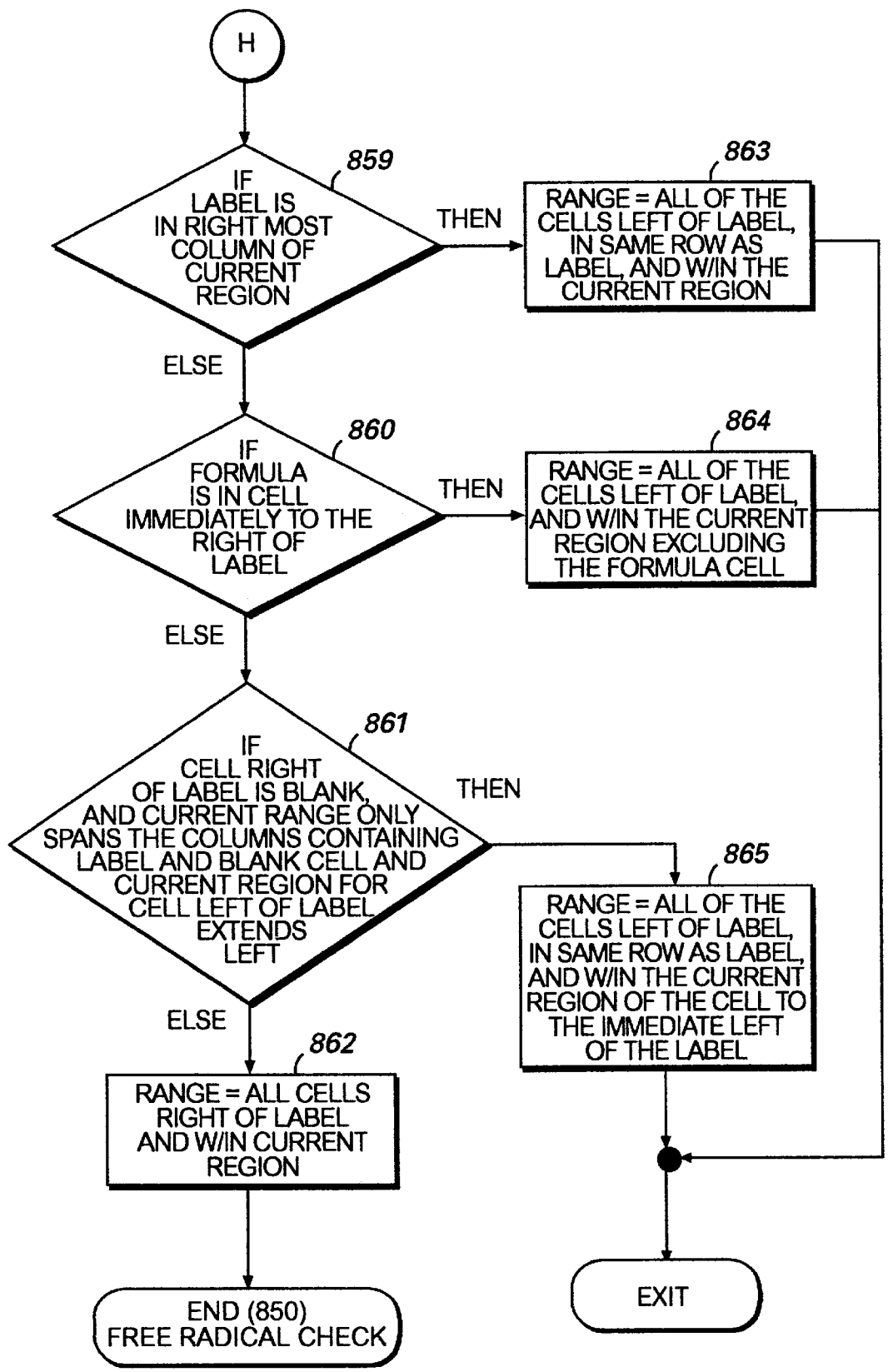

FIGS. 8f–8g are flow diagrams illustrating the details of the "Free Radical" process 850. In process block 851, the current region for the label is determined. If the current region for the label includes the cell containing the formula, the THEN branch of decision block 852 is followed to process block 853 where the current region is truncated to exclude the formula cell.

In process block 854, if the label is classified as a column header, the THEN branch is followed to decision block 855. In decision block 855, if the label is located on the bottom row of its current region, the THEN branch is followed to process block 856. The range of cells referred to by the label is determined in process block 856 as all cells located below (i.e., in the column below) the label and within the current region for the next occupied cell below the label. This covers the case of a blank row positioned between the labels and the data below it.

In process block 855, if the label is not on the bottom row of the current region, the ELSE branch is followed to process block 857. In process block 857, the range is determined to be all the cells below (i.e., in the column below) the label and within the same current region as the label.

Referring again to process block 854, if the label is classified as a row header, the ELSE branch of decision block 854 and the THEN branch of decision block 858 are followed, and processing continues at entrance point H of FIG. 8g. At this point, the range of cells will be all cells located to the right of the label and within the current region, unless one of three exceptions exist. These exceptions are addressed in decision blocks 859, 860 and 861.

First, in decision block 859, if the label is in the right most column of the current region, the THEN branch is followed to process block 863. In process block 863, the range is set to all of the cells to the left of the label, in the same row as the label, and within the current region. The process is then exited.

Secondly, if the formula is in the cell immediately to the right of the label, the ELSE branch of decision block 859 and the THEN branch of decision block 860 will be followed to process block 864. In process block 864, the range is set to all of the cells to the left of the label, in the same row as the label, and within the current region excluding the formula cell. The process is then exited.

Thirdly, if (1) the cell to the right of the label is blank and the current region for the label cell spans only the columns containing the label and the blank cell, and (2) the current region for the cell to the left of the label extends to its left, the THEN branch of decision block 861 will be followed to process block 865. In process block 865, the range is set to all the cells to the left of the label, in the same row as the label, and within the current region of the cell to the immediate left of the label. The process is then exited.

In all other instances, process block 862 will be entered and the range will be determined to be all the cells to the right of the label and within the same current region as the label.

Manual intervention

In situations where the label reference can not be determined, manual intervention may be required. Generally, manual intervention includes requesting one or more of the label references to be identified.

Other situations may exist where the result of the entered label reference does not have a valid intersection. In one embodiment, this situation can occur in two instances:

(1) When there is no intersection between two labels (i.e. the labels are in the same row or column), an alert message may be displayed to an operator or transmitted to a controlling process.

(2) When the intersection results in more than one cell (i.e., one of the labels is a merged cell or a centered across label), an alert message indicating that a label can only refer to a single row or column can be displayed to an operator or transmitted to a controlling process.

Auto Applying Labels into Formulas

Another aspect of the present invention is automatically inserting label references into a spreadsheet formula as the formula is entered. Thus, during formula entry, if a cell is referenced by selecting the cell from the keyboard, mouse or some other pointing device, labels which correspond to the referenced cell will be displayed rather than the standard Column-Row references.

The process of determining which labels reference a cell can be complicated. To make the decision process deterministic, the labels are required to be identified by defining labeled ranges within the spreadsheet.

Figure 9A:
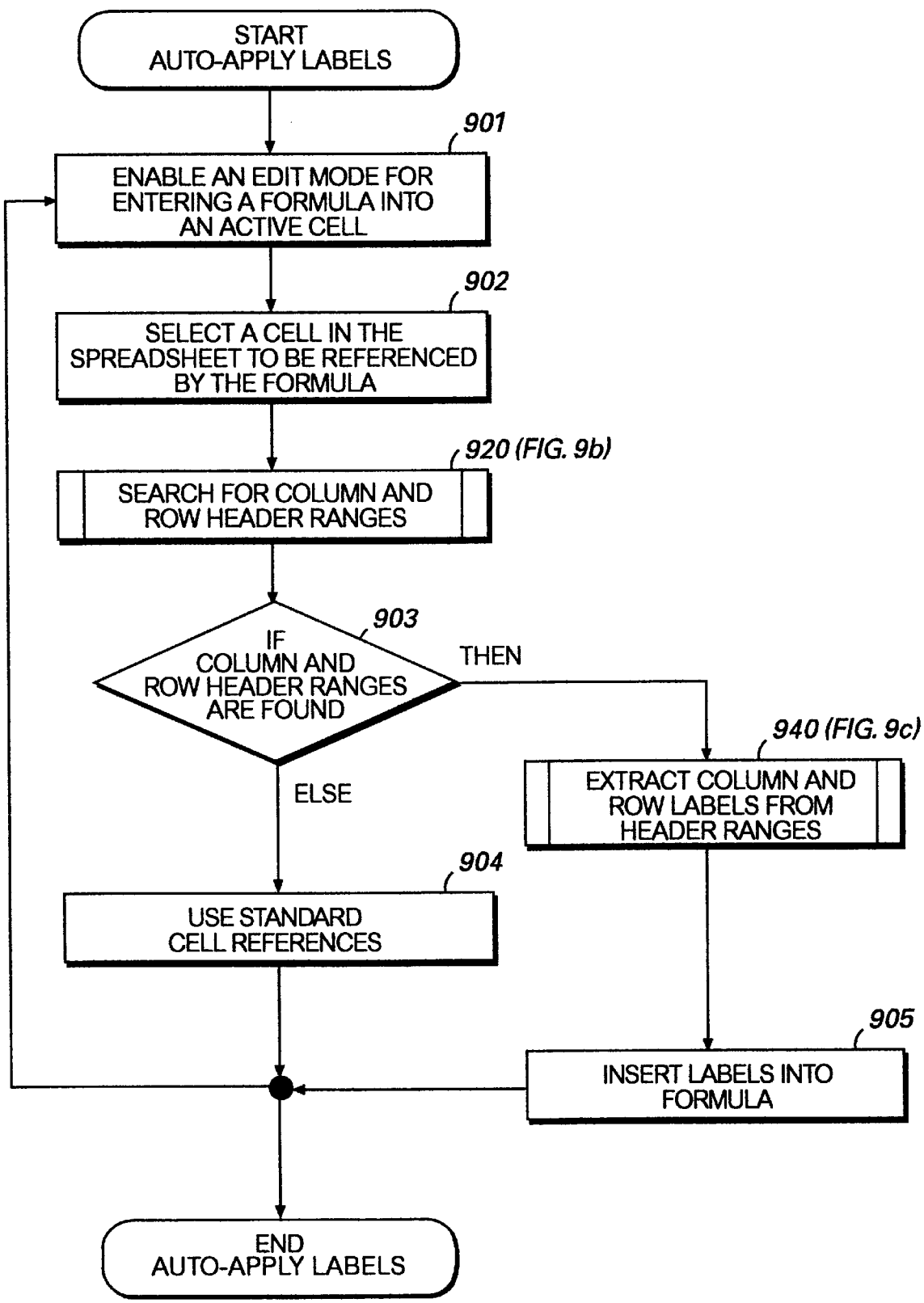
FIGS. 9a–9c are flow diagrams illustrating another embodiment of the present invention.

FIG. 9a is a flow diagram of the steps followed for determining which labels reference a given cell. In process block 901, an active cell is selected and an edit mode is enabled for entering a formula. In the preferred program this is usually accomplished by moving a cursor to the desired cell and typing the '=' character to initiate formula entry. In process block 902, the cursor is moved to a cell or a range of cells is selected using either the keyboard or a pointing device. At this point, previous spreadsheet programs operate to enter the standard Column-Row reference into the formula; however, the present invention will conduct a search for labels within the spreadsheet that reference the selected range of cells. The "Search for Column and Row Header Ranges" process 920 is invoked to accomplish this task. If column and row header labeled ranges are found, the THEN branch of decision block 903 is followed and the labels are extracted from the corresponding labeled ranges in the "Extract Column and Row Labels" process 940. After extracting the labels, they are then inserted into the formula in process block 905. If the "Search for Column and Row Header Ranges" process 920 does not result in finding both a column and row header labeled range, the ELSE branch of decision block 903 is followed to process block 904 where the standard Column Row references will be inserted into the formula. At this point, either the label reference or the Column Row reference have been entered into the formula and the process can be exited or editing of the formula can continue by returning to process block 901.

Figure 9B:
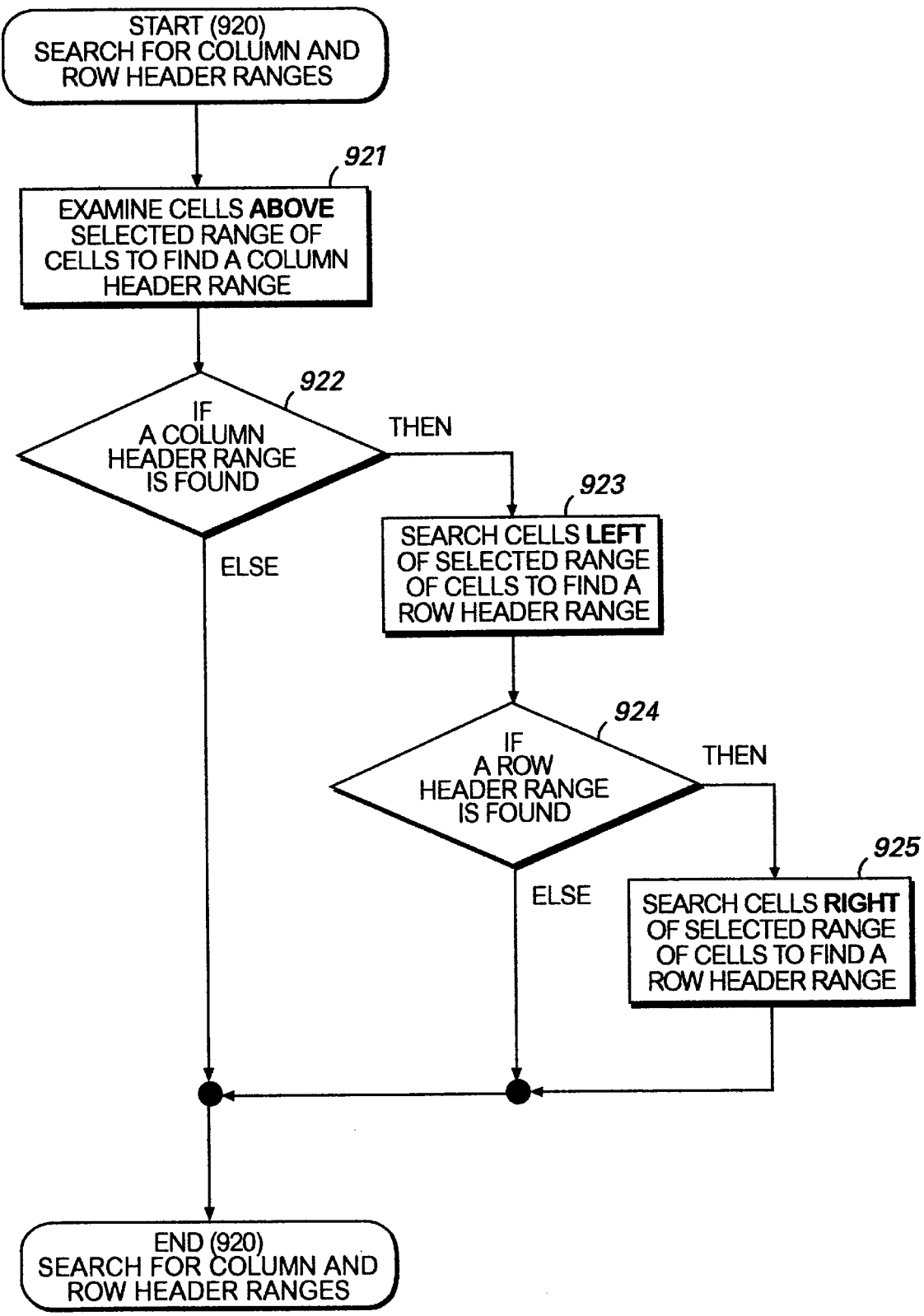

Turning to FIG. 9b, a flow diagram of the details of the "Search for Column and Row Header" process 920 is provided. In process block 921, the cells above the selected cell are searched to determine if there is a column header range above the selection and spanning the entire selection. Note that a "header range" may actually be a combination of contiguous ranges, as in the case where some columns have labels contained in multiple rows and some are contained in one row.

In decision block 922, if a column header has been identified, the THEN branch is followed to process block 923. In process block 923, the cells to the left of the selected cell are searched to determine if there is a row header range to the left of the selection and spanning the entire selection.

In decision block 924, if a row header has not been identified to the left of the selection, then the cells to the right of the selection are examined.

Figure 9C:
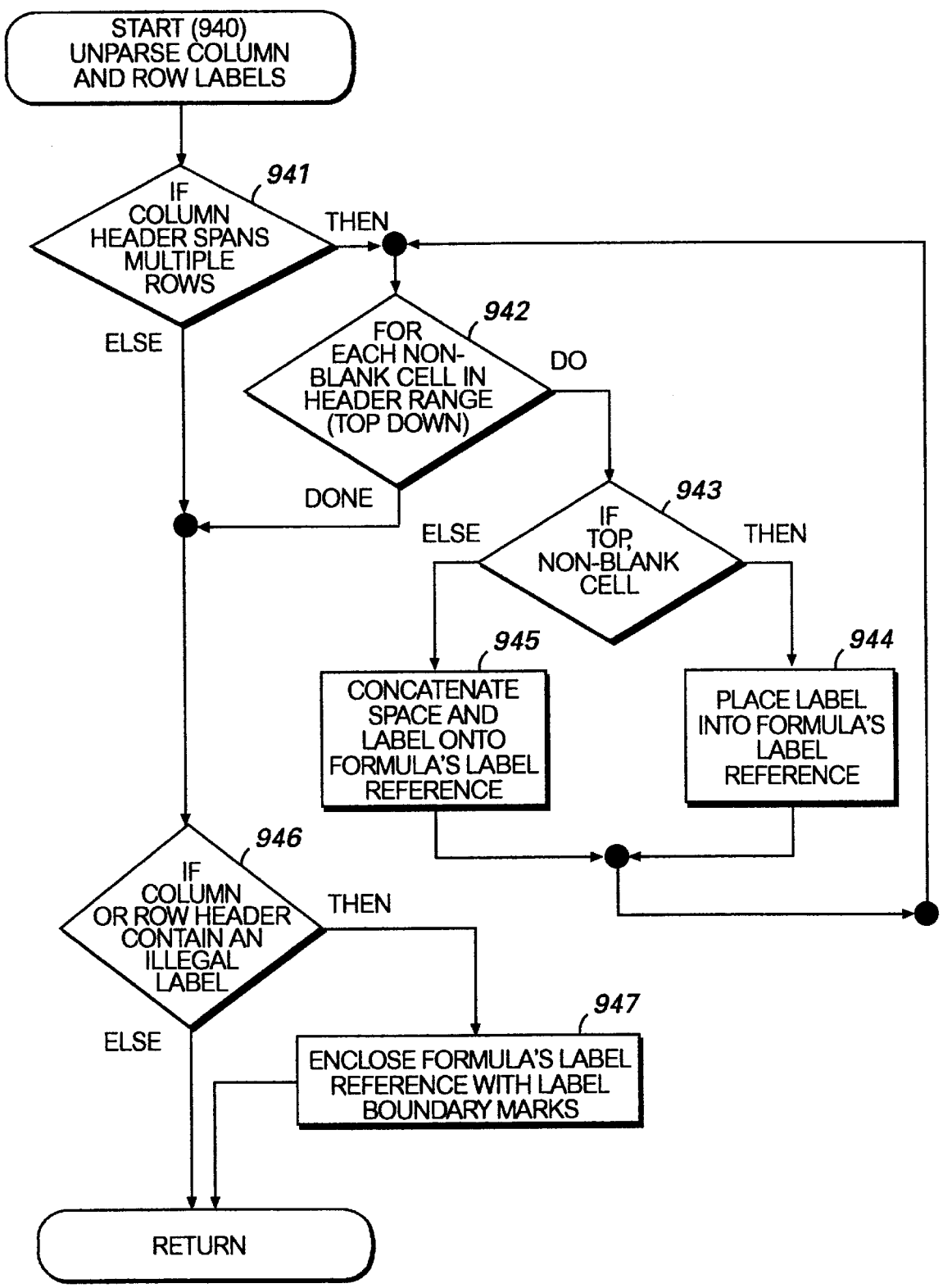

Upon completion of the "Search for Column and Row Header Ranges" process 920, if both header ranges have been found to exists, the "Extract Column and Row Labels" process is entered. Turning to FIG. 9c, a flow diagram of the details of the "Extract Column and Row Labels" process 940 is provided. In decision block 941, if a column header is more than one row high, the values for the particular column are concatenated with spaces. The effective label for a column in a multiple row column label range is determined as described below.

In decision block 942, each cell of the labeled range is examined from the top row to the bottom row by following the DO branch to decision block 943. In decision block 943, if the top cell is non-blank, the THEN branch is followed and the contents of the cell are inserted into the label in process block 944. For cells below the top cell, the ELSE branch is followed and the contents of the cell are concatenated to the label with a space between the current label and the new addition in process block 945. If any blank cells are encountered in the labeled range then they are skipped. Once the entire labeled range has been examined, the DONE branch of decision block 942 is followed to decision block 946.

An alternative embodiment may also allow for row headers to be stacked. Thus, a row header may span multiple columns in exactly the same way as column headers span multiple rows.

If the extracted labels are illegal or not proper, the THEN branch is followed to process block 947 where the label is enclosed in label boundary marks or ticks. Otherwise, the ELSE branch is followed and the "Extract Column and Row Labels" process 940 is exited.

From the foregoing description, it will be appreciated that the present invention provides a system to improve the efficiency and reliability of data entry in a generic database by providing the ability for an automatic completion process utilizing a list of completed data items comprised of data associated with the item being entered. Although the present invention has been described as embodied in a spreadsheet application, it will be appreciated that the present invention can be utilized in any database storage or retrieval type application. Indeed, the present invention is not limited to any particular database or spreadsheet application.

The present invention may be conveniently implemented in one or more program modules. No particular programming language has been indicated for carrying out the various tasks described above because it is considered that the operation, steps, and procedures described in the specification and illustrated in the accompanying drawings are sufficiently disclosed to permit one of ordinary skill in the art to practice the instant invention. Moreover, in view of the many different types of computers and program modules that can be used to practice the instant invention, it is not practical to provide a representative example of a computer program that would be applicable to these many different systems. Each user of a particular computer would be aware of the language and tools which are more useful for that user's needs and purposes to implement the instant invention.

The present invention has been described in relation to particular embodiments which are intended in all respects to be illustrative rather than restrictive. Those skilled in the art will understand that the principles of the present invention may be applied to, and embodied in, various program modules for execution on differing types of computers regardless of database application.

Alternative embodiments will become apparent to those skilled in the art to which the present invention pertains without departing from its spirit and scope. Accordingly, the scope of the present invention is described by the appended claims and supported by the foregoing description.

We claim:

1. In a spreadsheet having a plurality of cells arranged in a grid of rows and columns, said cells being receptive of data-items, labels and formulas, a method for referencing a range of cells in a spreadsheet formula by using label references, said label references identifying a preferred set of labels within the spreadsheet which correspond to said range of cells, said method comprising the steps of:

parsing said formula for a group of label references;

for each said label reference in said group, searching said cells of said spreadsheet to generate a target label list;

selecting said preferred label set from said target label lists; and determining said range of cells referenced by said preferred label set.

2. The method of claim 1, wherein said parsing step further comprises the steps of:

identifying two delimiters in said formula separated by at least one token;

examining each said token and each combination of at least two adjacent tokens to identify proper label references; and for each proper label reference, including said token or said combination of two or more adjacent tokens in said group of label references.

3. The method of claim 2, wherein said examining step further comprises the step of identifying a token comprising a set of characters enclosed by label boundary marks as a proper label reference.

4. The method of claim 2, wherein said examining step further comprises the step of identifying a token comprising an integer in the range of 1900 to 9999 as a proper label reference.

5. The method of claim 2, wherein said examining step further comprises the step of identifying a token comprising a set of characters formatted as a date as a proper label reference.

6. The method of claim 1, wherein said spreadsheet contains at least one labeled range and said searching step further comprises the step of searching said labeled ranges for target labels which correspond with said label reference.

7. The method of claim 1, wherein said spreadsheet comprises a plurality of plies, each of said plies having a ply-name, said label reference beginning with a ply-name of a particular ply, and said searching step further comprises the step of searching the cells of said particular ply for target labels corresponding with the portion of said label reference which does not contain said ply-name.

8. The method of claim 1, wherein said selecting step further comprises the steps of:

identifying candidate matching label sets from said target label lists, each said candidate matching label set containing at least one target label;

eliminating non-preferred candidate matching label sets until a final candidate matching label set remains; and selecting said final candidate matching label set as said preferred label set.

9. The method of claim 8, wherein an implicit intersection match and a free radical intersection match comprise a single target label from one of said target label lists, an explicit intersection match comprises a first target label from a first target label list and a second target label from a second target label list, and said step of identifying candidate matching label sets further comprises the steps of:

for each said target label list, identifying candidate implicit intersection matches;

for each said target label list, identifying candidate free radical intersection matches; and for each combination of two target label lists, identifying candidate explicit intersection matches.

10. The method of claim 8, wherein said step of eliminating non-preferred candidate matching label sets further comprises the step of classifying each said target label in each said candidate matching label set as one of the types including a row header, a column header and indeterminate.

11. The method of claim 10, wherein said classifying step further comprises the steps of:

identifying a data-type of said target label;

determining the number of cells positioned horizontally about said target label which are in a range of N cells from said target label and which contain said data-type, where N is an integer;

determining the number of cells positioned vertically about said target label which are in said range of N cells and which contain said data-type;

classifying said target label as a column header if said number of cells positioned horizontally about said target label is X greater than said number of cells positioned vertically about said target label, where X is an integer less than 2*N; and classifying said target label as a row header if said number of cells positioned vertically about said target label is X greater than the number of cells positioned horizontally about said target label.

12. The method of claim 11, wherein if said target label is not classified as a column header or a row header, said classifying said target label step further comprises the steps of:

classifying said target label as a column header if one of the following two conditions exist, the conditions including N cells above said target label and N cells to the left of said target label being blank, and N cells above said target label and N cells to the right of said target label being blank;

classifying said target label as a row header if one of the following two conditions exist, the conditions including N cells below said target label and N cells to the left of said target label being blank, and N cells below said target label and N cells to the right of said target label being blank;

if said target label has not been, classifying said target label as indeterminate.

13. The method of claim 10, wherein for each candidate explicit intersection match, said step of eliminating non-preferred candidate matching label sets further comprises the steps of:

if said first target label and said second target label are both classified as row headers or if said first target label and said second target label are both classified as column headers, eliminating said candidate explicit intersection match; and if said first target label and said second target label are located in the same row or if said first target label and said second target label are located in the same column, eliminating said candidate explicit intersection match.

14. The method of claim 10, wherein for each candidate explicit intersection match which qualifies as a Single-Double match by having said first target label list containing multiple instances of said first target label and said second target label list containing one instance of said second target label, said step of eliminating non-preferred candidate matching label sets further comprises the steps of:

if said candidate explicit intersection match is located within the boundaries of an implicit table which includes said formula, eliminating candidate explicit intersection matches that are not located within the boundaries of said implicit table;

if said second target label is a member of a labeled range and at least one instance of said first target label is a member of said labeled range, eliminating candidate explicit intersection matches where said first target label is not a member of said labeled range;

if said second target label is classified as a column header and at least one instance of said first target label is located to the left of said second target label, eliminating candidate matches where said first target label is not located to the left of said second target label;

if said second target label is classified as a row header and at least one instance of said first target label is located to the right of said second target label, eliminating candidate matches where said first target label is not located to the right of said second target label; and if at least one instance of said first target label can be identified as a closest first target label, said closest first target label being closer to said second target label than other instances of said first target label, eliminating candidate explicit intersection matches which do not comprise one of said closest first target labels.

15. The method of claim 10, wherein for each candidate explicit intersection match which qualifies as a Double-Double match by having said first target label list containing multiple instances of said first target label and said second target label list containing multiple instances of said second target label, and said step of eliminating non-preferred candidate matching label sets further comprises the steps of:

if said candidate explicit intersection match is located within the boundaries of an implicit table which includes said formula, eliminating candidate explicit intersection matches that are not located within the boundaries of said implicit table;

if said first target label is classified as a column header and said second target label is classified as a row header, and said first target label is positioned to the right of said second target label, eliminating candidate explicit intersection matches which do not meet this criteria;

if at least one instance of said first target label can be identified as a closest first target label, said closest first target label being closer to said second target label than other instances of said first target label, eliminating candidate explicit intersection matches which do not comprise one of said closest first target labels;

if at least one instance of said first target label is classified as a row header and can be identified as a closest row header, said closest row header being closer to said formula than other instances of said first target label, eliminating candidate explicit intersection matches which do not comprise one of said closest row headers;

if at least one instance of said first target label is classified as a column header and can be identified as a closest column header, said closest column header being closer to said formula than other instances of said first target label, eliminating candidate explicit intersection matches which do not comprise one of said closest column headers; and if at least one instance of said first target label is classified as a column header and is located above said formula, and at least one instance of said second target label is classified as a row header and is located to the left of said formula, eliminating candidate explicit intersection matches which are not comprised of these labels.

16. The method of claim 10, wherein for each candidate implicit intersection match and for each candidate free radical intersection match having multiple instances of said single target label in said target label list, said step of eliminating non-preferred candidate matching label sets further comprises the steps of:

if said single target label is classified as a column header and is positioned below said formula, eliminating said candidate implicit intersection match;

if at least one instance of said single target label is positioned within an implicit table which includes said formula, eliminating candidate implicit intersection matches comprising instances of said single target label which are not positioned within said implicit table;

if at least one instance of said single target label is classified as a row header and is positioned to the left of said formula, eliminating candidate implicit intersection matches comprising instances of said single target label which are row headers and are not positioned to the left of said formula;

if at least one instances of said single target label is positioned within the current region for said formula, said current region being the group of cells including the formula cell that are bounded by the smallest rectangle of blank cells, eliminating candidate implicit intersection matches comprising instances of said single target label not positioned within said current region; and if all instances of said single target label are positioned in the same quadrant about the formula, and if at least one instance of said single target label can be identified as a closest single target label, said closest single target label being closer to said formula than other instances of said single target label, eliminating said candidate implicit intersection matches which do not comprise one of said closest single target labels.

17. The method of claim 1, wherein said preferred label set contains a first label in a first row of said spreadsheet and a second label in a second row of said spreadsheet, and said determining step further comprises the steps of:

if said first label is a row header and said second label is a column header, equating said range of cells to the cell intersected by the row containing said first label and the column containing said second label and which is positioned below said second label;

if said first label is a row header and said second label is indeterminate, equating said range of cells to the cell intersected by the row containing said first label and the column containing said second label and which is positioned below said second label;

if said first label is a column header and said second label is indeterminate, equating said range of cells to the cell intersected by the column containing said first label and the row containing said second label and which is positioned below said first label; and if said first label and said second label are indeterminate and said first label is positioned above said second label, equating said range of cells to the cell intersected by the column containing said first label and the row containing said second label and which is positioned below said first label.

18. The method of claim 1, wherein said preferred label set contains one label, said label being positioned in a different row and column than said formula, and said determining step further comprises the steps of:

if said formula is located above said label, equating said range of cells to the cell intersected by the row containing said label and the column containing said formula and which is positioned below said formula;

if said formula is located below and to the left of said label, equating said range of cells to the cell intersected by the column containing said label and the row containing said formula and which is positioned below said label;

if said formula is located below and to the right of said label, then perform the steps of:

classifying said label as one of the types including a row header, a column header and indeterminate types, based on the content of the cells surrounding said label, if said label is classified as a row header, equating said range of cells to the cell intersected by the row containing said label and the column containing said formula and which is positioned above said formula;

if said label is classified as a column header, equating said range of cells to the cell intersected by the column containing said label and the row containing said formula and which is positioned below said label;

if said label is classified as indeterminate and if the entire current region for said label is located above but not to the left of said formula, equating said range of cells to the cell intersected by the row containing said label and the column containing said formula and which is positioned above said formula; and in all other cases, equating said range of cells to the cell intersected by the column containing said label and the row containing said formula and which is positioned below said label.

19. The method of claim 1, wherein said preferred label set contains one label sharing one of two common alignment features with said formula including common row and common column, and said determining step further comprises the steps of:

if a first current region for said label includes said formula, said first current region being the group of cells containing said label and being bounded by the smallest rectangle of blank cells, remove said formula from said first current region;

if said label is a column header, and if said label is on the bottom row of said first current region, equating said range of cells to all cells positioned below said label and within a second current region, said second current region being the smallest area of cells containing the next occupied cell positioned below said label and being surrounded by blank cells;

if said label is a column header, and if said label is not on the bottom row of said first current region, identifying said range of cells as comprising all cells positioned below said label and within said first current region;

if said label type is a row header, equating said range of cells to all cells positioned to the right of said label, within the same row as said label and within said first current region, unless an exception occurs including:

said label being positioned in the right most column of said first current region, said formula being positioned immediately to the right of said label, and the cell immediately to the right of said label containing a blank, said first current region being confined to the column containing said label and the column containing said blank, and a second current region for the cell immediately to the left of said label extending left from said label.

20. In a program module responsive to input commands for entering, modifying and deleting information items in a plurality of information item place-holders, said information items comprising data items, labels and formulas, a method for referencing a range of said place-holders within a formula by using at least one reference to a preferred label set, comprising the steps of:

parsing said formula for a group of said references to said labels;

for each said reference in said group, searching said place-holders for matching labels to generate a target label list;

selecting said preferred label set from said target label lists; and determining said range of said place-holders referenced by said preferred label set.

21. The method of claim 20, wherein said parsing step further comprises the steps of:

identifying two delimiters in said formula separated by at least one token;

examining each said token and each combination of at least two adjacent tokens to identify proper references to said labels; and for each proper reference to said label, including said token and said combination of at least two adjacent tokens in said group.

22. The method of claim 21, wherein said examining step further comprises the step of identifying said token or said combination of two or more adjacent tokens as a proper reference to said label if said token or said combination contains at least one of the following characteristics including: a set of characters enclosed by label boundary marks; an integer in the range of 1900 to 9999; and a set of characters formatted as a date.

23. The method of claim 20, wherein said selecting step further comprises the steps of:

identifying candidate matching label sets from said target label lists, each said candidate matching label set containing at least one target label;

eliminating non-preferred candidate matching label sets until a final candidate matching label set remains; and selecting said final candidate matching label set as said preferred label set.

24. The method of claim 23, wherein an implicit intersection match and a free radical intersection match comprise a single target label from one of said target label lists, an explicit intersection match comprises a first target label from a first target label list and a second target label from a second target label list, and said step of identifying candidate matching label sets further comprises the steps of:

for each said target label list, identifying candidate implicit intersection matches;

for each said target label list, identifying candidate free radical intersection matches; and for each combination of two target label lists, identifying candidate explicit intersection matches.

25. The method of claim 24, wherein said place-holders are arranged in a grid of rows and columns and said step of eliminating non-preferred candidate matching label sets further comprises the step of classifying each said target label in each said candidate matching label set as one of the types including a row header, a column header and indeterminate type.

26. The method of claim 25, wherein for each candidate explicit intersection match, said step of eliminating non-preferred candidate matching label sets further comprises the steps of:
   eliminating said candidate explicit intersection match if said first target label and said second target label are both classified as row headers;
   eliminating said candidate explicit intersection match if said first target label and said second target label are both classified as column headers;
   eliminating said candidate explicit intersection match if said first target label and said second target label are located in the same row; and
   eliminating said candidate explicit intersection match if said first target label and said second target label are located in the same column.

27. The method of claim 25, wherein for each candidate explicit intersection match which qualifies as a Single-Double match by having said first target label list containing multiple instances of said first target label and said second target label list containing one instance of said second target label, said step of eliminating non-preferred candidate matching label sets further comprises the steps of:
   if said candidate explicit intersection match is located within the boundaries of an implicit table which includes said formula, eliminating candidate explicit matches that are not located within the boundaries of said implicit table;
   if said second target label is a member of a labeled range and at least one instance of said first target label is a member of said labeled range, eliminating candidate explicit intersection matches where said first target label is not a member of said labeled range;
   if said second target label is classified as a column header and at least one instance of said first target label is located to the left of said second target label, eliminating candidate matches where said first target label is not located to the left of said second target label;
   if said second target label is classified as a row header and at least one instance of said first target label is located to the right of said second target label, eliminating candidate matches where said first target label is not located to the right of said second target label; and
   if at least on instance of said first target label can be identified as a closest first target label, said closest first target label being closer to said second target label than other instances of said first target label, eliminating candidate explicit intersection matches which do not comprise one of said closest first target labels.

28. The method of claim 25, wherein for each candidate explicit intersection match which qualifies as a Double-Double match by having said first target label list containing multiple instances of said first target label and said second target label list containing multiple instances of said second target label, said step of eliminating non-preferred candidate matching label sets further comprises the steps of:
   if said candidate explicit intersection match is located within the boundaries of an implicit table which includes said formula, eliminating candidate explicit matches that are not located within the boundaries of said implicit table;
   if said first target label is classified as a column header and said second target label is classified as a row header, and said first target label is positioned to the right of said second target label, eliminating candidate explicit intersection matches which do not meet this criteria;
   if at least one instance of said first target label can be identified as a closest first target label, said closest first target label being closer to said second target label than other instances of said first target label, eliminating candidate explicit intersection matches which do not comprise one of said closest first target labels;
   if at least one instance of said first target label is classified as a row header and can be identified as a closest row header, said closest row header being closer to said formula than other instances of said first target label, eliminating candidate explicit intersection matches which do not comprise one of said closest row headers;
   if at least one instance of said first target label is classified as a column header and can be identified as a closest column header, said closest column header being closer to said formula than other instances of said first target label, eliminating candidate explicit intersection matches which do not comprise one of said closest column headers; and
   if at least one instance of said first target label is classified as a column header and is located above said formula, and at least one instance of said second target label is classified as a row header and is located to the left of said formula, eliminating candidate explicit intersection matches which are not comprised of these labels.

29. The method of claim 25, wherein for each candidate implicit intersection match and each candidate free radical intersection match having multiple instances of said single target label in said target label list, said step of eliminating non-preferred candidate matching label sets further comprises the steps of:
   if said single target label is classified as a column header and is positioned below said formula, eliminating said candidate implicit intersection match;
   if at least one instance of said single target label is positioned within an implicit table which includes said formula, eliminating candidate implicit intersection matches comprising instances of said single target label which are not positioned within said implicit table;
   if at least one instance of said single target label is classified as a row header and is positioned to the left of said formula, eliminating candidate implicit intersection matches comprising instances of said single target label which are row headers and are not positioned to the left of said formula;
   if at least one instances of said single target label is positioned within the current region for said formula, said current region being the smallest set of place-holders containing said formula and which are surrounded by a rectangle of blank cells, eliminating candidate implicit intersection matches comprising instances of said single target label not positioned within said current region; and
   if all instances of said single target label are positioned in the same quadrant about the formula, and if at least one instance of said single target label can be identified as a closest single target label, said closest single target label being closer to said formula than other instances of said single target label, eliminating said candidate implicit intersection matches which do not comprise one of said closest single target labels.

30. The method of claim 20, wherein said place-holders are arranged in a grid of rows and columns, said preferred label set contains a first label in a first row of said spreadsheet and a second label in a second row of said spreadsheet, said first label and said second label being classified one of the types including a row header, column header or indeterminate type, and said determining step further comprises the steps of:

if said first label is classified as a row header and said second label is classified as a column header, equating said range of place-holders to the place-holder intersected by the row containing said first label and the column containing said second label and which is positioned below said second label;

if said first label is classified as a row header and said second label is classified as indeterminate, equating said range of place-holders to the place-holder intersected by the row containing said first label and the column containing said second label and which is positioned below said second label;

if said first label is classified as a column header and said second label is classified as indeterminate, equating said range of place-holders to the place-holder intersected by the column containing said first label and the row containing said second label and which is positioned below said first label; and if said first label and said second label are classified as indeterminate and said first label is positionally above said second label, equating said range of place-holders to the place-holder intersected by the column containing said first label and the row containing said second label and which is positioned below said first label.

31. The method of claim 20, wherein said place-holders are arranged in a grid of rows and columns, said preferred label set contains one label, and said determining step further comprises the steps of:

if said formula is located above said label, equating said range of place-holders to the place-holder intersected by the row containing said label and the column containing said formula and which is positioned below said formula;

if said formula is located below and to the left of said label, equating said range of cells to the cell intersected by the column containing said label and the row containing said formula and which is positioned below said label;

if said formula is located below and to the right of said label, then perform the steps of:

classifying said label as one of the types including a row header, a column header and indeterminate type based on the content of the cells surrounding said label, if said label is classified as a row header, equating said range of place-holders to the place-holder intersected by the row containing said label and the column containing said formula and which is positioned above said formula;

if said label is classified as a column header, equating said range of place-holders to the place-holder intersected by the column containing said label and the row containing said formula and which is positioned below said label;

if said label is classified as indeterminate and if the entire current region for said label is located above but not to the left of said formula, equating said range of place-holders to the place-holder intersected by the row containing said label and the column containing said formula and which is positioned above said formula; and in all other cases, equating said range of place-holders to the place-holder intersected by the column containing said label and the row containing said formula and which is positioned below said label.

32. The method of claim 20, wherein said place-holders are arranged in a grid of rows and columns, said preferred label set contains one label sharing a common alignment feature with said formula including one of a common row and a common column, and said determining step further comprises the steps of:

if a first current region for said label includes said formula, said first current region being the smallest set of place-holders containing said label and being surrounded by a rectangle of blank cells, remove said formula from said first current region;

if said label is a column header, and if said label is on the bottom row of said first current region, equating said range of place-holders to all place-holders positioned below said label and within a second current region, said second current region being the smallest set of place-holders containing the next occupied place-holder positioned below said label and being surrounded by blank cells;

if said label is a column header, and if said label is not on the bottom row of said first current region, identifying said range of place-holders as comprising all place-holders positioned below said label and within said first current region;

if said label type is a row header, equating said range of place-holders to all place-holders positioned to the right of said label, within the same row as said label and within said first current region, unless at least one exception occurs of the possible exceptions including:

said label being positioned in the right most column of said first current region, said formula being positioned immediately to the right of said label, and the place-holder immediately to the right of said label containing a blank, said first current region being confined to the column containing said label and the column containing said blank, and a second current region for the place-holder immediately to the left of said label extending left from said label.

33. A computer-readable medium on which is stored a computer program for using label references in a formula to reference a range of cells in a spreadsheet, said spreadsheet having a plurality of cells arranged in a grid of rows and columns, said cells receptive of data items, formulas and labels, said computer program comprising instructions which, when executed by said computer, perform the steps of:

parsing said formula for a group of label references;

for each said label reference in said group, searching said cells of said spreadsheet to generate a target label list;

selecting a preferred label set from said target label lists; and determining said range of cells referenced by said preferred label set.

34. The method of claim 33, wherein said parsing step further comprises the steps of:

identifying two delimiters in said formula separated by at least one token;

examining each said token and each combination of at least two adjacent tokens to identify proper label references; and for each proper label reference, including said token and said combination of at least two tokens in said group of label references.

35. The method of claim 34, wherein said examining step further comprises the step of identifying as a proper label reference, each said token and each said combination of at least two adjacent tokens that comprise at least one of the characteristics including:

a set of characters enclosed by label boundary;

an integer in the range of 1900 to 9999; and a set of characters formatted as a date.

36. The method of claim 33, wherein said selecting step further comprises the steps of:

identifying candidate matching label sets from said target label lists, each said candidate matching label set containing at least one target label;

eliminating non-preferred candidate matching label sets until a final candidate matching label set remains; and selecting said final candidate matching label set as said preferred label set.

37. The method of claim 36, wherein an implicit intersection match and a free radical intersection match comprise a single target label from one of said target label lists, an explicit intersection match comprises a first target label from a first target label list and a second target label from a second target label list, and said step of identifying candidate matching label sets further comprises the steps of:

for each said target label list, identifying candidate implicit intersection matches;

for each said target label list, identifying candidate free radical intersection matches; and for each combination of two target label lists, identifying candidate explicit intersection matches.

38. The method of claim 36, wherein said step of eliminating non-preferred candidate matching label sets further comprises the step of classifying each target label in each said candidate matching label set as one of the types including a row header, a column header and indeterminate type.

39. The method of claim 38, wherein for each candidate explicit intersection match, said step of eliminating non-preferred candidate matching label sets further comprises the steps of:

eliminating said candidate explicit intersection match if said first target label and said second target label are both classified as row headers eliminating said candidate explicit intersection match if said first target label and said second target label are both classified as column headers; and eliminating said candidate explicit intersection match if said first target label and said second target label are located in the same row; and eliminating said candidate explicit intersection match if said first target label and said second target label are located in the same column.

40. The method of claim 38, wherein for each candidate explicit intersection match which qualifies as a Single-Double match by having said first target label list containing multiple instances of said first target label and said second target label list containing one instance of said second target label, said step of eliminating non-preferred candidate matching label sets further comprises the steps of:

if said candidate explicit intersection match is located within the boundaries of an implicit table which includes said formula, eliminating candidate explicit matches that are not located within the boundaries of said implicit table;

if said second target label is a member of a labeled range and at least one instance of said first target label is a member of said labeled range, eliminating candidate explicit intersection matches where said first target label is not a member of said labeled range;

if said second target label is classified as a column header and at least one instance of said first target label is located to the left of said second target label, eliminating candidate matches where said first target label is not located to the left of said second target label;

if said second target label is classified as a row header and at least one instance of said first target label is located to the right of said second target label, eliminating candidate matches where said first target label is not located to the right of said second target label; and if at least one instance of said first target label can be identified as a closest first target label, said closest first target label being closer to said second target label than other instances of said first target label, eliminating candidate explicit intersection matches which do not comprise one of said closest first target labels.

41. The method of claim 38, wherein for each candidate explicit intersection match which qualifies as a Double-Double match by having said first target label list containing multiple instances of said first target label and said second target label list containing multiple instances of said second target label, said step of eliminating non-preferred candidate matching label sets further comprises the steps of:

if said candidate explicit intersection match is located within the boundaries of an implicit table which includes said formula, eliminating candidate explicit intersection matches that are not located within the boundaries of said implicit table;

if said first target label is classified as a column header and said second target label is classified as a row header, and said first target label is positioned to the right of said second target label, eliminating candidate explicit intersection matches which do not meet this criteria;

if at least one instance of said first target label are classified as a row header and can be identified as a closest row header, said closest row header being closer to said formula than other instances of said first target label, eliminating candidate explicit intersection matches which do not comprise one of said closest row headers; and if at least one instance of said first target label are classified as a column header and can be identified as a closest column header, said closest column header being closer to said formula than other instances of said first target label, eliminating candidate explicit intersection matches which do not comprise one of said closest column headers.

42. The method of claim 38, wherein for each candidate implicit intersection match and each candidate free radical intersection match having multiple instances of said single target label in said target label list, said step of eliminating non-preferred candidate matching label sets further comprises the steps of:

if said single target label is classified as a column header and is positioned below said formula, eliminating said candidate implicit intersection match;

if at least one instance of said single target label is positioned within an implicit table which includes said formula, eliminating candidate implicit intersection matches comprising instances of said single target label which are not positioned within said implicit table;

if at least one instance of said single target label is classified as a row header and is positioned to the left of said formula, eliminating candidate implicit intersection matches comprising instances of said single target label which are row headers and are not positioned to the left of said formula;

if at least one instances of said single target label is positioned within the current region for said formula, said current region being the smallest area of cells containing said formula and being surrounded by a rectangle of blank cells, eliminating candidate implicit intersection matches comprising instances of said single target label not positioned within said current region; and if all instances of said single target label are positioned in the same quadrant about the formula, and if at least one instance of said single target label can be identified as a closest single target label, said closest single target label being closer to said formula than other instances of said single target label, eliminating candidate implicit intersection matches which do not comprise one of said closest single target labels.

43. The method of claim 33, wherein said preferred label set contains a first label in a first row of said spreadsheet and a second label in a second row of said spreadsheet, said first label and said second label are classified as one of the types including a row header, a column header or indeterminate type, and said determining step further comprises the steps of:

if said first label is a row header and said second label is a column header, equating said range of cells to the cell intersected by the row containing said first label and the column containing said second label and which is positioned below said second label;

if said first label is a row header and said second label is indeterminate, equating said range of cells to the cell intersected by the row containing said first label and the column containing said second label and which is positioned below said second label;

if said first label is a column header and said second label is indeterminate, equating said range of cells to the cell intersected by the column containing said first label and the row containing said second label and which is positioned below said first label; and if said first label and said second label are indeterminate and said first label is positioned above said second label, equating said range of cells to the cell intersected by the column containing said first label and the row containing said second label and which is positioned below said first label.

44. The method of claim 33, wherein said preferred label set contains one label, said label being positioned in a different row and column than said formula, said determining step further comprises the steps of:

if said formula is located above said label, equating said range of cells to the cell intersected by the row containing said label and the column containing said formula and which is positioned below said formula;

if said formula is located below and to the left of said label, equating said range of cells to the cell intersected by the column containing said label and the row containing said formula and which is positioned below said label;

if said formula is located below and to the right of said label, then perform the steps of:

classifying said label as one of the types including a row header, a column header and indeterminate type based on the content of the cells surrounding said label, if said label is classified as a row header, equating said range of cells to the cell intersected by the row containing said label and the column containing said formula and which is positioned above said formula;

if said label is classified as a column header, equating said range of cells to the cell intersected by the column containing said label and the row containing said formula and which is positioned below said label;

if said label is classified as indeterminate and if the entire current region for said label is located above but not to the left of said formula, equating said range of cells to the cell intersected by the row containing said label and the column containing said formula and which is positioned above said formula; and in all other cases, equating said range of cells to the cell intersected by the column containing said label and the row containing said formula and which is positioned below said label.

45. The method of claim 33, wherein said preferred label set contains one label sharing a common alignment feature with said formula including one of a common row and a common column, said label is classified as one of the types including a row header, a column header or indeterminate type, and said determining step further comprises the steps of:

if a first current region for said label includes said formula, said first current region being the smallest area of cells containing said label and being surrounded by blank cells, remove said formula from said first current region;

if said label is a column header, and if said label is on the bottom row of said first current region, equating said range of cells to all cells positioned below said label and within a second current region, said second current region being the smallest area of cells containing the next occupied cell positioned below said label and being surrounded by blank cells;

if said label is a column header, and if said label is not on the bottom row of said first current region, identifying said range of cells as comprising all cells positioned below said label and within said first current region;

if said label type is a row header, equating said range of cells to all cells positioned to the right of said label, within the same row as said label and within said first current region, unless at least one exception applies including:

said label being positioned in the right most column of said first current region, said formula being positioned immediately to the right of said label, and the cell immediately to the right of said label containing a blank, said first current region being confined to the column containing said label and the column containing said blank, and a second current region for the cell immediately to the left of said label extending left from said label.

46. A computer system for using label references in a formula to reference a range of cells in a spreadsheet, comprising:

a processing unit;

a memory storage device;

an input device coupled to said processing unit for receiving data;

a pixel-based display device coupled to said processing unit for displaying data;

a program module, stored in said memory storage device for providing instructions to said processing unit;

said processing unit, responsive to said instructions of said program module, operative to:

parse a formula entered from said input device for a group of label references by:

identifying two delimiters in said formula separated by at least one token, examining each said token and each combination of at least two adjacent tokens to identify proper label references, a proper label reference including a set of characters enclosed by label boundary marks, an integer in the range of 1900 to 9999, and a set of characters formatted as a date, and for each proper label reference, including each said token and each said combination of at least two adjacent tokens in said group of label references;

search said cells of said spreadsheet to generate a target label list for each said label reference in said group;

select a preferred label set from said target label lists by:

identifying candidate matching label sets from said target label lists, each said candidate matching label set containing at least one target label, eliminating non-preferred candidate matching label sets until a final candidate matching label set remains, and setting said final candidate matching label set as said preferred label set; and determining said range of cells referenced by said preferred label set.

47. The computer system of claim 46, wherein an implicit intersection match and a free radical intersection match comprise a single target label from one of said target label lists, an explicit intersection match comprises a first target label from a first target label list and a second target label from a second target label list, and said processing unit operates to identify candidate matching label sets by:

for each said target label list, identifying candidate implicit intersection matches;

for each said target label list, identifying candidate free radical intersection matches; and for each combination of two target label lists, identifying candidate explicit intersection matches.

48. The computer system of claim 47, wherein said processing unit operates to eliminate non-preferred candidate matching label sets by:

a) classifying each target label in each said candidate matching label set as one of the types including a row header, a column header and indeterminate type;

b) for each candidate explicit intersection match:

eliminating said candidate explicit intersection match if said first target label and said second target label are both classified as row headers;

eliminating said candidate explicit intersection match if said first target label and said second target label are both classified as column headers, and eliminating said candidate explicit intersection match if said first target label and said second target label are located in the same row; and eliminating said candidate explicit intersection match if said first target label and said second target label are located in the same column;

c) for each candidate explicit intersection match which qualifies as a Single-Double match by having said first target label list containing multiple instances of said first target label and said second target label list containing one instance of said second target label:

if said candidate explicit intersection match is located within the boundaries of an implicit table which includes said formula, eliminating candidate explicit matches that are not located within the boundaries of said implicit table, if said second target label is a member of a labeled range and at least one instance of said first target label is a member of said labeled range, eliminating candidate explicit intersection matches where said first target label is not a member of said labeled range, if said second target label is classified as a column header and at least one instance of said first target label is located to the left of said second target label, eliminating candidate matches where said first target label is not located to the left of said second target label, if said second target label is classified as a row header and at least one instance of said first target label is located to the right of said second target label, eliminating candidate matches where said first target label is not located to the right of said second target label, and if at least one instance of said first target label can be identified as a closest first target label, said closest first target label being closer to said second target label than other instances of said first target label, eliminating candidate explicit intersection matches which do not comprise one of said closest first target labels;

d) for each candidate explicit intersection match which qualifies as a Double-Double match by having said first target label list containing multiple instances of said first target label and said second target label list containing multiple instances of said second target label:

if said candidate explicit intersection match is located within the boundaries of an implicit table which includes said formula, eliminating candidate explicit matches that are not located within the boundaries of said implicit table, if said first target label is classified as a column header and said second target label is classified as a row header, and said first target label is positioned to the right of said second target label, eliminating candidate explicit intersection matches which do not meet this criteria, if at least one instance of said first target label are classified as a row header and can be identified as a closest row header, said closest row header being closer to said formula than other instances of said first target label, eliminating candidate explicit intersection matches which do not comprise one of said closest row headers, if at least instance of said first target label are classified as a column header and can be identified as a closest column header, said closest column header being closer to said formula than other instances of said first target label, eliminating candidate explicit intersection matches which do not comprise one of said closest column headers, and if said candidate explicit intersection match can qualify as a Single-Double match, repeating step c with said Single-Double match;

e) for each candidate implicit intersection match and each candidate free radical intersection match having multiple instances of said single target label in said target label list:

if said single target label is classified as a column header and is positioned below said formula, eliminating said candidate implicit intersection match, if at least one instance of said single target label is positioned within an implicit table which includes said formula, eliminating candidate implicit intersection matches comprising instances of said single target label which are not positioned within said implicit table, if at least one instance of said single target label is classified as a row header and is positioned to the left of said formula, eliminating candidate implicit intersection matches comprising instances of said single target label which are row headers and are not positioned to the left of said formula, if at least one instances of said single target label is positioned within the current region for said formula, said current region being the smallest area of cells containing said formula and being surrounded by a rectangle of blank cells, eliminating candidate implicit intersection matches comprising instances of said single target label not positioned within said current region, and if all instances of said single target label are positioned in the same quadrant about the formula, and if at least one instance of said single target label can be identified as a closest single target label, said closest single target label being closer to said formula than other instances of said single target label, eliminating candidate implicit intersection matches which do not comprise one of said instances of said single target label identified as said closest single target label.

49. The computer system of claim 46, wherein said preferred label set contains a first label in a first row of said spreadsheet and a second label in a second row of said spreadsheet, said first label and said second label being classified as a one type including a row header, a column header or indeterminate type, and said processing unit determines said range of cells by:

if said first label is classified as a row header and said second label is classified as a column header, equating said range of cells to the cell intersected by the row containing said first label and the column containing said second label and which is positioned below said second label;

if said first label is classified as a row header and said second label is classified as indeterminate, equating said range of cells to the cell intersected by the row containing said first label and the column containing said second label and which is positioned below said second label;

if said first label is classified as a column header and said second label is classified as indeterminate, equating said range of cells to the cell intersected by the column containing said first label and the row containing said second label and which is positioned below said first label; and if said first label and said second label are classified as indeterminate and said first label is positionally above said second label, equating said range of cells to the cell intersected by the column containing said first label and the row containing said second label and which is positioned below said first label.

50. The method of claim 46, wherein said preferred label set contains one label, said label being positioned in a different row and column than said formula, and said processing unit determines said range of cells by:

if said formula is located above said label, equating said range of cells to the cell intersected by the row containing said label and the column containing said formula and which is positioned below said formula;

if said formula is located below and to the left of said label, equating said range of cells to the cell intersected by the column containing said label and the row containing said formula and which is positioned below said label;

if said formula is located below and to the right of said label, then perform the steps of:

classifying said label as one type including a row header, a column header or indeterminate type based on the content of the cells surrounding said label, if said label is classified as a row header, equating said range of cells to the cell intersected by the row containing said label and the column containing said formula and which is positioned above said formula;

if said label is classified as a column header, equating said range of cells to the cell intersected by the column containing said label and the row containing said formula and which is positioned below said label;

if said label is classified as indeterminate and if the entire current region for said label is located above but not to the left of said formula, equating said range of cells to the cell intersected by the row containing said label and the column containing said formula and which is positioned above said formula; and in all other cases, equating said range of cells to the cell intersected by the column containing said label and the row containing said formula and which is positioned below said label.

51. The method of claim 46, wherein said preferred label set contains one label sharing a common alignment feature with said formula including a common row or a common column, and said processing unit determines said range of cells by:

if a first current region for said label includes said formula, said first current region being the smallest area of cells containing said label and being surrounded by blank cells, remove said formula from said first current region;

if said label is classified as a column header, and if said label is on the bottom row of said first current region, equating said range of cells to all cells positioned below said label and within a second current region, said second current region being the smallest area of cells containing the next occupied cell positioned below said label and being surrounded by blank cells;

if said label is classified as a column header, and if said label is not on the bottom row of said first current region, identifying said range of cells as comprising all cells positioned below said label and within said first current region;

if said label type is classified as a row header, equating said range of cells to all cells positioned to the right of said label, within the same row as said label and within said first current region, unless at least one exception occurs including:

said label being positioned in the right most column of said first current region, said formula being positioned immediately to the right of said label, and the cell immediately to the right of said label containing a blank, said first current region being confined to the column containing said label and the column containing said blank, and a second current region for the cell immediately to the left of said label extending left from said label.

52. A method for automatically inserting label references into a formula of a spreadsheet, said spreadsheet comprising a plurality of cells arranged in a grid of rows and columns, said label references identifying a range of cells, said method comprising the steps of:

enabling an edit mode for entering said formula;

receiving a selection of said range of cells in said spreadsheet to be referenced by said formula;

searching for a range of column headers above said range of cells and spanning said range of cells;

in response to finding said range of column headers, searching for a range of row headers to the left of said range of cells and spanning said range of cells, and if said range of row headers is not found, searching for said range of row headers to the right of said range of cells and spanning said range of cells; and in response to finding said range of column headers and said range of row headers, extracting a first label from said range of column headers and a second label from said range of row headers, and inserting said first label and said second label into said formula.

53. The method of claim 52, wherein said extracting step further comprises the steps of:

if said range of column headers spans multiple rows, setting said first label to include a label in the top, non-blank row of said range of column headers, and concatenating each label below said label in the top row to said first label, separated by a space;

if said range of row headers spans multiple columns, setting said second label to include a label in the left-most, non-blank column of said range of row headers, and concatenating each label to the right of said label in the left-most, non-blank column to said second label, separated by a space;

if said first label is not a proper label, enclose said first label with label boundary marks; and if said second label is not a proper label, enclose said second label with label boundary marks.

54. In a program module responsive to input commands for entering, modifying and deleting information items in a plurality of information item place-holders, said information items comprising data items, labels and formulas, a method for automatically inserting references to said labels into a formula to identify a range of data items to be operated on by said formula, comprising the steps of:

enabling an edit mode for entering said formula;

selecting said range of cells in said spreadsheet to be referenced by said formula;

searching for a range of column headers above said range of cells and spanning said range of cells;

in response to finding said range of column headers, searching for a range of row headers to the left of said range of cells and spanning said range of cells, and if said range of row headers is not found, searching for said range of row headers to the right of said range of cells and spanning said range of cells; and in response to finding said range of column headers and said range of row headers, extracting a first label from said range of column headers and a second label from said range of row headers, inserting said first label and said second label into said formula.

55. The method of claim 54, wherein said extracting step further comprises the steps of:

if said range of column headers spans multiple rows, setting said first label to include a label in the top row of said range of column headers, and concatenating each label below said label in the top row to said first label, separated by a space;

setting said second label to said label in said range of row headers;

if said first label is not a proper label, enclose said first label with label boundary marks; and if said second label is not a proper label, enclose said second label with label boundary marks.

56. A computer-readable medium on which is stored a computer program for automatically inserting label references into a formula of a spreadsheet, said spreadsheet comprising a plurality of cells arranged in a grid of rows and columns, said label references identifying a range of cells, said method comprising the steps of:

enabling an edit mode for entering said formula;

selecting said range of cells in said spreadsheet to be referenced by said formula;

searching for a range of column headers above said range of cells and spanning said range of cells;

in response to finding said range of column headers, searching for a range of row headers to the left of said range of cells and spanning said range of cells, and if said range of row headers is not found, searching for said range of row headers to the right of said range of cells and spanning said range of cells; and in response to finding said range of column headers and said range of row headers, extracting a first label from said range of column headers and a second label from said range of row headers, and inserting said first label and said second label into said formula.

57. The method of claim 56, wherein said extracting step further comprises the steps of:

if said range of column headers spans multiple rows, setting said first label to include a label in the top, non-blank row of said range of column headers, and concatenating each label below said label in the top, non-blank row to said first label, separated by a space;

setting said second label to said label in said range of row headers;

if said first label is not a proper label, enclose said first label with label boundary marks; and if said second label is not a proper label, enclose said second label with label boundary marks.

58. A computer system for automatically inserting label references into a formula of a spreadsheet, comprising:

a processing unit;

a memory storage device;

an input device coupled to said processing unit for receiving data;

a pixel-based display device coupled to said processing unit for displaying data;

a program module, stored in said memory storage device for providing instructions to said processing unit;

said processing unit, responsive to said instructions of said program module, operative to:
enable an edit mode for entering said formula;
select a range of cells in said spreadsheet to be referenced by said formula;
search for a range of column headers above said range of cells and spanning said range of cells;
search for a range of row headers to the left of said range of cells and spanning said range of cells, and search for said range of row headers to the right of said range of cells and spanning said range of cells if said range of row headers is not found to the left; and in response to finding said range of column headers and said range of row headers, extract a first label from said range of column headers and a second label from said range of row headers, and insert said first label and said second label into said formula.

59. The computer system of claim 58, wherein said processing unit extracts said first label and said second label by:

if said range of column headers spans multiple rows,
setting said first label to include a label in the top row of said range of column headers, and
concatenating each label below said first label in the top row to said first label, separated by a space;

setting said second label to said label in said range of row headers;

if said first label is not a proper label, enclose said first label with label boundary marks; and if said second label is not a proper label, enclose said second label with label boundary marks.

* * * * *